US012620924B2

(12) United States Patent

Patton et al.

(10) Patent No.: US 12,620,924 B2

(45) Date of Patent: May 5, 2026

(54) SUPPORT STRUCTURES AND MOUNTING SYSTEMS FOR SOLAR PANELS

(71) Applicant: Origami Solar, Inc., Sacramento, CA (US)

(72) Inventors: John C. Patton, Rocklin, CA (US); Eric Hafter, Sacramento, CA (US); Tyler Hudson, Cocolalla, ID (US)

(73) Assignee: ORIGAMI SOLAR, INC., Sacramento, CA (US)

( * ) Notice: Subject to any disclaimer, the term of this patent is extended or adjusted under 35 U.S.C. 154(b) by 0 days.

(21) Appl. No.: 19/103,783

(22) PCT Filed: Aug. 18, 2023

(86) PCT No.: PCT/US2023/030540
§ 371 (c)(1),
(2) Date: Feb. 13, 2025

(87) PCT Pub. No.: WO2024/044096

PCT Pub. Date: Feb. 29, 2024

(65) Prior Publication Data

US 2026/0051839 A1 Feb. 19, 2026

Related U.S. Application Data

(60) Provisional application No. 63/399,711, filed on Aug. 21, 2022.

(51) Int. Cl.
*H02S 20/20* (2014.01)
*F24S 25/20* (2018.01)
(Continued)

(52) U.S. Cl.
CPC .............. *H02S 20/20* (2014.12); *F24S 25/20* (2018.05); *H02S 30/10* (2014.12); *F24S 2025/012* (2018.05)

(58) Field of Classification Search
CPC ......... H02S 20/20; H02S 30/10; F24S 25/20; F24S 2025/012
See application file for complete search history.

(56) References Cited

U.S. PATENT DOCUMENTS

| | | | | |
|---|---|---|---|---|
| 1,826,133 | A | * 10/1931 | Hatch | ...................... E04B 9/26 |
| | | | | 52/522 |
| 2,105,706 | A | 1/1938 | Stamy | |

(Continued)

FOREIGN PATENT DOCUMENTS

| | | |
|---|---|---|
| CN | 200989673 Y | 12/2001 |
| CN | 102569465 A | 7/2012 |

(Continued)

OTHER PUBLICATIONS

U.S. Appl. No. 62/921,310, filed Jun. 10, 2019. First named inventor: Patton.

(Continued)

*Primary Examiner* — Adriana Figueroa

(74) *Attorney, Agent, or Firm* — Fredrikson & Byron, P.A.

(57) ABSTRACT

A solar panel support structure includes a first shelf for supporting a first frame section of a first solar panel module, the first shelf defining a first plane, and a second shelf for supporting a second frame section of a second solar panel module, the second shelf defining a second plane. A dividing structure is provided between the first and second shelves and extends above the first and second planes. A first shelf upturn may be provided at an end of the first shelf away from the dividing structure and extending above the first plane. A second shelf upturn may be provided at an end of the second shelf away from the dividing structure and extending above the second plane. The support structure includes one or more (Continued)

first movable lock tabs for engaging first and second bottom flange portions of the frame sections.

23 Claims, 34 Drawing Sheets

(51) Int. Cl.
H02S 30/10 (2014.01)
F24S 25/00 (2018.01)

(56) References Cited

U.S. PATENT DOCUMENTS

| | | | |
|---|---|---|---|
| 2,201,335 A | 5/1940 | Bart | |
| 2,598,776 A | 6/1952 | Flora | |
| 2,689,027 A | 9/1954 | Flora | |
| 3,685,863 A | 8/1972 | Oetiker | |
| 4,047,349 A | 9/1977 | Aguilar, Jr. et al. | |
| 4,111,188 A | 9/1978 | Murphy, Jr. | |
| 4,112,693 A | 9/1978 | Collin | |
| 4,371,139 A | 2/1983 | Clark | |
| 4,421,943 A | 12/1983 | Withjack | |
| 4,429,872 A | 2/1984 | Capachi | |
| 4,479,737 A | 10/1984 | Bergh et al. | |
| 4,744,187 A | 5/1988 | Tripp | |
| 4,760,981 A | 8/1988 | Hodges et al. | |
| 4,763,456 A | 8/1988 | Gianuzzi | |
| 4,896,992 A | 1/1990 | Muhlethaler | |
| 4,945,699 A | 8/1990 | Murphy | |
| 4,966,631 A | 10/1990 | Matlin et al. | |
| 5,076,035 A * | 12/1991 | Wright | E04B 2/96 |
| | | | 52/489.1 |
| 5,102,275 A | 4/1992 | Hulsey | |
| 5,143,556 A | 9/1992 | Matlin | |
| 5,164,020 A | 11/1992 | Wagner et al. | |
| 5,228,644 A | 7/1993 | Garriott et al. | |
| 5,255,887 A | 10/1993 | Schumacher et al. | |
| 5,289,356 A | 2/1994 | Winston | |
| 5,344,496 A | 9/1994 | Stern et al. | |
| 5,497,587 A | 3/1996 | Hirai et al. | |
| 5,505,788 A | 4/1996 | Dinwoodie | |
| 5,537,991 A | 7/1996 | Winston et al. | |
| 5,571,338 A | 11/1996 | Kadonome et al. | |
| 5,706,617 A | 1/1998 | Hirai et al. | |
| 5,746,029 A | 5/1998 | Ullman | |
| 5,746,839 A | 5/1998 | Dinwoodie | |
| 5,930,969 A | 8/1999 | Mayle | |
| 6,058,930 A | 5/2000 | Shingleton | |
| 6,093,884 A | 7/2000 | Toyomura et al. | |
| 6,111,189 A | 8/2000 | Garvison et al. | |
| 6,134,754 A | 10/2000 | Hansson et al. | |
| 6,201,180 B1 | 3/2001 | Meyer et al. | |
| 6,207,889 B1 | 3/2001 | Toyomura et al. | |
| 6,233,889 B1 | 5/2001 | Hulsey | |
| 6,250,034 B1 | 6/2001 | Hulsey | |
| 6,269,596 B1 | 8/2001 | Ohtsuka et al. | |
| 6,282,857 B1 | 9/2001 | Rubenacker | |
| 6,360,491 B1 | 3/2002 | Ullman | |
| 6,405,494 B1 | 6/2002 | Wismeth | |
| 6,465,724 B1 | 10/2002 | Garvison et al. | |
| 6,467,916 B2 | 10/2002 | Winston | |
| 6,489,566 B1 | 12/2002 | Durin et al. | |
| 6,501,013 B1 | 12/2002 | Dinwoodie | |
| 6,526,701 B2 | 3/2003 | Stearns et al. | |
| 6,534,703 B2 | 3/2003 | Dinwoodie | |
| 6,670,541 B2 | 12/2003 | Negao et al. | |
| 6,672,018 B2 | 1/2004 | Shingleton | |
| 6,745,869 B2 | 6/2004 | Garrett | |
| 6,784,360 B2 | 8/2004 | Nakajima et al. | |
| 6,809,251 B2 | 10/2004 | Dinwoodie | |
| D510,315 S | 10/2005 | Shugar et al. | |
| 6,958,868 B1 | 10/2005 | Pender | |
| 6,959,517 B2 | 11/2005 | Poddany et al. | |
| 6,987,604 B2 | 1/2006 | Rabinowitz et al. | |
| RE38,988 E | 2/2006 | Dinwoodie | |
| D519,444 S | 4/2006 | Mascolo | |
| 7,043,884 B2 | 5/2006 | Moreno | |
| 7,156,088 B2 | 1/2007 | Luconi | |
| 7,297,866 B2 | 11/2007 | Aschenbrenner | |
| D565,505 S | 4/2008 | Shugar | |
| 7,386,922 B1 | 6/2008 | Taylor et al. | |
| 7,388,146 B2 | 6/2008 | Fraas et al. | |
| 7,406,800 B2 | 8/2008 | Cinnamon et al. | |
| 7,413,392 B2 | 8/2008 | Nebesnak | |
| 7,475,513 B2 | 1/2009 | Parker | |
| 7,631,468 B2 | 12/2009 | Gong | |
| 7,935,202 B2 | 5/2011 | Stanley | |
| 8,099,922 B2 | 1/2012 | Kellerman et al. | |
| 8,122,648 B1 | 2/2012 | Liu | |
| 8,166,720 B2 | 5/2012 | Garrigus | |
| 8,250,829 B2 | 8/2012 | McPheeters | |
| 8,307,606 B1 | 11/2012 | Rego et al. | |
| 8,316,617 B2 | 11/2012 | Krovats | |
| 8,316,618 B1 | 11/2012 | Rodowca et al. | |
| 8,316,619 B1 | 11/2012 | Rego et al. | |
| 8,336,227 B2 | 12/2012 | Bae et al. | |
| 8,371,076 B2 | 2/2013 | Jones et al. | |
| 8,438,893 B2 | 5/2013 | Durney et al. | |
| 8,443,558 B2 | 5/2013 | Buller et al. | |
| 8,495,997 B1 | 7/2013 | Laubach et al. | |
| 8,505,248 B1 | 8/2013 | Leong et al. | |
| 8,522,490 B1 | 9/2013 | Stancel | |
| 8,522,491 B2 | 9/2013 | Kneip | |
| 8,536,442 B2 | 9/2013 | Stancel | |
| 8,549,800 B2 | 10/2013 | Reyal et al. | |
| 8,623,158 B2 | 1/2014 | Stanley | |
| 8,631,614 B2 | 1/2014 | Livsey | |
| 8,683,751 B2 | 4/2014 | Stearns et al. | |
| 8,733,718 B2 | 5/2014 | Corsi | |
| 8,752,343 B2 | 6/2014 | Kuan | |
| 8,782,983 B2 | 7/2014 | Stearns | |
| 8,826,618 B2 | 9/2014 | Stearns | |
| 9,109,814 B2 | 8/2015 | Patton et al. | |
| 9,188,365 B2 | 11/2015 | Kuan et al. | |
| 9,353,546 B2 | 5/2016 | Garza et al. | |
| 9,479,110 B2 | 10/2016 | Patton et al. | |
| 9,512,617 B2 * | 12/2016 | Powers, III | F24S 25/35 |
| 9,876,465 B2 * | 1/2018 | Depauw | F16B 5/0685 |
| 9,906,186 B2 * | 2/2018 | Suzuki | F24S 25/20 |
| 9,998,066 B2 | 6/2018 | West et al. | |
| 10,079,570 B2 * | 9/2018 | Patton | F24S 25/632 |
| 10,158,323 B2 | 12/2018 | Schulte et al. | |
| 10,256,768 B2 | 4/2019 | Owen et al. | |
| 10,631,472 B2 | 4/2020 | Clarke et al. | |
| 10,651,783 B2 | 5/2020 | Molitor et al. | |
| 10,931,225 B2 | 2/2021 | Yang et al. | |
| 11,118,721 B1 | 9/2021 | Schmitt et al. | |
| 11,996,802 B2 | 5/2024 | Patton | |
| 2002/0066235 A1 | 6/2002 | Stearns et al. | |
| 2002/0096395 A1 | 7/2002 | Garret | |
| 2003/0015637 A1 | 1/2003 | Liebendorfer | |
| 2003/0033780 A1 | 2/2003 | Hasan | |
| 2003/0070368 A1 | 4/2003 | Shingleton | |
| 2003/0230451 A1 | 12/2003 | Garrett | |
| 2004/0007260 A1 | 1/2004 | Dinwoodie | |
| 2004/0148888 A1 | 8/2004 | Kuhn | |
| 2004/0163338 A1 | 8/2004 | Liebendorfer | |
| 2004/0261955 A1 | 12/2004 | Singleton et al. | |
| 2005/0144870 A1 | 7/2005 | Dinwoodie | |
| 2006/0054212 A1 | 3/2006 | Fraas et al. | |
| 2006/0185289 A1 | 8/2006 | Gong | |
| 2007/0102036 A1 | 5/2007 | Cinnamon | |
| 2007/0144575 A1 | 6/2007 | Mascolo et al. | |
| 2007/0151594 A1 | 7/2007 | Mascolo et al. | |
| 2007/0157963 A1 | 7/2007 | Metten et al. | |
| 2007/0272234 A1 | 11/2007 | Allen et al. | |
| 2007/0295392 A1 | 12/2007 | Cinnamon | |
| 2007/0295393 A1 | 12/2007 | Cinnamon | |
| 2008/0105489 A1 | 5/2008 | Garrett | |
| 2008/0121273 A1 | 5/2008 | Plaisted | |
| 2008/0152849 A1 | 6/2008 | Lenhardt | |
| 2008/0302407 A1 | 12/2008 | Kobayashi | |
| 2009/0050194 A1 | 2/2009 | Noble et al. | |
| 2009/0078299 A1 | 3/2009 | Cinnamon et al. | |

(56) References Cited

U.S. PATENT DOCUMENTS

| | | |
|---|---|---|
| 2009/0114271 A1 | 5/2009 | Stancel |
| 2009/0194098 A1 | 8/2009 | Placer |
| 2009/0199846 A1 | 8/2009 | Collins et al. |
| 2009/0242014 A1 | 10/2009 | Leary |
| 2009/0266352 A1 | 10/2009 | Wetmore |
| 2009/0320907 A1 | 12/2009 | Botkin |
| 2010/0000605 A1 | 1/2010 | Comert et al. |
| 2010/0043781 A1 | 2/2010 | Jones et al. |
| 2010/0065108 A1 | 3/2010 | West |
| 2010/0162641 A1 | 7/2010 | Reyal et al. |
| 2010/0163015 A1 | 7/2010 | Potter et al. |
| 2010/0192505 A1 | 8/2010 | Schaefer |
| 2010/0236610 A1 | 9/2010 | Stancel et al. |
| 2010/0243023 A1 | 9/2010 | Patton et al. |
| 2011/0203637 A1 | 8/2011 | Patton |
| 2011/0240207 A1 | 10/2011 | Stanley |
| 2011/0250011 A1 | 10/2011 | Schwarze |
| 2011/0260027 A1 | 10/2011 | Farnham, Jr. et al. |
| 2011/0265861 A1 | 11/2011 | Nabauer et al. |
| 2011/0272372 A1 | 11/2011 | Peter et al. |
| 2011/0296773 A1 | 12/2011 | Kellerman |
| 2012/0085394 A1 | 4/2012 | McPheeters et al. |
| 2012/0097816 A1 | 4/2012 | Tamm et al. |
| 2012/0107043 A1 | 5/2012 | Kellerman |
| 2012/0145227 A1 | 6/2012 | Jun et al. |
| 2012/0160787 A1 | 6/2012 | Schummlochner |
| 2012/0186169 A1 | 7/2012 | Tomaso |
| 2012/0240489 A1 | 9/2012 | Rivera et al. |
| 2012/0273029 A1 | 11/2012 | Bragagna et al. |
| 2012/0312355 A1 | 12/2012 | Patton |
| 2012/0318322 A1 | 12/2012 | Lanyon et al. |
| 2013/0091786 A1 | 4/2013 | DuPont et al. |
| 2013/0136528 A1 | 5/2013 | Kellerman |
| 2013/0136531 A1 | 5/2013 | Kobayashi et al. |
| 2013/0210008 A1 | 8/2013 | Feitsma et al. |
| 2013/0312812 A1 | 11/2013 | Meyer et al. |
| 2013/0320161 A1 | 12/2013 | Merhar |
| 2014/0014158 A1 | 1/2014 | Wildes |
| 2014/0020308 A1 | 1/2014 | Heisler |
| 2014/0060625 A1 | 3/2014 | Beuke et al. |
| 2015/0013754 A1* | 1/2015 | Yakushiji ............... F16M 13/02 136/251 |
| 2015/0034355 A1 | 2/2015 | Patton |
| 2015/0040967 A1 | 2/2015 | West et al. |
| 2015/0069198 A1 | 3/2015 | West |
| 2015/0244308 A1 | 8/2015 | Patton et al. |
| 2015/0326171 A1 | 11/2015 | Patton |
| 2016/0020722 A1 | 1/2016 | Patton et al. |
| 2016/0054030 A1 | 2/2016 | Ilzhofer |
| 2017/0104445 A1 | 4/2017 | Depauw |
| 2017/0222599 A1 | 8/2017 | West et al. |
| 2017/0244354 A1 | 8/2017 | Patton et al. |
| 2018/0191290 A1 | 7/2018 | Guthrie et al. |
| 2018/0212556 A1 | 7/2018 | Wegert et al. |
| 2018/0226916 A1 | 8/2018 | Neuhauser et al. |
| 2019/0013774 A1 | 1/2019 | Truthseeker et al. |
| 2020/0127599 A1 | 4/2020 | Truthseeker et al. |
| 2020/0389124 A1 | 12/2020 | Lyford |
| 2021/0313926 A1 | 10/2021 | Cavieres et al. |
| 2022/0103117 A1 | 3/2022 | Gong et al. |
| 2022/0302872 A1 | 9/2022 | Patton et al. |
| 2024/0186945 A1 | 6/2024 | Origami |

FOREIGN PATENT DOCUMENTS

| | | | |
|---|---|---|---|
| CN | 102760782 A | 10/2012 | |
| CN | 202651163 U | 1/2013 | |
| CN | 208272919 U | 12/2018 | |
| CN | 112165298 A | 12/2021 | |
| CN | 117897906 A | 4/2024 | |
| CN | 114375543 B | 8/2024 | |
| CN | 118971771 A | 11/2024 | |
| CN | 119999080 A | 5/2025 | |
| DE | 3625119 A1 | 1/1988 | |
| DE | 29703481 U1 | 11/1997 | |
| DE | 19652568 A1 | 6/1998 | |
| DE | 20117716 U1 | 3/2002 | |
| DE | 102010022556 B3 | 6/2011 | |
| DE | 202012101023 U1 | 7/2013 | |
| EP | 1568950 A1 | 8/2005 | |
| EP | 2295893 A1 * | 3/2011 | ........... F24S 25/636 |
| EP | 3981071 A1 | 4/2022 | |
| EP | 3981071 B1 | 8/2024 | |
| FR | 2981738 A1 | 4/2013 | |
| GB | 803743 | 4/1956 | |
| JP | 10308522 | 11/1998 | |
| JP | 10308522 A | 11/1998 | |
| JP | 2006278672 A | 10/2006 | |
| JP | 2013118236 A | 6/2013 | |
| JP | 201475419 A | 4/2014 | |
| KR | 20140036105 A | 3/2014 | |
| WO | 2006089770 A1 | 8/2006 | |
| WO | 2007038760 A2 | 4/2007 | |
| WO | 2009137809 A1 | 11/2009 | |
| WO | WO-2010054617 A2 * | 5/2010 | ........... F24S 25/634 |
| WO | 2013143178 A1 | 10/2013 | |
| WO | 2014004161 A1 | 1/2014 | |
| WO | 2015077526 A1 | 5/2015 | |
| WO | 2017005239 A1 | 1/2017 | |
| WO | WO-2018017646 A1 * | 1/2018 | ............. H10F 19/00 |
| WO | 2019041845 A1 | 3/2019 | |
| WO | 2020252091 A1 | 12/2020 | |
| WO | 2021036273 A1 | 3/2021 | |
| WO | 2021156645 A1 | 8/2021 | |
| WO | 2022225961 A2 | 10/2022 | |
| WO | 2024044096 A1 | 2/2024 | |

OTHER PUBLICATIONS

International Patent Application No. PCT/US20/037092, filed Jun. 10, 2020. First named inventor: Patton.

International Patent Application No. PCT/US20/037092, filed Jun. 10, 2020. First named inventor: Patton. Written Opinion of the International Searching Authority dated Sep. 10, 2020. 2 pages.

International Patent Application No. PCT/US20/037092, filed Jun. 10, 2020. First named inventor: Patton. International Search Report dated Sep. 10, 2020. 11 pages.

International Patent Application No. PCT/US20/037092, filed Jun. 10, 2020. First named inventor: Patton. International Preliminary Report on Patentability dated Feb. 3, 2021. 84 pages.

Global Sources, Solar Border, Aluminum Solar Panel Frame. Date unknown. 4 pages.

TTI, Moving Energy Forward. Flush Mount Rail System. 2 pages. (C) 2008.

www.quickmountpv.com/products.php; Quick Mount PV Products, Manufacterer of Waterproof Mounts for the PC Industry; 1 page. (c) 2009; retrieved Oct. 2, 2009. 3 pages.

www.ttisolar.com/prodcuts/flatjack_order.html; Flat Jack Roof Mount Order Form; 2 pages. (c) 2008 Thompson Technology Industries, Inc.

Solar Power System Installation Manual; SRS Mountain System, Rectangular Modules; Sharp Electronics Corp., 44 pages, Jun. 5, 2007.

www.we-llc.com/WEEB_hotitowrks.html; Bonding a PV module to an anodized aluminum frame using the WEEB; last accessed Oct. 2, 2009, 1 page.

U.S. Appl. No. 61/126,947; filed May 8, 2008. First named inventor: Patton.

U.S. Appl. No. 61/130,359; filed May 29, 2008. First named inventor: Patton.

U.S. Appl. No. 61/205,556; filed Jan. 21, 2009. First named inventor: Patton.

U.S. Appl. No. 15/589,069, filed May 8, 2017. First named inventor: Patton. Office Action dated Jul. 19, 2018. 11 pages.

Flat Jack (R) Roof Mount | TTI. Flat Jack Roof Mount Order Form. 2 pages. Oct. 2, 2009.

International Patent Application No. PCT/US2009/043368, International Search Report dated Jul. 9, 2009. 3 pages.

(56) References Cited

OTHER PUBLICATIONS

International Patent Application No. PCT/US2009/043368, Written Opinion dated Jul. 9, 2009. 23 pages.
International Patent Application No. PCT/US2009/043368, International Preliminary Report on Patentability dated Apr. 5, 2012. 142 pages.
U.S. Appl. No. 14/866,680, filed Sep. 25, 2015. First named inventor: Patton. Office Action dated Jan. 25, 2016. 7 pages.
U.S. Appl. No. 14/813,950, filed Jul. 30, 2015. First named inventor: Patton. Office Action dated May 25, 2016. 12 pages.
U.S. Appl. No. 13/561,905, filed Jul. 30, 2012. First named inventor: Patton. Notice of Allowance dated Apr. 7, 2015. 9 pages.
OMG Roofing Products; PowerGrip Roof Mount System pamphlet. copyright 2015; 2 pages.
U.S. Appl. No. 13/561,905, filed Jul. 30, 2012. First named inventor: Patton. Office Action dated Dec. 1, 2014. 7 pages.
U.S. Appl. No. 13/561,905, filed Jul. 30, 2012. First named inventor: Patton. Office Action dated Oct. 4, 2013. 8 pages.
U.S. Appl. No. 12/680,732, filed Mar. 29, 2010. First named inventor: Patton. Office Action dated Feb. 13, 2012. 20 pages.
U.S. Appl. No. 15/589,069, filed May 8, 2017. First named inventor: Patton. Office Action dated Sep. 26, 2017. 8 pages.
U.S. Appl. No. 14/866,680, filed Sep. 25, 2015. First named inventor: Patton. Notice of Allowance dated Sep. 8, 2016. 12 pages.
U.S. Appl. No. 14/866,680, filed Sep. 25, 2015. First named inventor: Patton. Office Action dated May 24, 2016. 13 pages.
U.S. Appl. No. 13/561,905, filed Jul. 30, 2012. First named inventor: Patton. Office Action dated Oct. 4, 2013. 7 pages.
U.S. Appl. No. 13/561,905, filed Jul. 30, 2012. First named inventor: Patton. Office Action dated Apr. 11, 2014. 12 pages.
U.S. Appl. No. 12/680,732, filed Mar. 29, 2010. First named inventor: Patton. Office Action dated Dec. 30, 2011. 7 pages.
U.S. Appl. No. 14/813,950, filed Jul. 30, 2015. First named inventor: Patton.
U.S. Appl. No. 15/589,069, filed May 8, 2017. First named inventor: Patton.
U.S. Appl. No. 13/561,905, filed Jul. 30, 2012. First named inventor: Patton.
U.S. Appl. No. 12/680,732, filed Mar. 29, 2010. First named inventor: Patton.
PCT Patent Application No. PCT/US2009/043368, filed May 8, 2009. First named inventor: Patton.
Chinese Patent Application No. 200980126953.X, Office Action dated Apr. 13, 2012. 3 pages.
Chinese Patent Application No. 200980126953.X, Office Action dated Nov. 13, 2012. 3 pages.
Chinese Patent Application No. 202080043363.7, Office Action dated Dec. 27, 2023. 7 pages.
European Application EP20820761.3, Communication of Intention to Grant dated Mar. 20, 2024, 9 pages.
U.S. Appl. No. 17/618,260, filed Dec. 10, 2021. First named inventor: Patton. Office Action dated Nov. 9, 2022. 15 pages.
U.S. Appl. No. 17/618,260, filed Dec. 10, 2021. First named inventor: Patton. Office Action dated Jun. 7, 2023. 16 pages.
U.S. Appl. No. 17/618,260, Notice of Allowance dated Jan. 12, 2024, 8 pages.
U.S. Appl. No. 17/618,260, Notice of Allowance dated Jan. 29, 2024, 2 pages.
U.S. Appl. No. 17/618,260, Notice of Allowance dated Apr. 10, 2024, 4 pages.
U.S. Appl. No. 17/618,260, filed Dec. 10, 2021. First named inventor: Patton.
U.S. Appl. No. 18/634,614, filed Apr. 12, 2024. First named inventor: Patton.
U.S. Appl. No. 18/634,614, filed Apr. 12, 2024. First named inventor: Patton. Office Action dated Sep. 9, 2024, 10 pages.
International Patent Application No. PCT/US2023/030540 filed Aug. 18, 2023. First named inventor: Patton. International Preliminary Report on Patentability dated Mar. 6, 2025. 6 pages.

U.S. Appl. No. 18/634,614, filed Apr. 12, 2024. First named inventor: Patton. Office Action dated Mar. 21, 2025, 10 pages.
U.S. Appl. No. 17/618,260, filed Dec. 10, 2021. First named inventor: Patton. Corrected Notice of Allowance dated Apr. 29, 2024, 2 pages.
U.S. Appl. No. 17/618,260, filed Dec. 10, 2021. First named inventor: Patton. Issue Notification dated May 8, 2024, 2 pages.
European Application EP20820761.3, Supplementary European Search Report dated May 10, 2023, 7 pages.
Indian Patent Application No. 202117057281, First Examination Report dated Jul. 5, 2022, 5 pages.
Chinese Patent Application No. 202080043363.7, Notice to Undergo Registration Procedures and Notice to Grant Patent Right dated May 28, 2024, 2 pages.
Indian Patent Application No. 202117057281, Hearing Notice dated May 16, 2024, 3 pages.
European Application EP20820761.3, Decision to Grant dated Aug. 1, 2024, 2 pages.
European Application EP20820761.3, Unitary Patent Certificate dated Sep. 5, 2024, 1 page.
European Application EP20820761.3, Patent Certificate dated Aug. 28, 2024, 1 page.
Indian Patent Application No. 202117057281, Intimation of Grant dated Jul. 29, 2024, 1 page.
Indian Patent Application No. 202117057281, Patent Certificate dated Jul. 29, 2024, 1 page.
Chinese Patent Application No. 202080043363.7, Patent Certificate along with English Translation dated Aug. 16, 2024, 2 pages.
U.S. Appl. No. 63/176,803, filed Apr. 19, 2021. First named inventor: Hafter.
U.S. Appl. No. 63/176,824, filed Apr. 19, 2021. First named inventor: Patton.
U.S. Appl. No. 63/288,556, filed Dec. 11, 2021. First named inventor: Patton.
U.S. Appl. No. 63/189,591, filed May 17, 2021. First named inventor: Hafter.
U.S. Appl. No. 63/213,541, filed Jun. 22, 2021. First named inventor: Hafter.
U.S. Appl. No. 63/224,271, filed Jul. 21, 2021. First named inventor: Patton.
U.S. Appl. No. 63/272,086, filed Oct. 26, 2021. First named inventor: Patton.
International PCT Patent Application No. PCT/US2022/25388, filed Apr. 19, 2022. First named Inventor: Patton.
International PCT Patent Application No. PCT/US2022/25388, filed Apr. 19, 2022. First named Inventor: Patton. International Search Report dated Oct. 26, 2022. 4 pages.
International PCT Patent Application No. PCT/US2022/25388, filed Apr. 19, 2022. First named Inventor: Patton. Written Opinion of International Searching Authority dated Oct. 26, 2022. 9 pages.
Machine Translation of CN202651163U provided with the Written Opinion of the International Searching Authority. 2 pages. Obtained Sep. 16, 2022.
Machine Translation of CN112165298A provided with the Written Opinion of the International Searching Authority. 13 pages. Obtained Sep. 16, 2022.
Machine Translation of JPH10308522A provided with the Written Opinion of the International Searching Authority. 4 pages. Obtained Sep. 16, 2022.
Machine Translation of WO2021036273A1 provided with the Written Opinion of the International Searching Authority. 6 pages. Obtained Sep. 16, 2022.
European Patent Application No. 22792333.1, Third Party Observations dated Jul. 22, 2024, 19 pages.
European Patent Application No. 22792333.1, Search Report dated Feb. 14, 2025, 7 pages.
U.S. Appl. No. 18/556,206, filed Oct. 19, 2023. First named inventor: Patton.
U.S. Appl. No. 18/556,206, filed Oct. 19, 2023. First named inventor: Patton. Office Action dated Aug. 30, 2024, 17 pages.
U.S. Appl. No. 18/556,206, filed Oct. 19, 2023. First named inventor: Patton. Notice of Allowance dated Apr. 10, 2025, 9 pages.

(56)  References Cited

OTHER PUBLICATIONS

PCT International Application No. PCT/US2022/034278, filed Jun. 21, 2022. First named inventor: Hafter.

PCT International Application No. PCT/US2022/034278, filed Jun. 21, 2022. International Search Report dated Oct. 12, 2022. 4 pages.

PCT International Application No. PCT/US2022/034278, filed Jun. 21, 2022. Written Opinion of the International Searching Authority dated Oct. 12, 2022. 10 pages.

European Patent Application No. 22829123.3, filed Jan. 9, 2024. First named inventor: Hafter. Examination Report dates Oct. 8, 2024, 6 pages.

U.S. Appl. No. 19/257,294, filed Jul. 1, 2025. First name inventor: Patton.

U.S. Appl. No. 19/267,351, filed Jul. 11, 2025. First name inventor: Patton.

European Patent Application No. 22829123.3, filed Jan. 9, 2024. First named inventor: Hafter. Search Report dated Sep. 25, 2024, 3 pages.

International Patent Application No. PCT/US2023/030540, filed Aug. 18, 2023. First named inventor: Patton.

International Patent Application No. PCT/US2023/030540, filed Aug. 18, 2023. First named inventor: Patton. Written Opinion of the International Searching Authority dated Dec. 11, 2023, 4 pages.

International Patent Application No. PCT/US2023/030540, filed Aug. 18, 2023. First named inventor: Patton. International Search Report dated Dec. 11, 2023, 5 pages.

U.S. Appl. No. 63/399,711, filed Aug. 21, 2022. First named inventor: Patton.

\* cited by examiner

773C

773D

850

901

901

987

973

977a

977b

1001

1091

1089

1085

1004

1001

1001

1077                1077

1073

1087

1150

1297

1299

1275

1268

1296

1297

1272

1271

1271

1297

1299
1275
1204
1296
1277
1272
1297

1270
1270
1298
1297

SUPPORT STRUCTURES AND MOUNTING SYSTEMS FOR SOLAR PANELS

This application is the US National Phase of PCT International Application No. PCT/US2023/030540 filed Aug. 18, 2023, which claims priority to and the benefit of U.S. Provisional Patent Application No. 63/399,711 filed Aug. 21, 2022, each application and any priority case are hereby incorporated by reference herein in its entirety.

TECHNICAL FIELD

The present disclosure relates to various embodiments for support structures and mounting systems for panels such as solar panels.

BACKGROUND

Photovoltaic solar panels for residential and commercial use are relatively large and heavy. For example, a typical rectangular solar panel may weigh about 20-30 kg, have a width of about 1 meter, a length of about 1.6 to 2.5 meters, and a thickness of about 3 to 5 cm. A photovoltaic solar panel may typically be a multilayer laminated structure (sometimes referred to as a PV laminate) and may include photovoltaic cells encapsulated between a top glass and a protective back-sheet. A solar panel can further include appropriate wiring and junctions so that solar-generated electricity (typically DC) may be transmitted to a desired load, grid, or energy storage unit. While having some physical toughness, significant additional strength to the panel may be provided by including it in a frame. A frame may allow for easy attaching of a photovoltaic solar panel to a rack. A framed PV laminate is sometimes referred to as a PV module.

Over the years, the cost of solar panels has decreased perhaps due to a decrease in the material and manufacturing costs and even an increased efficiency of the solar cells. However, in order to further expand the use of renewable solar energy, there is a continuing desire to further reduce costs and simplify the manufacture of frames.

SUMMARY

The present application includes a variety of aspects, which may be selected in different combinations based upon the particular application or needs to be addressed. In various embodiments, the application may include solar panel support structure that includes a first shelf for supporting a first frame section of a first solar panel module, the first shelf defining a first plane, and a second shelf for supporting a second frame section of a second solar panel module, the second shelf defining a second plane. A dividing structure is provided between the first and second shelves and extends above the first and second planes. A first shelf upturn may be provided at an end of the first shelf away from the dividing structure and extending above the first plane. A second shelf upturn may be provided at an end of the second shelf away from the dividing structure and extending above the second plane. The support structure includes one or more first movable lock tabs provided in i) the dividing structure, ii) the first shelf upturn, or both (i) and (ii), for engaging a first bottom flange portion of the first frame section. The support structure also includes one or more second movable lock tabs provided in i) the dividing structure, ii) the second shelf upturn, or both (i) and (ii), for engaging a second bottom flange portion of the second frame section.

Some embodiments of the present application may provide support structures and mounting systems that have one or more of the following advantages: improved strength, improved bending, improved twisting, improved durability, reduced material costs, reduced manufacturing costs, reduced assembly costs, higher manufacturing yield, reduced manufacturing tact time, reduced installation costs, simplified installation, reduced installation time, higher installation yield, or some other advantage.

Naturally, further objects, goals and embodiments of the application are disclosed throughout other areas of the specification, claims, and drawings.

DETAILED DESCRIPTION

It should be understood that embodiments include a variety of aspects, which may be combined in different ways. The following descriptions are provided to list elements and describe some of the embodiments of the present application. These elements are listed with initial embodiments; however, it should be understood that they may be combined in any manner and in any number to create additional embodiments. The variously described examples and embodiments should not be construed to limit embodiments of the present application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

It is to be understood that the drawings are for purposes of illustrating the concepts of the disclosure and may not be to scale. Additional details of certain embodiments of the present application may be found in PCT application PCT/US2020/037092 filed on Jun. 10, 2020 and published as WO2020/252091A1, PCT application PCT/US2022/025383 filed on Apr. 19, 2022, PCT application PCT/US2022/025388 filed on Apr. 19, 2022, and PCT application PCT/US2022/029668 filed on May 17, 2022, the entire contents of which are incorporated herein by reference for all purposes.

Figure 1A:
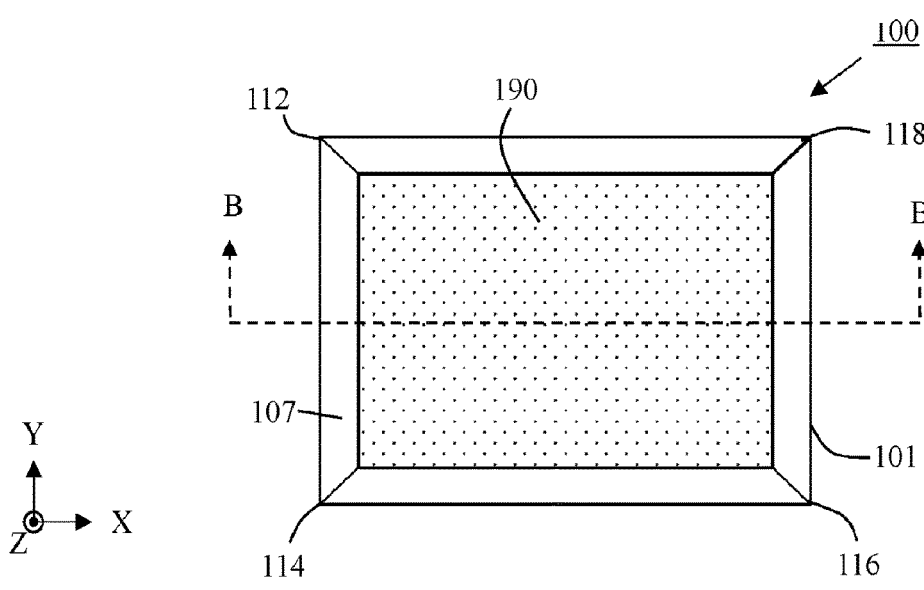
FIG. 1A is a plan view of a non-limiting example of a framed panel structure according to some embodiments.
Figure 1B:
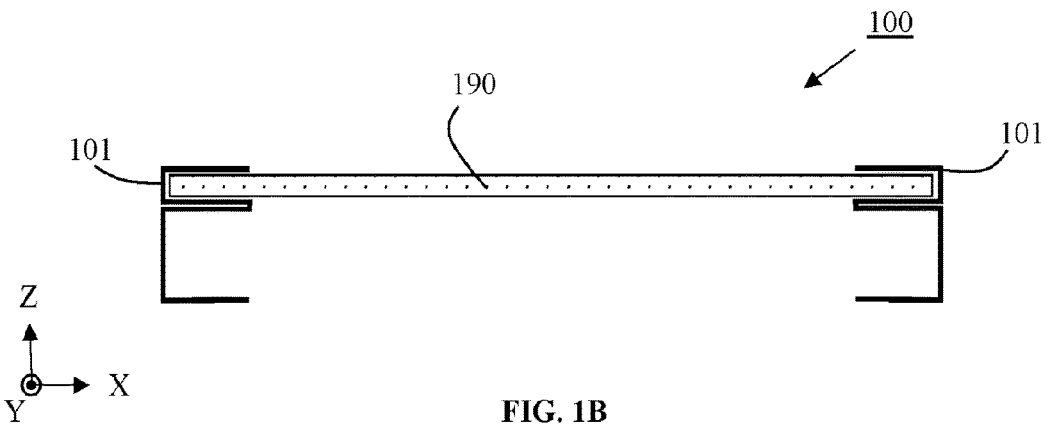
FIG. 1B is a cross-sectional view of a non-limiting example of a framed panel structure along cutline B-B of FIG. 1A according to some embodiments.
Figure 1C:
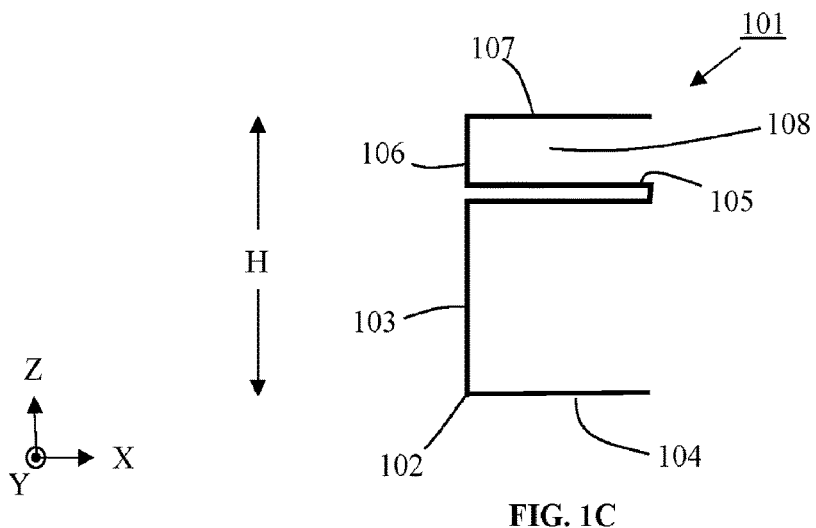
FIG. 1C is the cross-sectional view from FIG. 1B showing a non-limiting example of just the frame according to some embodiments.

FIG. 1A is a plan view of a non-limiting example of a framed panel structure 100 (e.g., a framed solar panel structure, a solar panel module, or PV module) including panel 190 (e.g., a solar panel) encased in or otherwise supported by a frame 101 according to some embodiments. FIG. 1B is a cross-sectional view of the framed panel structure 100 along cutline B-B. For added perspective, XYZ coordinate axes are also shown. FIG. 1C is the cross-sectional view as in FIG. 1B but excluding the panel to further illustrate some of the features of the frame 101.

In some embodiments and as discussed in more detail herein, frame 101 may be formed from substantially a single frame precursor structure that can be bent in predetermined regions to accommodate three corners of the solar panel, perhaps with the fourth corner forming a joint between two ends of the frame precursor structure. That is, frame 101 may in some cases include a first corner bend 112 corresponding to a first corner of panel 190, a second corner bend 114 corresponding to a second corner of panel 190, a third corner bend 116 corresponding to a third corner of panel 190, and even a corner joint 118 corresponding to a fourth corner of panel 190.

Referring to FIGS. 1B and 1C, frame 101 may include a framework material that has been cut and folded into a desired shape. Frame 101 may be characterized by a height H and may include a lengthwise fold 102 defining an intersection of a frame sidewall 103 with a bottom flange 104. The frame may further include a series of folds to form a panel containment structure 191 including a lower shelf 105, an optional pocket wall 106, an optional top lip 107, and perhaps even a pocket region 108. In some embodiments, the bottom flange may generally represent, or be provided at or near, the base of the frame (the "frame base region") or framed panel structure. In some cases, a bottom flange may be referred to as a frame base. The panel 190 may be received onto the lower shelf, e.g., into a portion of the pocket region and secured in place, optionally with a sealant that may have adhesive properties (not shown). Some non-limiting examples of sealants may include curable liquid silicone, urethane, epoxy, resin, any other liquid seal, or the like. Alternatively, or in combination, a pressure sensitive adhesive tape may optionally be used to secure the panel in the pocket region. In some embodiments, a panel containment structure may include only a lower shelf, or alternatively, only a lower shelf and a pocket wall. In such embodiments, the panel may optionally be secured in place using a sealant or pressure sensitive adhesive as described above. Herein, a panel containment structure also be referred to as a panel interface structure. In some embodiments, only some of the frame sections may include a panel containment structure, for example, only frame sections on one set of opposing sides of a rectangular or square panel.

Although FIGS. 1B and 1C show non-limiting examples where the bottom flange, the lower shelf, and the top lip all extend away from the frame sidewall to an equal extent, any of these features may be varied such as shorter or longer than the others or the like. The angle between the frame sidewall and bottom flange is shown to be approximately 90°, e.g., in a range of about 85° to about 95°, but in some other embodiments, the angle may be outside of that range, e.g., in a range of about 45° to about 135° perhaps depending on other features of the structure and overall system design. In some embodiments, the lower shelf and bottom flange may remain approximately parallel, e.g., within about 40°, alternatively within about 30°, about 20°, about 15°, about 10°, or even about 5°, regardless of the angle between the frame sidewall and the bottom flange. The top lip is shown to be parallel with the lower shelf, but in some embodiments, it may be at a slight angle or curved at the end perhaps so that the opening of the pocket region may be larger or smaller than the pocket wall. In the embodiment illustrated in FIGS. 1B and 1C, the lower shelf 105 is shown as being formed from, or including multiple layers of, framework material. In some embodiments, any or all of the frame features (e.g., a sidewall, bottom flange, lower shelf, pocket wall, upper lip, support wall, or the like) may be formed from or include multiple layers of framework material. In some cases, multiple layers may provide increased strength to the frame.

FIGS. 1A, 1B, and 1C illustrate a conventional rectangular panel shape that may be common for solar panels. However, there is no particular limitation on the shape of the panel which may be any shape such as polygon having 3, 4, 5, 6 7, 8 or more sides. The sides of the polygon may have the same length, or alternatively some sides may be longer or shorter. The corner angles of the polygon may all be the same, or alternatively, some corner angles may have smaller or larger angles than others. Although frames and frame sections herein are generally shown as having a bottom flange, in some embodiments, one or more frame sections may not include a bottom flange. In some embodiments where the frame has a rectangular shape, the frame sections corresponding to the shorter sides of the frame may not include a bottom flange whereas the frame sections corresponding to the longer sides of the frame may include a bottom flange.

Making the frame or a frame section substantially from a single piece of framework material may have considerable manufacturing, assembly, and cost advantages. However, the panel containment structure in some embodiments may be formed using alternative methods and materials. For example, the lower shelf may include a piece of shelf material bonded (e.g., welded, brazed, soldered, glued, riveted, or the like) to an upper portion of the frame sidewall. Similarly, the top lip may include a piece of top lip material bonded to the top of the frame structure. Alternatively, the entire panel containment structure may be a separate structure designed to sit on, slip over, or otherwise mate with the frame sidewall. As discussed elsewhere herein, rather than one elongated piece of framework material, a 4-sided frame may be formed from 2, 3, or even 4 separate frame sections (or more or if the frame has more than 4 sides). Although not illustrated in FIGS. 1A-1C, the frame or framed panel structure may further include a support wall extending from the bottom flange to the panel containment structure or to the frame sidewall, as described in more detail elsewhere herein. It should be noted that, throughout this disclosure, an upper portion and top lip may in some cases refer to general positions relative to the bottom flange or the base of the frame, and does not necessarily indicate a position or orientation in the final framed panel structure, which may be oriented in a manner other than horizontal as shown in FIG. 1B (e.g., at an angle, on its side, or even partially or fully inverted).

Figure 2A:
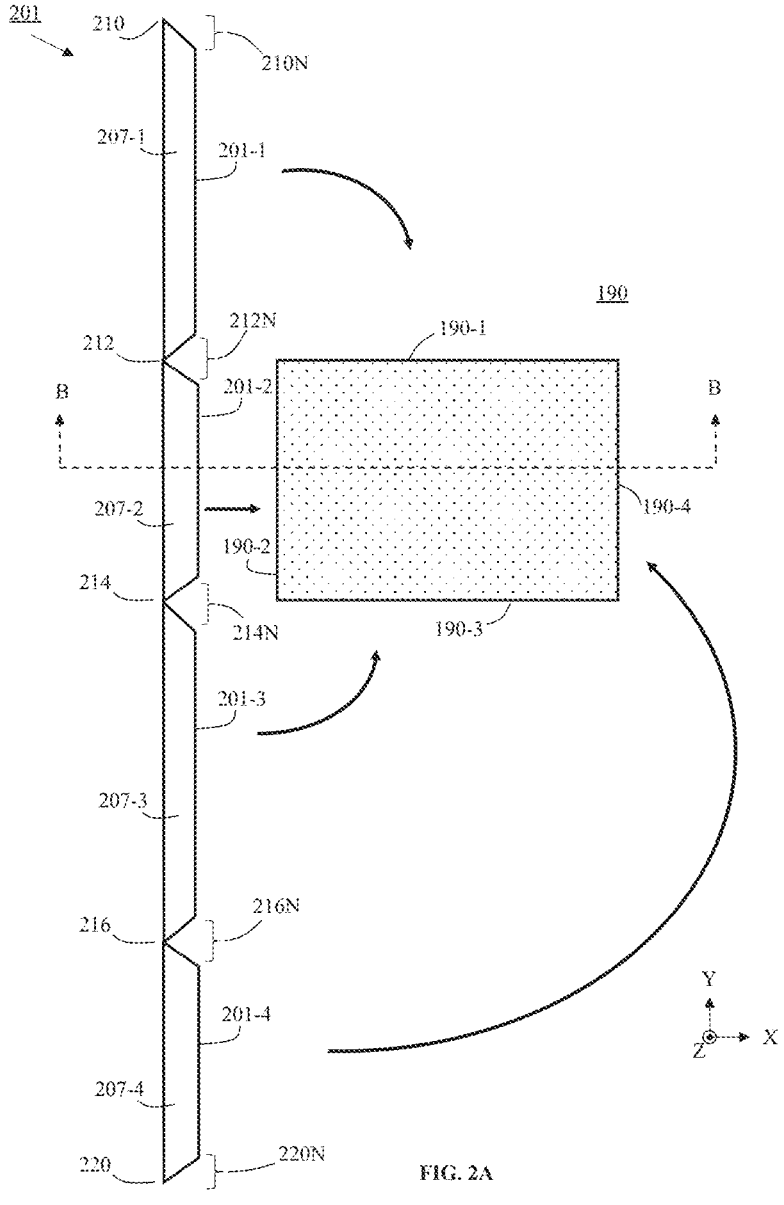
FIG. 2A is a plan view of a non-limiting example of a frame precursor structure and a panel prior to assembling a framed panel structure according to some embodiments.
Figure 2B:
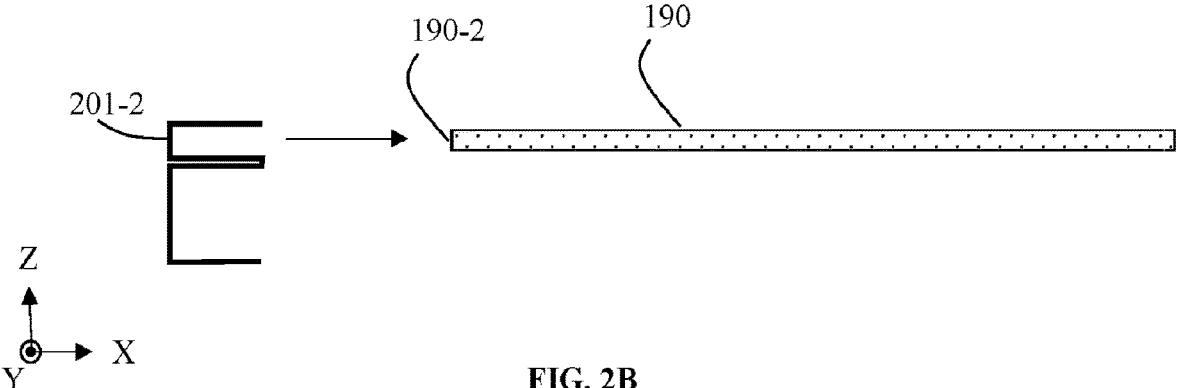
FIG. 2B is a cross-sectional view of a non-limiting example of a frame precursor structure and a panel along cutline B-B of FIG. 2A according to some embodiments.

FIG. 2A is a plan view schematic to generally illustrate construction of a framed panel structure according to some embodiments. FIG. 2B is a cross-sectional view of FIG. 2A along cutline B-B. A frame precursor structure 201 may be formed from framework material characterized by an average thickness. Frame precursor structure 201 may include a first end 210 and a second end 220 defining a lengthwise dimension. The frame precursor structure 201 may include a first frame section 201-1 designed to fit with or otherwise engage first panel edge 190-1 of panel 190, a second frame section 201-2 designed to fit with or otherwise engage second panel edge 190-2, a third frame section 201-3 designed to fit with or otherwise engage third panel edge 190-3, and even a fourth frame section 201-4 designed to fit with or otherwise engage fourth panel edge 190-4. For example, a lower shelf of a frame section may engage a bottom surface of the panel at a panel edge area associated with that frame section. Frame precursor structure 201 may include a first corner bend precursor axis 212 between the first and second frame sections and may be designed to bend along the Z axis (the height axis) of the frame sidewall. In a finished framed panel structure, first corner bend precursor axis 212 can correspond to first corner bend 112 (FIG. 1A). Similarly, frame precursor structure 201 may include second and third corner bend precursor axes 214 and 216, respectively.

Figure 2C:
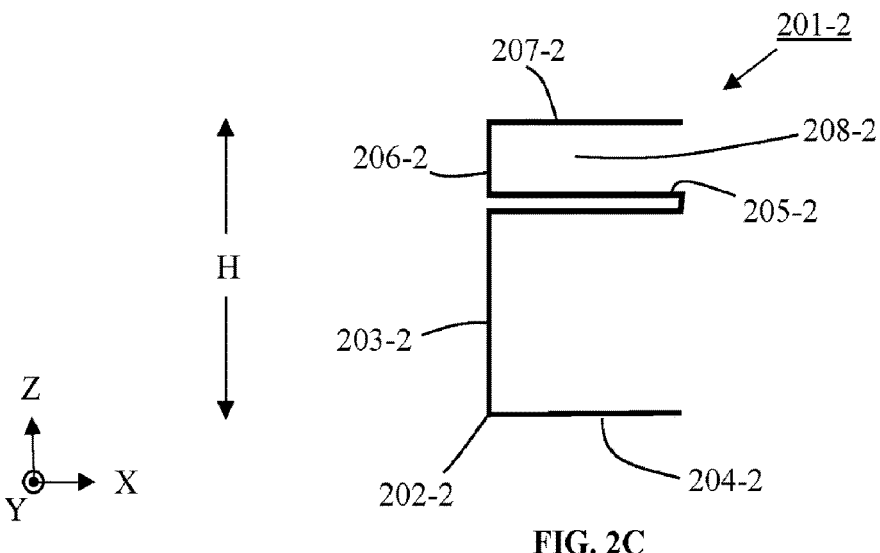
FIG. 2C is the cross-sectional view from FIG. 2B showing a non-limiting example of just the frame precursor structure according to some embodiments.

Referring to FIG. 2B, the cross-sectional structure correlates to that of FIG. 1B for the finished frame. FIG. 2C is the cross-sectional view as in FIG. 2B but excluding the panel to further illustrate some non-limiting examples of the features of the frame precursor structure, in particular, frame section 201-2. Here, second frame section 201-2 may be characterized by height H and may include a lengthwise fold 202-2 perhaps defining an intersection of a frame sidewall 203-2 with a bottom flange 204-2. The second frame section may include a series of folds to form a panel containment structure 291 including a lower shelf 205-2, an optional pocket wall 206-2, an optional top lip 207-2 and perhaps even a pocket region 208-2. In some embodiments, the bottom flange may generally represent, or be provided at, the base of the frame section. In some embodiments, a panel containment structure may include only a lower shelf, or alternatively, only a lower shelf and a pocket wall. Panel edge 190-2 of panel 190 may be received onto the lower shelf, e.g., into a portion of the pocket region and secured in place, optionally with some sealant (not shown). For example, lower shelf 205-2 may engage a bottom surface of the panel at a panel edge area associated with panel edge 190-2. In some embodiments, each frame section of the frame precursor structure may have substantially the same cross-sectional structure as shown for the second frame section 201-2 in FIG. 2B. But in some other embodiments, there may be differences between cross-sectional structures of two or more of frame sections. In the embodiment illustrated in FIGS. 2B and 2C, the lower shelf 205-2 is shown as being formed from, or including multiple layers of, framework material. In some embodiments, any or all of the frame section features (e.g., a sidewall, bottom flange, lower shelf, pocket wall, upper lip, support wall, or the like) may be formed from or include multiple layers of framework material. In some cases, multiple layers may provide increased strength to the frame.

In order to accommodate bending, the frame precursor structure may include a series of notches (212N, 214N, 216N) in the top lip, the lower shelf, and even the bottom flange, such notches corresponding to first, second, and third corner bend precursor axes, 212, 214, and 216, respectively. In FIG. 2A, the notches are only visible in the top lip (between top lip 207-1 and top lip 207-2, between top lip 207-2 and top lip 207-3, and between top lip 207-3 and top lip 207-4), but similar notches may also be present perhaps in the lower shelf and bottom flange. In some embodiments, the angle of the notch may be about 180° minus the angle of the panel corner being enclosed. Similarly, the ends of the frame precursor structure may also include an angled cut (210N and 220N) in the top lip, the lower shelf, and the bottom flange to accommodate formation of a corner joint.

Figure 2D:
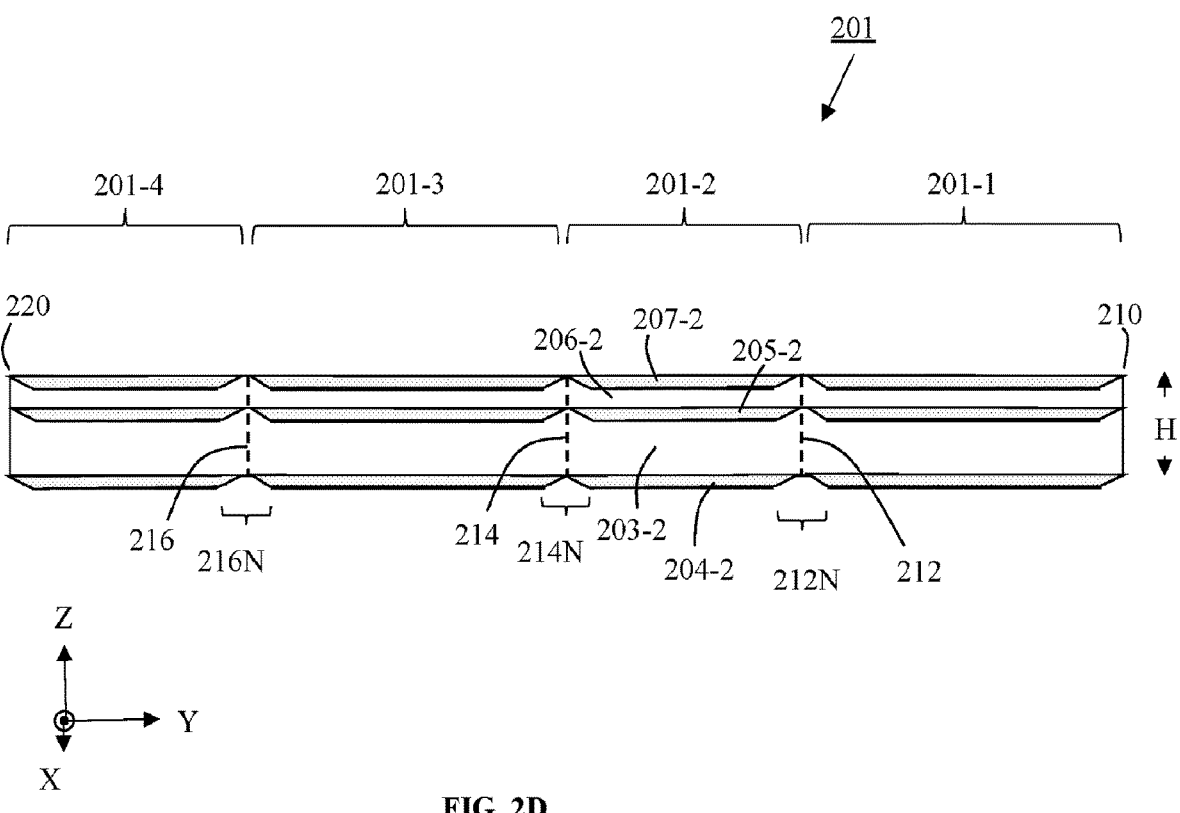
FIG. 2D is a side view with slight elevation of a non-limiting example of a frame precursor structure according to some embodiments.

In FIG. 2D, there is shown a non-limiting example of a side view schematic (with slight elevation) of the frame precursor structure facing the side that can receive the panel. For clarity, not all of the features are labelled, but in combination with the other figures, the identity of each feature is self-evident.

Figure 2E:
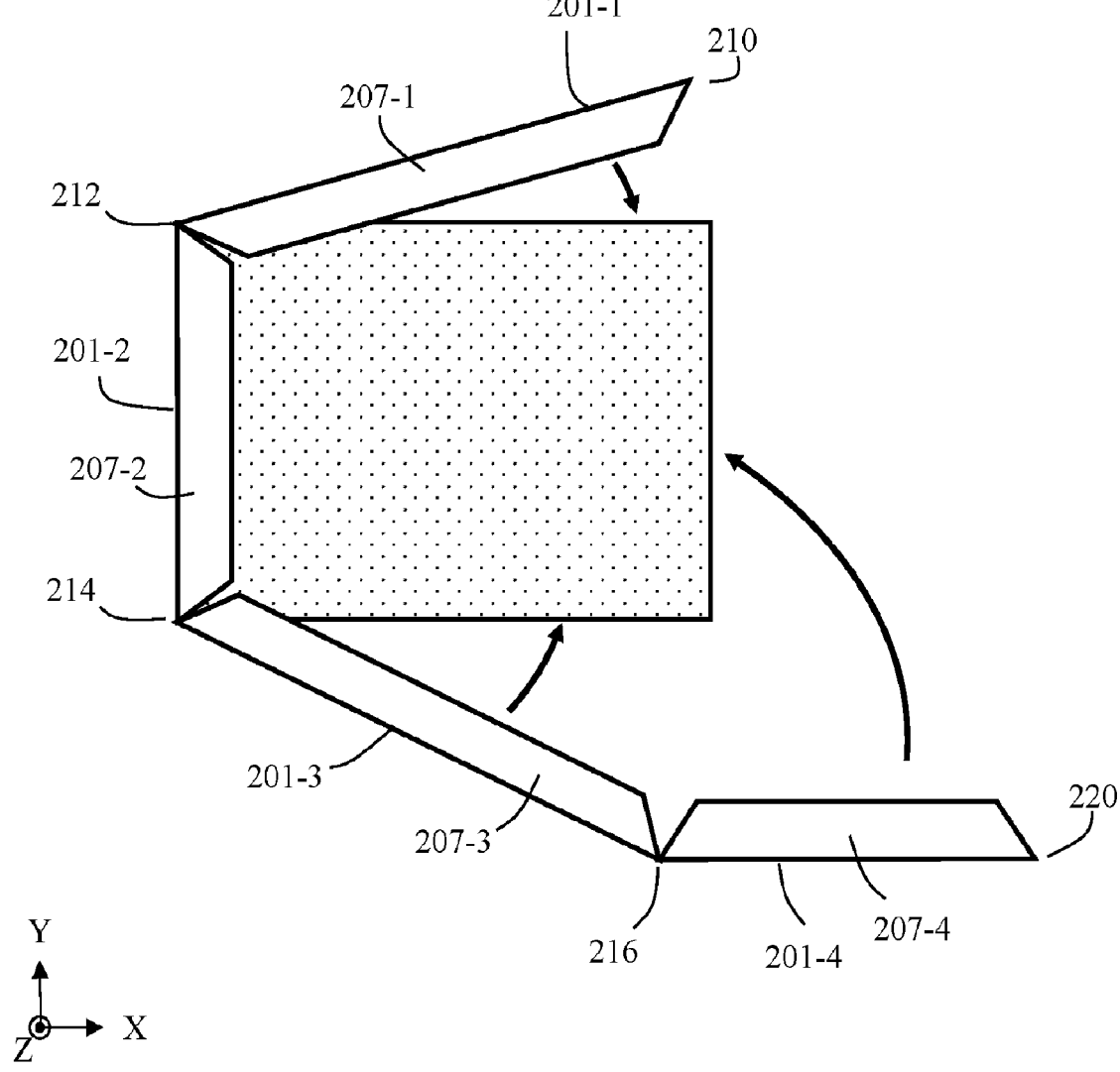
FIG. 2E is a plan view of a non-limiting example of a frame precursor structure and a panel at an intermediate stage of assembly according to some embodiments.

Referring to FIG. 2E, there is a plan view showing a non-limiting example of an intermediate state of assembling the framed panel structure where frame section 201-2 of the frame precursor structure has engaged the panel edge area of panel edge 190-2 and bends are being formed along the bend precursor axes as other frame sections move closer to their intended final positions around the panel. Note that assembly does not have to start with panel edge 190-2 but may instead start with any panel edge or corner. Forming the corner joint 118 (see FIG. 1A) where the two ends (210 and 220) of the frame precursor structure meet may be a final step in this portion of the framed panel structure assembly, but there may be additional steps to further secure or modify the frame (e.g., adding optional support brackets, tightening optional bolts, or the like). In some embodiments, assembling the framed panel structure may include use of an assembly apparatus that holds and manipulates the panel and frame precursor structure(s). With respect to orientation of the components during assembly relative to the assembly apparatus, the plan view of FIG. 2E may represent a view from above, or alternatively a view from below, or even a view from the side, depending on the nature of the assembly apparatus.

In some embodiments, the corner bends and/or corner joints may include features capable of forming interlocking structures. For example, a bottom flange or other portion on one side of the corner may include a locking element that may be received into an on the other side of the corner.

Although not illustrated in FIGS. 2A-2E, one or more frame sections may further include a support wall extending from the bottom flange to the panel containment structure or to the frame sidewall, as described in more detail elsewhere herein.

In some embodiments, the frame precursor structure 201 may be substantially linear (as shown) prior to assembling the framed panel structure. In some embodiments, the frame precursor structure may be received by an assembler perhaps already partially bent at one or more corner bend precursor axes. One or more corner bend precursor axes may be pre-scored or include a furrow or features that promote bending along the height access between the frame sections.

The frame and frame precursor structures described in FIGS. 1A-C and 2A-E are non-limiting examples provided in order to illustrate how some of the frame support sub-structures and frame support walls described below may be implemented in a frame. Alternative designs and structures may be used effectively with such support structures. In some embodiments, rather than using one frame precursor structure, multiple frame precursor structures may be used to enclose a panel. For example, with a rectangular panel, two similar frame precursor structures, each having one corner bend precursor axis may be used to form a framed panel structure that may include two corner joints at opposite corners and two corner bends at opposite corners. Alternatively, a first frame precursor structure may have two corner bend precursor axes and a second frame precursor structure may have no corner bend precursor axes and be used to form a framed panel structure that may include two corner joints at adjacent corners and two corner bends also at adjacent corners. Alternatively, three frame precursor structures may be used where one may have one corner bend precursor axis and the other two may not, whereby a framed panel structure may include one corner bend and three corner joints. Alternatively, four frame precursor structures may be used wherein none have a corner bend precursor axis and the framed panel structure may include four corner joints.

Figure 3:
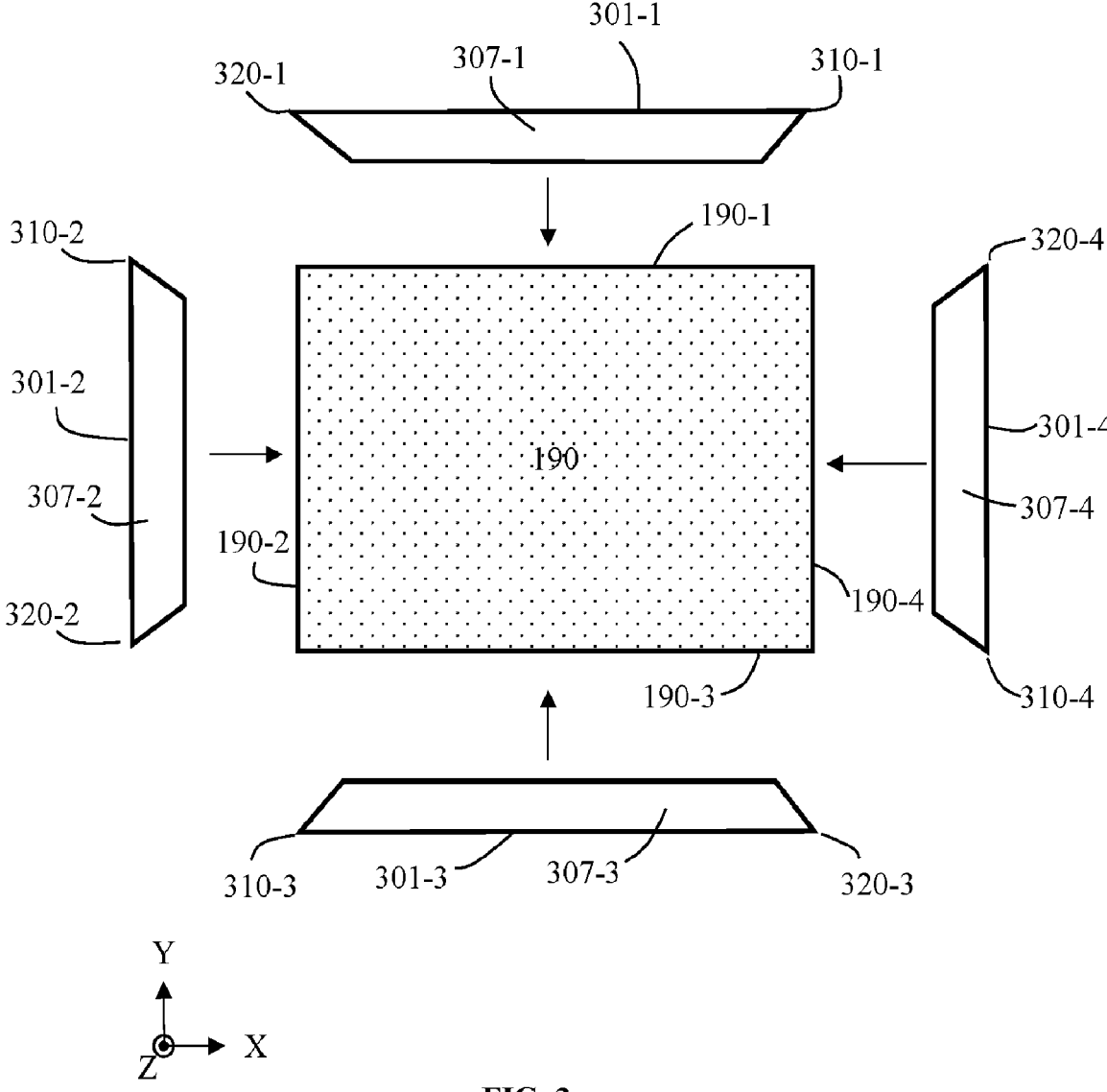
FIG. 3 is a plan view showing a non-limiting example of assembling a frame using four frame precursor structures according to some embodiments.

FIG. 3 is a plan view showing a non-limiting example of assembling a frame using four frame precursor structures according to some embodiments. Each frame precursor structure (each of which may also be referred to herein as a frame section) 301-1, 301-2, 301-3, 301-4 may optionally include any of the features described elsewhere, such as a bottom flange, a side wall, and even a panel containment structure that may include a lower shelf, an optional pocket wall and an optional top lip. In some cases, one or more frame sections may further include a support wall extending from the bottom flange to the panel containment structure or to the frame sidewall as discussed elsewhere herein. In this view, only the top lip 307-1, 307-2, 307-3, 307-4 of each frame precursor structure is visible. Each frame precursor structure may have a first end 310-1, 310-2, 310-3, 310-4 and a second end 320-1, 320-2, 320-3, 320-4. When assembled, a first end of one frame precursor structure may form a corner joint with a second end of an adjacent frame precursor structure. As discussed with respect to FIG. 2E, the plan view of FIG. 2E may represent a view from above, or alternatively a view from below, or even a view from the side, depending on the nature of the assembly apparatus.

As indicated by the arrows, a first frame precursor structure may be designed to fit with or otherwise engage a first panel edge 190-1 of panel 190, a second frame precursor structure 301-2 may be designed to fit with or otherwise engage a second panel edge 190-2, a third frame precursor structure 301-3 may be designed to fit with or otherwise engage third panel edge 190-3, and even a fourth frame precursor structure 301-4 may be designed to fit with or otherwise engage fourth panel edge 190-4. There are numerous variations regarding the sequence used to assemble the frame. In some embodiments, all four frame precursor structures can concurrently be brought together with their respective panel edges and attached at approximately the same time. In some cases, attachment may be sequential and may be in any order. In some embodiments, just two or three frame precursor structures are concurrently brought together with their respective panel edges and the remaining frame precursor structures are attached later or already pre-attached. In some embodiments, two or three of the frame precursor structures may be first attached to each other via a corner joint connection and then attached to the panel. In some cases, a frame precursor structure may initially be brought together with its respective panel edge at an angle rather than flush or parallel. In some cases, the choice of assembly sequence may in part be dependent upon the design of the corner joint and optional corner joint connection to be used. In some embodiments, corners joint connection may, for example, be made using clinching, rivets, screws, nuts/bolts, welding, adhesives, or some other connection method or mechanism. Note that a weld or welding may refer to any type of weld or welding including, but not limited to, gas welding, arc welding, resistance welding, energy beam welding, solid-state welding, friction welding, fusion welding, or some other welding.

In some embodiments, a finished frame (whether made from a continuous piece or from multiple frame section pieces) may further include one or more cross bars that may extend from one frame section to an opposite or adjacent frame section. In some embodiments with respect to a rectangular frame, a cross bar may extend between the two longest opposing frame sections. In some cases, a cross bar may connect two opposing frame sections at about their middle areas. Cross bars may act to strengthen the frame. A cross bar may be connected to the frame at the bottom flange, a frame sidewall, or at some other frame feature including, but not limited to, support walls. In some embodiments, a cross bar structure may include an upper surface upon which the panel may rest or optionally be adhered to. In some cases, cross bars may be readily attached as part of the panel mounting process (e.g., as discussed in FIGS. 2E and 3). That is, an additional separate step may not be needed in some cases. In some embodiments, the cross bars may be formed of the framework material used for the rest of the frame. In some embodiments, the cross bars may use a different material.

Figure 4A:
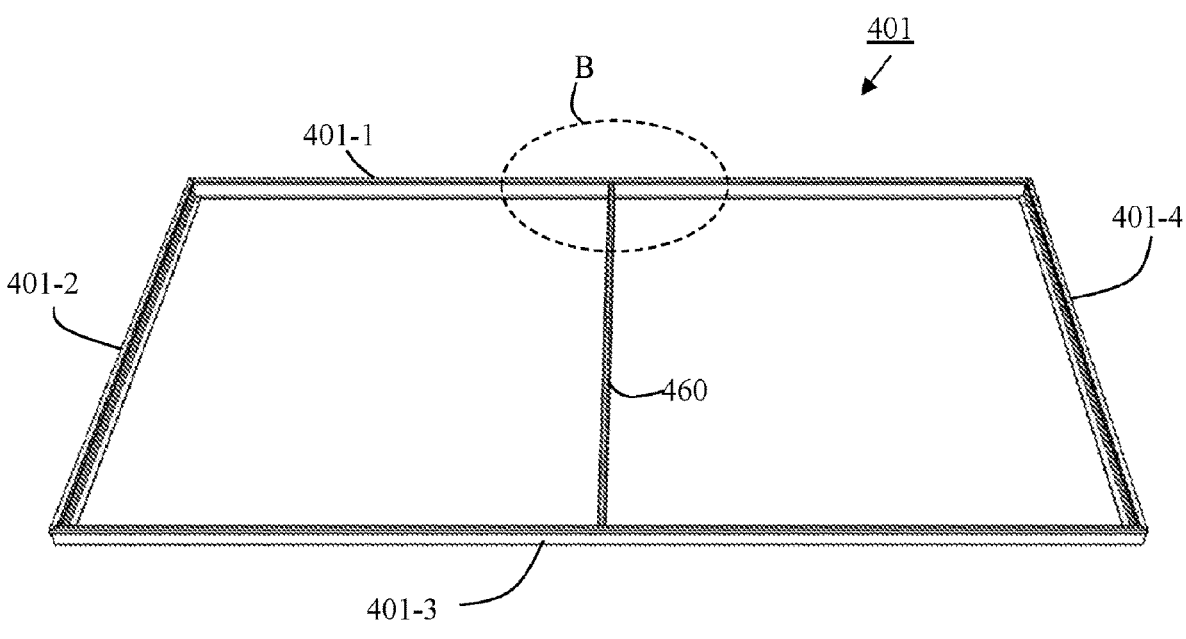
FIG. 4A is a perspective view of a non-limiting example of a frame that includes a cross bar according to some embodiments.

FIG. 4A is a perspective view of a non-limiting example of a frame that includes a cross bar according to some embodiments. For clarity, the framed panel is not shown. In some cases, frame 401 may include a first frame section 401-1, second frame section 401-2, third frame section 401-3, and even fourth frame section 401-4. Cross bar 460 may be connected to opposing frame sections 401-1 and 401-3. In some embodiments, connection may, for example, be made using clinching, crimping, rivets, screws, nuts/bolts, welding, adhesives, or some other connection method or mechanism, or the like.

Figure 4B:
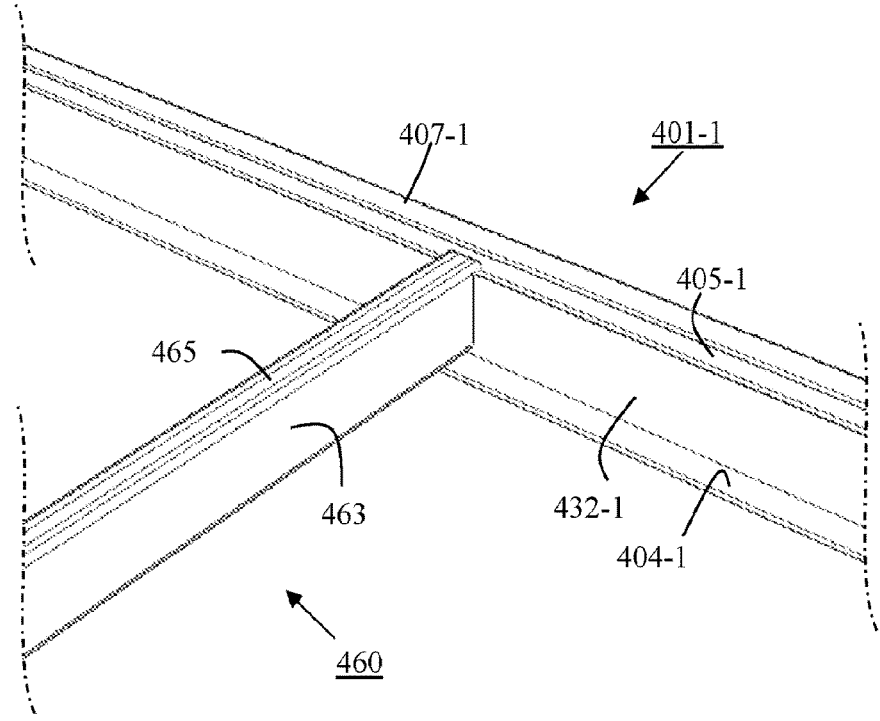
FIG. 4B is a zoomed in view of area B from FIG. 4A according to some embodiments.

FIG. 4B is a zoomed in view of area B from FIG. 4A. In some cases, first frame section 401-1 may optionally have a box frame structure as described below. Frame section 401-1 may, for example, include a bottom flange 404-1, a support wall 432-1, lower shelf 405-1, top lip 407-1, and frame sidewall (not visible in this view). In some embodiments cross bar 460 may include a cross bar top surface 465 and cross bar sidewall 463. Cross bar 460 may optionally have a box type of structure including another sidewall (not visible in this figure) opposite cross bar sidewall 463 and a bottom flange or bottom surface (not visible in this figure) opposite cross bar top surface 465. In some cases, the cross bar top surface 465 may contact the panel and may optionally include an adhesive layer to help secure the panel. In some embodiments, the cross bar top surface 465 may be flush (such as at the same height) with lower shelf 405-1 of the first frame section. In some embodiments, cross bar 465 may be connected to the first frame section at the frame sidewall, bottom flange, support wall, or any combination.

The framework material should have sufficient strength to support the panel. In some embodiments, the framework material may include a metal such as uncoated steel, coated steel, stainless steel, aluminum, or another metal or metal alloy (perhaps coated or uncoated), or the like. In some embodiments, the framework material may be a coated metal such as coated steel or the like that includes an anti-corrosion coating or treatment. For example, coated steel may include metallic-coated steel, organic-coated steel, or tinplate. Some non-limiting examples of metallic coatings for steel may include zinc and zinc alloys (e.g., a Zn—Al alloy), aluminum, magnesium, or the like. Depending on the coating, such metallic coatings may be applied by hot dip galvanization, electro-galvanizing, thermal spray, or the like. Some non-limiting examples of organic coatings may include polyesters or PVDF, which may be applied from a paint or other coatable mixture. Tinplate may be made by coating tin onto the cold-rolled steel, e.g., by electroplating. In some embodiments, the thickness of coated steel for use as a framework material may be in a range of about 0.5 to about 0.6 mm, alternatively about 0.6 to about 0.7 mm, alternatively about 0.7 to about 0.8 mm, alternatively about 0.8 to about 0.9 mm, alternatively about 0.9 to about 1.0 mm, alternatively about 1.0 to about 1.2 mm, alternatively about 1.2 to about 1.4 mm, alternatively about 1.4 to about 1.6 mm, alternatively about 1.6 to about 1.8 mm, alternatively about 1.8 to about 2.0 mm, or any combination or permutation of ranges thereof, or the like. When a coated steel framework material may be used to make a frame for a conventional photovoltaic solar panel, in some embodiments, the thickness may be in a range of about 0.7 to about 1.4 mm.

In some embodiments, steel may be a steel other than stainless steel. For some applications, e.g., for photovoltaic solar panels, steel may have a useful combination of technical and commercial benefits. Steel can have properties that may be applied in the material selection, fabrication, and long-term durability that are useful to the form and function of the frame or frame precursor structure product. During preproduction, steel may be readily coated with anti-corrosion coatings employing multiple chemistries that offer corrosion resistance which can be beneficial to the durability of the frames. Steel may be painted with clear or specific colors that may optionally allow identification of a specific module selection of various categories. Because painting or anti-corrosion coatings may be applied in high-speed manufacturing formats, the cost and durability are more effective than most other metals. Steel may optionally be both painted and have anti-corrosion coatings, allowing for multiple benefits to the branding, module identification, and long-term maintenance over non-steel module frames.

Steel is a highly durable material that may be significantly deformed while retaining its toughness and resistance to structural failure. The properties of toughness while being deformed may be referred to as ductility. Due to the ductility of steel, it may be shaped starting from a thin sheet of material, e.g., wrapped around a coil, which may be fed directly into a punching station that may employ a variety of methods to cut or partially cut or create grooves in the face of the steel sheet. Following this process, the steel which has been modified in the punching station may be fed into a linear and non-linear set of rollers which can deform the steel sheet into a new profile, of which many variations are possible. Due to the ductility of steel, this process may be performed at high speed, with production speeds from less than about 0.1 meters/second to over about 4.0 meters/second. Steel's compatibility with this high-speed forming process may provide significant manufacturing cost advantages. Due to steel's ductility, it may be bent into simple or complex shapes that will retain their relative shape or position for the life of the product. In some embodiments, steel that has been shaped into simple or complex forms may also be designed to yield or partially yield at specific locations or along a predetermined path as part of intended installation or operational parameters.

Steel has electrical properties which may allow it to act as a code-approved path of intended electricity, such as to create an electrical ground or electrical bonding. Due to the properties of steel and the potential anti-corrosion or paint coatings available, the electrical ground or electrical bonding may still occur without the need for additional hardware or devices. When steel module frames are attached directly to a steel structure, most electrical codes allow for this connection to be considered a competent electrical ground or electrical bond. This means that the framed panel structures may connect directly to a steel substructure and may be considered to have achieved sufficient electrical ground or electrical bond sufficient to meet code, with or without addition of hardware, as part of the module-to-substructure attachment.

Steel's magnetic properties may allow for special features and benefits through the use of magnetic steel frames. The magnetic properties of steel may allow for simple attachments of appurtenances utilizing few or no added hardware. Steel's magnetic properties may allow for sensory devices to collect useful data during the manufacture of a frame precursor structure or data regarding a panel installation. Steel's magnetic properties may allow for robot sensors to be used to assist in the proper installation or deinstallation of panel modules. Steel's magnetic properties may allow the easy attachment or pre-attachment of hardware of various sorts to the module frame to facilitate installation of additional equipment.

In some cases, the frame precursor structure may be fabricated from an elongated sheet of the framework material that can be bendable and cuttable. The elongated sheet may be cut, for example, using a water cutter, a laser, a punch, a saw, or the like, depending on the framework material. The cuts may be used to form some of the various features described herein such as notches, holes, furrows or other features. After at least some of the cuts have been made, the elongated sheet may be folded to form at least a portion of the frame precursor structure. Such folding may include, but is not limited to, roll forming. In some embodiments, the cutting and folding processes may be applied to a coated steel-based framework material.

Figure 5:
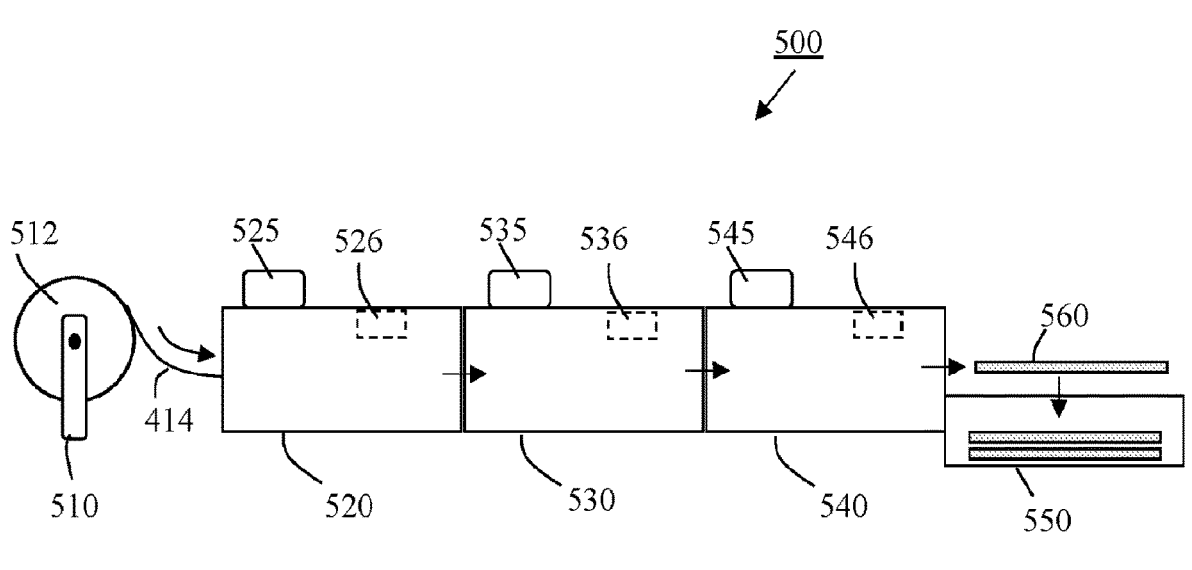
FIG. 5 is a schematic diagram of a non-limiting example of a manufacturing process line for making frame precursor structures according to some embodiments.

FIG. 5 is schematic diagram showing a non-limiting example of a manufacturing process line for making frame precursor structures according to some embodiments. Manufacturing process line 500 may include a framework material station 510 having framework material that may be fed into the next station. In some embodiments, the framework material may be in the form of sheets that are pre-cut to the final desired length. In some embodiments, the framework material may be fed continuously to the next station. For example, framework material station 510 may include a coil 512 of coated steel 514. The coated steel 514 may be supplied to punching station 520. For example, the punching station 520 may pull the coated steel 514 from the coil. In some embodiments, certain cutting and/or punching processes may be performed at punching station 520 to cut and/or remove predetermined sections of the framework material to make a patterned framework material. In some embodiments, the framework material may be cut to a desired length at the punching station, if such cut has not yet been performed. In some embodiments, the process may be controlled to high tolerances. Punching station 520 may include a microprocessor 525 and machine software and/or firmware that may control the cutting. Punching station 520 may include one or more sensors 526 that provide data to the microprocessor which may be used to monitor the punching processes or identify defects. The microprocessor 525 may be in electronic communication with another microprocessor or with an external computer for sending or receiving data or instructions. Such electronic communication may be through cables or wireless methods.

After the punching station 520, the patterned framework material, e.g., coated steel or the like, may be received by a roll forming station 530. The steel may be shaped in a linear fashion using multiple rollers that provide a graduated bending process to form the steel into the desired shape such as shaped framework material. The design of the rollers, order of the rollers, and tolerances may be highly precise, and may result in a fully, or even nearly fully, shaped and punched frame precursor structure. Roll forming station 530 may include a microprocessor 535 and machine software and/or firmware that may control the roll forming. Roll forming station 530 may include one or more sensors 536 that provide data to the microprocessor which may be used to monitor the bending and folding processes or identify defects. The microprocessor 535 may be in electronic communication with another microprocessor or with an external computer for sending or receiving data or instructions. Such electronic communication may be through cables or wireless methods. In some embodiments, the framework material may be cut to a desired length at the roll forming station, if such cut has not yet been performed. In some embodiments, the roll forming station may include an adhesive applicator tool to apply an appropriate adhesive to a predetermined portion of the framework material while shaping framework material, e.g., to help the shaped framework material to maintain its shape.

After the roll forming station 530, the shaped framework material, e.g., coated steel, may be received by a post forming station 540. Some non-limiting examples of post forming processes may include cutting the frame precursor structures to length, buffing/deburring, cleaning, or even passing the frame precursor structures through straightening rollers or dies that may ensure product accuracy. Post forming station 540 may include a microprocessor 545 and machine software and/or firmware that may control one or more post forming processes. Post forming station 540 may include one or more sensors 546 that provide data to the microprocessor which may be used to monitor the post forming processes or identify defects or out-of-tolerance parts. These data may be fed back to roll forming station 530 for active adjustment of roll forming rollers or adjustment rollers. Post forming station 540 may include a cleaning section. The microprocessor 545 may be in electronic communication with another microprocessor or with an external computer for sending or receiving data or instructions. Such electronic communication may be through cables or wireless methods.

After the post forming station 540, finished, or even nearly finished, frame precursor structures 560 may be received by a finished product station 550. The frame precursor structures may be loaded into transportation containers and prepared for delivery, e.g., to a solar panel module production facility.

In some embodiments, the framework material may proceed in a generally linear, perhaps forward, direction from one station to the next. In some embodiments, the direction of framework material may be temporarily reversed within a station, for example, to repeat a particular step. In some embodiments, there may be multiple punching stations, roll forming stations, and/or post forming stations.

For any of the aforementioned stations, the microprocessor(s) may provide control signals to electro-mechanical motors that may be responsible for moving the intermediate products along the manufacturing line. Depending upon the process to be performed on the intermediate products, software/firmware running on the microprocessor(s) may dictate various factors/parameters of production. For merely some non-limiting examples, a microprocessor may dictate the speed and/or direction of the intermediate products traversing a given station. In some embodiments, a microprocessor may dictate when and/or how the intermediate products are to be shaped, punched, cut, or the like in order to affect the desired intermediate/final products. In some embodiments, a microprocessor may receive signals from one or more sensors for monitoring manufacturing progress, identifying defects or out-of-tolerance parts, or measuring some other useful property of intermediate products as they are made. For example, an optical or imaging sensor(s) may provide data that allows a microprocessor to assess manufacturing status and/or how well a particular production step was performed. In some embodiments, if quality is below standard, a microprocessor may send a status alert signal to a system operator and/or to another microprocessor. Other sensors may also be useful to monitor manufacturing status and/or quality control metrics. In addition to optical and imaging sensors, non-limiting examples of potentially useful sensors or their components may include laser-based sensors including, but not limited to, laser position sensors, vision systems including, but not limited to vision measurement and shape vision systems, contact sensors including, but not limited to contact position sensors, vibration sensors, thermal sensors, conductivity sensors, roughness sensors, profilometers, ultrasonic sensors, stress sensors, or the like.

In some embodiments, the frame or framed panel structure may be attached to a support structure that may hold the frame or framed panel structure in a predetermined position. Such support structures and systems may take many forms, but some non-limiting examples may include racking, rail mounts, pole mounts, tracking mounts, or non-tracking mounts, or the like. In combination with a support structure, a frame or framed panel structure may be attached to its intended target, including but not limited to, attachment to a building (e.g., a roof, a wall, an awning, or the like), to the ground, to a shade structure or carport, or to a moving or stationary vehicle. In some embodiments, a frame or framed panel structure may be attached directly to its intended target without an intermediate support structure. In such case, the target itself may act as the support structure.

To provide robust support and strength to the framed panel such as a solar panel, it may be useful for the frame to include one or more connection features, for example, when forming a corner joint between frame precursor structures or sections. For the purposes of describing various features and technology below, a frame, a frame precursor structure, and a frame section may be used interchangeably unless otherwise noted. In some cases, the frame may also include additional strengthening features such as cross bars that may extend from one frame section to an opposite or adjacent frame section. These additional strengthening features may also benefit from the use of one or more connection features. Similarly, in some embodiments, certain connection features may be used to attach a framed panel structure to a support structure such as racking.

In some embodiments, the frame or frame sections illustrated in FIGS. 1-3 may benefit from additional structural support features, such as frame support substructures, perhaps to improve the strength of the frame in some way to address various forces it may experience when used in a framed panel structure. For example, such additional support may enable the frame to hold larger panels (e.g., PV laminates), withstand greater environmental and/or handling forces (e.g., wind, snow, mounting, clamping, bending, torsional stresses, or the like), or increase PV module lifetime by reducing the number or intensity or of stress points, or improving their distribution. In some cases, structural support features may enable the use of framework materials that are thinner, easier to handle, or less expensive.

In some embodiments a useful structural support feature, such as a frame support substructure, may include a support wall extending (i) between the bottom flange and the frame sidewall, (ii) between the bottom flange and the lower shelf, or (iii) both (i) and (ii). In some cases, a frame or frame section including a support wall, bottom flange, sidewall, and lower shelf, may be advantageously produced from a single piece of framework material. In some cases, using a single piece of framework material for these features may simplify manufacturing thereby reducing costs and increasing throughput and yield. Such single piece manufacturing may also increase the lifetime of the frame by avoiding the many failure-prone attachments points that would be needed if these features were assembled from separate parts.

Figure 6A:
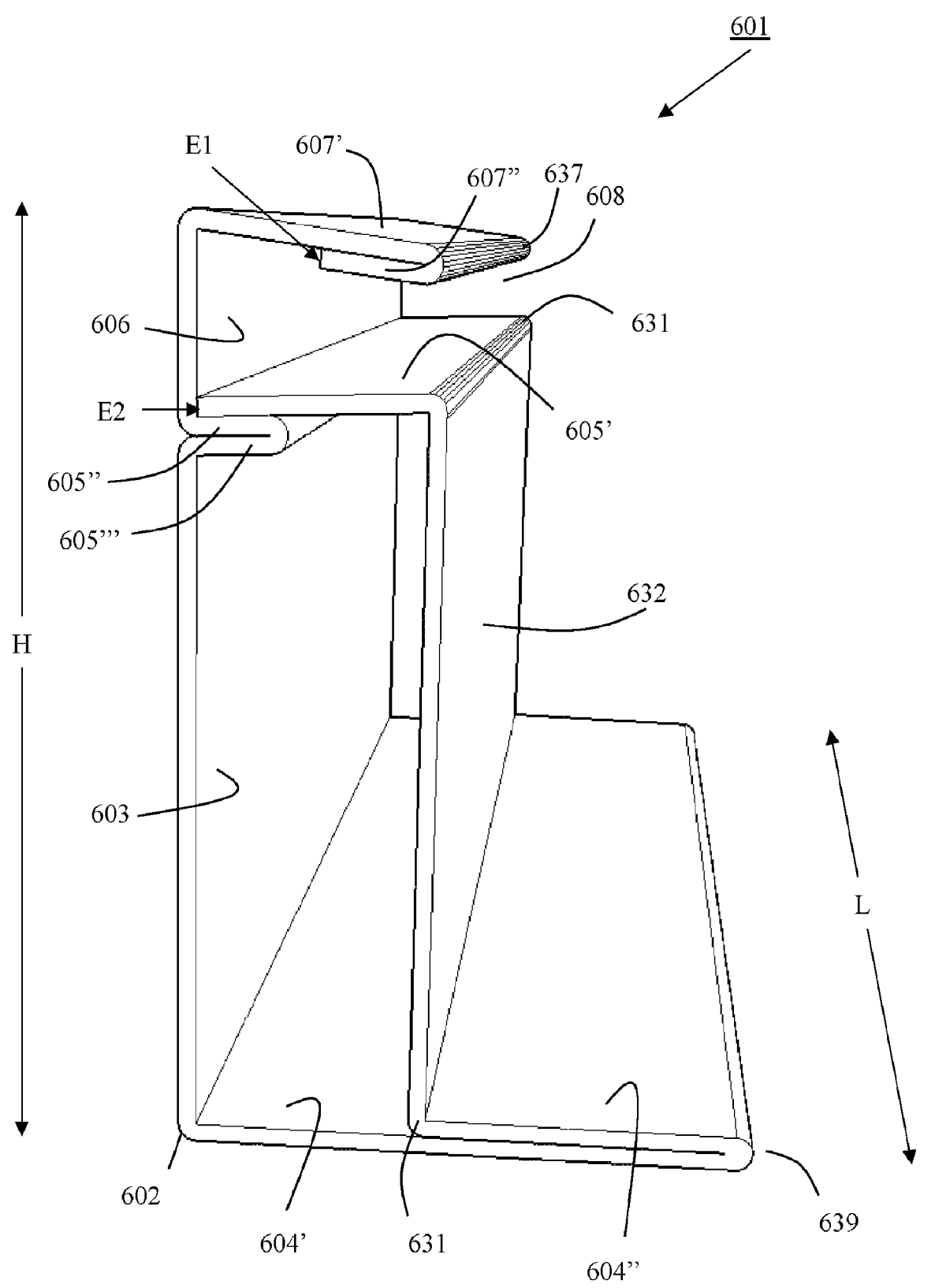
FIG. 6A is a perspective view of a cutaway portion of a non-limiting example of a frame section including a support wall according to some embodiments.
Figure 6B:
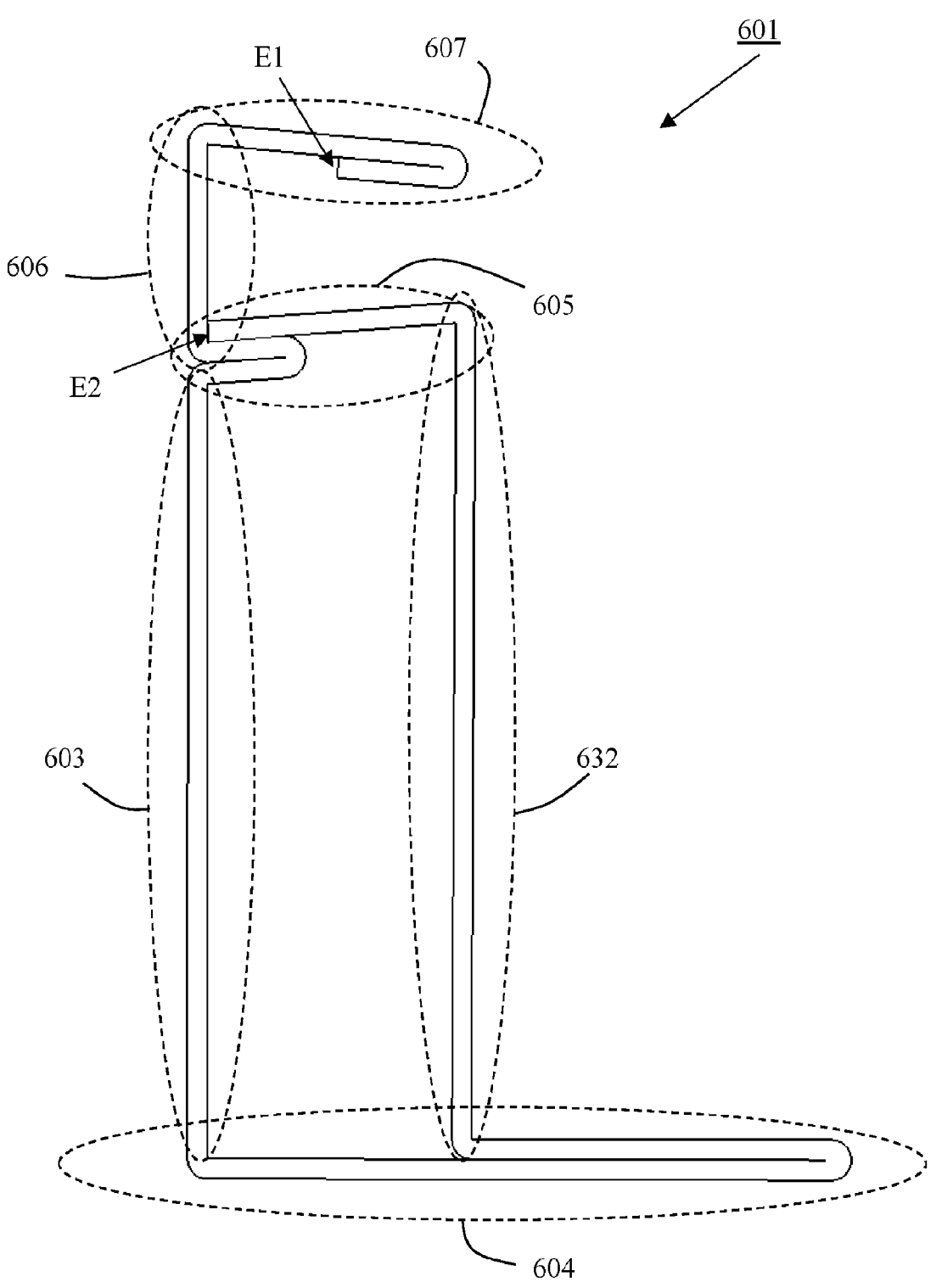
FIG. 6B is a cross-sectional view of the frame section from FIG. 6A according to some embodiments.

There are many embodiments of useful frame sections that include a support wall. FIG. 6A is a perspective view of a cutaway portion of a non-limiting example of a frame section including a support wall according to some embodiments. The height H and lengthwise L axes are also shown for reference. FIG. 6B is a cross-sectional view of the frame section from FIG. 6A, but labelled in a modified manner to clarify that any of the features may include multiple layers of framework material. Frame section 601 may include a framework material that has been cut and folded into a desired shape. Frame section 601 may include a bottom flange 604 provided at the base of the frame section, which in some embodiments may include multiple layers of framework material such as bottom flange layers 604' and 604". A frame sidewall 603 may be provided at an outer portion of the frame section and characterized by a height extending from the bottom flange. In some embodiments, a lengthwise fold 602 may define an intersection of the frame sidewall 603 and the bottom flange 604, e.g., with bottom flange layer 604'. In some embodiments, the lengthwise fold 602 may correspond to the bottom or base of the frame sidewall 603. In some cases, the bottom of the frame sidewall may correspond to the end furthest from the panel containment structure. Although this may correspond to fold 602 in some embodiments, in alternative designs not illustrated in this figure, a frame sidewall may extend below at least a portion of the bottom flange. However, in general, at least a portion of the frame sidewall may extend upwards above the bottom flange. A panel containment structure may be provided at an upper portion of the frame sidewall. The panel containment structure may include at least a lower shelf 605 extending from the frame sidewall and may also include a pocket wall 606, a top lip 607, and perhaps even a pocket region 608 for containing the panel. In some embodiments, some or all of the lower shelf 605 may include multiple layers of framework material, such as lower shelf layers 605', 605", 605'''. In some embodiments, two or more lower shelf layers may be formed from a fold in the framework material at the upper portion of the frame sidewall. In some cases, the lower shelf layers 605" and 605''' formed from the fold in framework material at the upper portion of the frame sidewall may be characterized as a panel containment support feature, upon which lower shelf layer 605' rests. In some embodiments, the top lip may be formed of multiple layers of framework material, such as top lip layer 607' and top lip layer 607" which may be formed from a top lip fold 637 to form a multilayered rounded top lip edge. A support wall 632 may be provided at an inner portion of the frame section (inner relative to the frame sidewall). In some embodiments, the support wall 632 may extend between the bottom flange and the lower shelf. In some embodiments, the frame section may include a reversing flange fold 639 such that a portion 604' of the bottom flange may include a double layer of framework material. In some embodiments, another lengthwise fold 631 may define an intersection of the support wall 632 with the bottom flange structure, e.g., with portion 604'. In some cases, a lengthwise fold 633 may define an intersection of the support wall with the lower shelf 605.

Figure 6C:
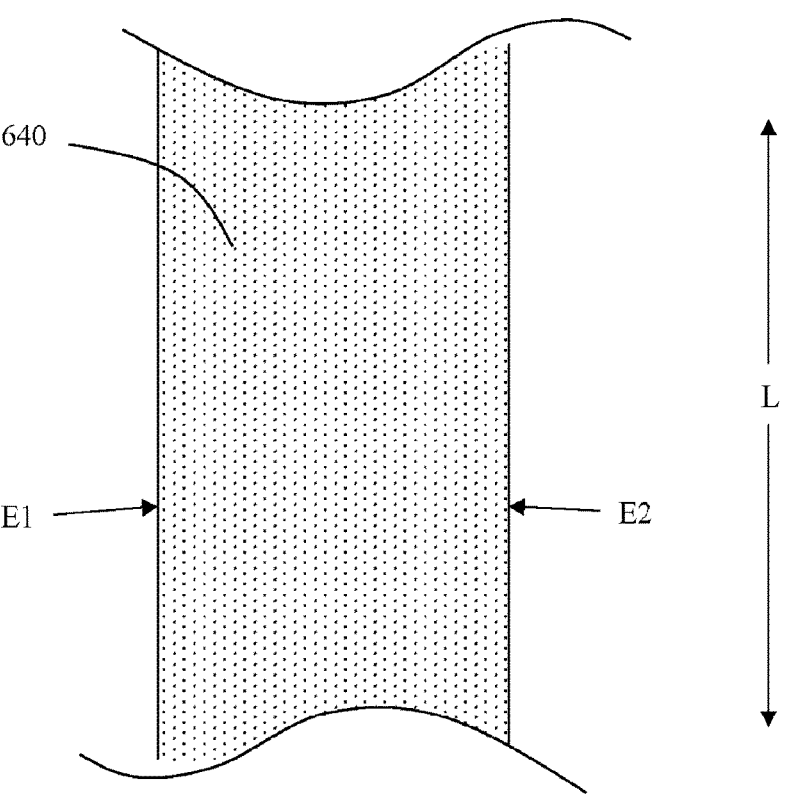
FIG. 6C is a plan view of a non-limiting example of a portion of framework material according to some embodiments.

FIG. 6C is a plan view of a non-limiting example of a portion of framework material 640 prior to any cutting, punching, or folding operations that may be used to make the frame section 601. The lengthwise dimension of the framework material is illustrated as are a first edge E1 and second edge E2, which are also labelled in FIGS. 6A and 6B. In some embodiments, such as shown in FIGS. 6A and 6B, E1 may correspond to the end of top lip layer 607" and E2 may correspond to the end of lower shelf layer 605'.

Figure 6D:
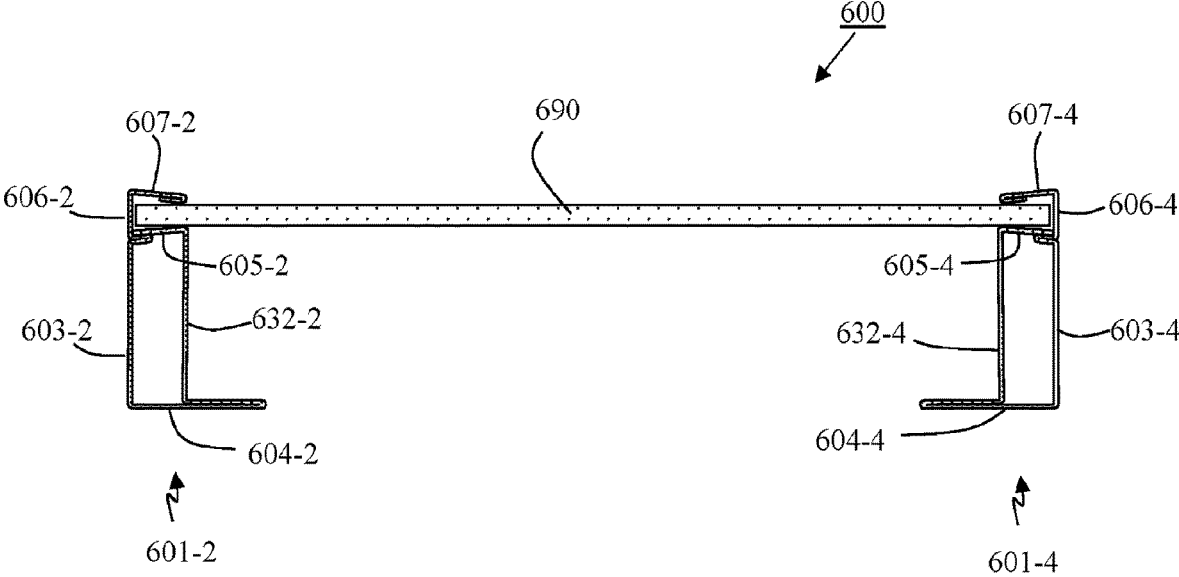
FIG. 6D-6F are cross-sectional views of non-limiting examples of a framed panel structure according to some embodiments.
Figure 6E:
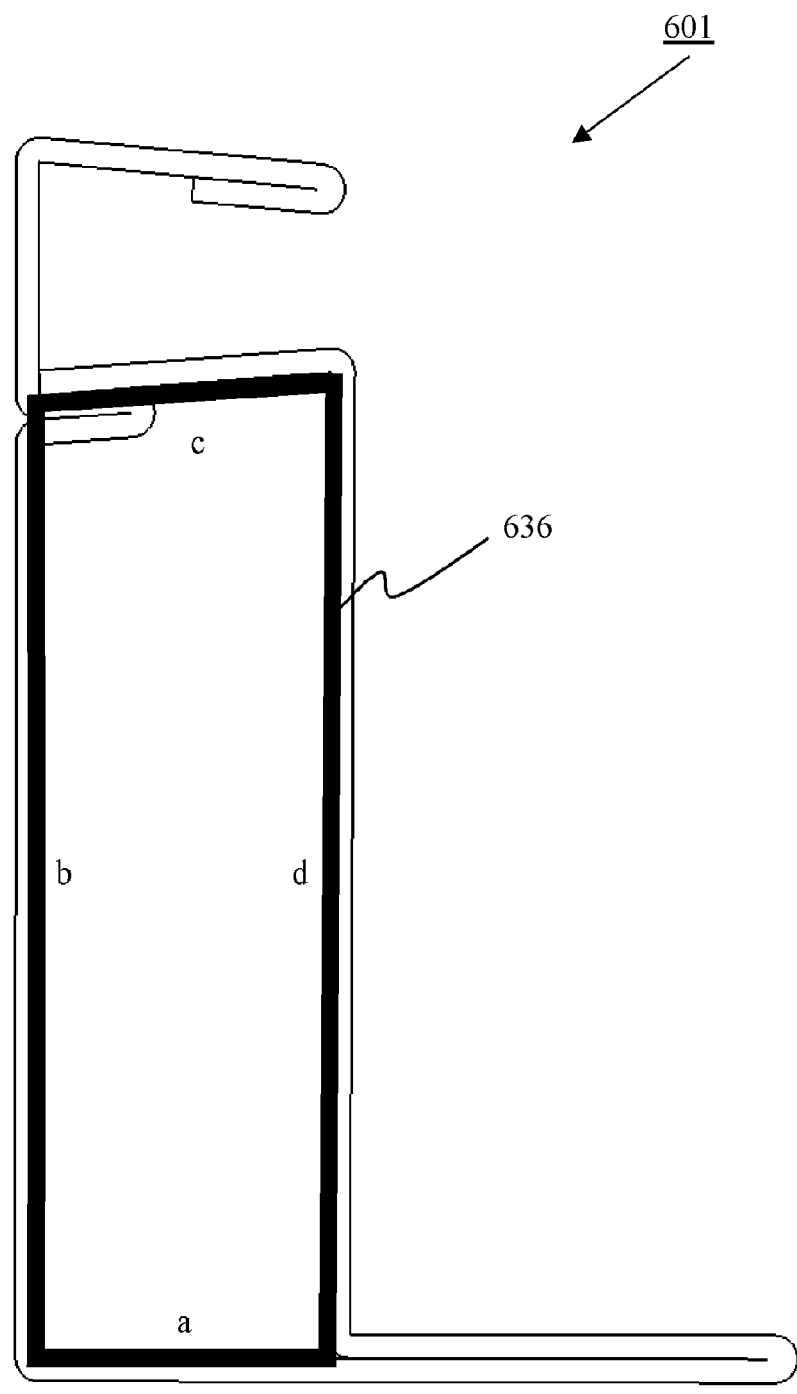
Figure 6F:
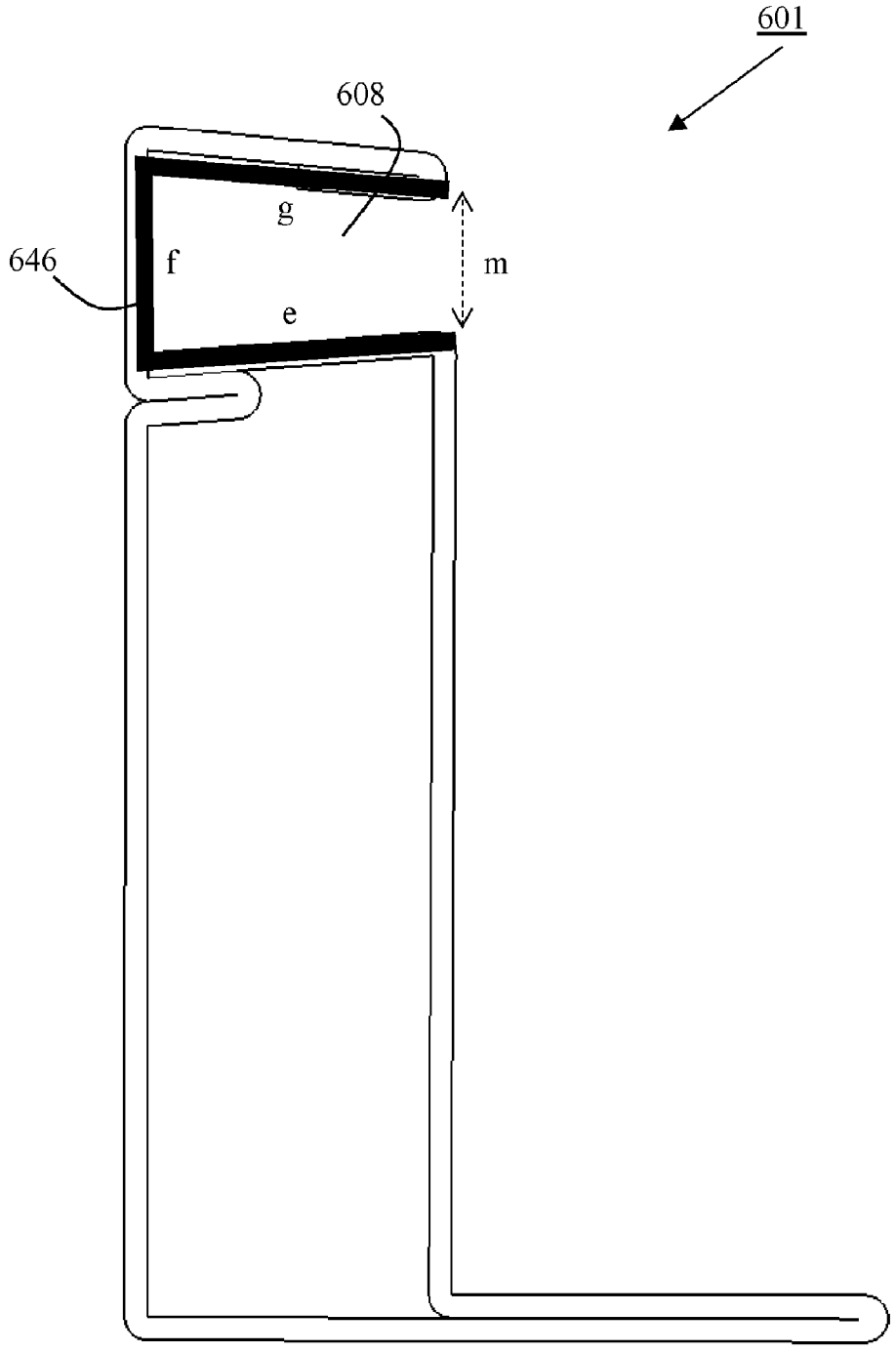

FIG. 6D is a cross-sectional view of a non-limiting example of a framed panel structure according to some embodiments. Framed panel structure 600 may include various frame sections as previously discussed, e.g., frame section 601-2 and opposing frame section 601-4. In some embodiments, each frame section may include a frame sidewall 603-2, 603-4, a bottom flange 604-2, 604-4, a lower shelf 605-2, 605-4, a pocket wall 606-2, 606-4, a top lip 607-2, 607-4, and a support wall 632-2, 632-4. The panel 690 may be received onto each lower shelf, e.g., into a portion of each pocket region (perhaps formed by the lower shelf, the pocket wall, and the top lip) and secured in place, optionally with a sealant that may have adhesive properties (not shown). The frame sidewall of a frame section may be characterized as provided at an outer portion of the frame section whereas the support wall of the same frame section may be characterized as provided at an inner portion of the frame section. An outer portion, in some embodiments may include relative to the support wall position, the frame sidewall may be generally provided further from the center of the panel. An inner portion, in some embodiments may be relative to the frame sidewall position, the support wall may be generally provided closer to the center of the panel. An outer portion and inner portion may be relative terms with respect to the frame sidewall and support wall, and do not necessarily mean the outermost part or innermost part of a frame section (although that may be the case in some embodiments). Herein, the term "outwardly" may refer to a direction generally away from the center of the panel or intended panel center, and the term "inwardly" may refer to a direction generally toward the center of the panel or intended panel center. The term "downwardly" herein may refer to a direction generally away from the plane of the panel and/or towards the frame base region, and the term "upwardly" herein may refer to a direction generally toward the plane of the panel and/or away from the frame base region.

Frames or frame precursor structures having a frame section like FIG. 6A or 6B may sometimes be referred to herein as a box frame, perhaps where the bottom flange, frame sidewall, lower shelf and support wall collectively form in cross-section an enclosed structure, in this case, one having four sides. However, a box frame may apply to any frame section that in cross section forms any enclosed shape. In some embodiments, the enclosed shape may involve at least the bottom flange, the frame sidewall, and the support wall, and have three or more apparent sides in cross section.

Although not shown in FIGS. 6A-6D, in some embodiments, a panel containment structure may only include a lower shelf 605, which may be a panel support shelf. In some cases, a panel containment structure may include a pocket wall 606 but not include a top lip 607. A pocket wall may sometimes be referred to as a panel stop.

In some embodiments, a frame in a module may be attached to a racking rail (support structure).

Figure 7A:
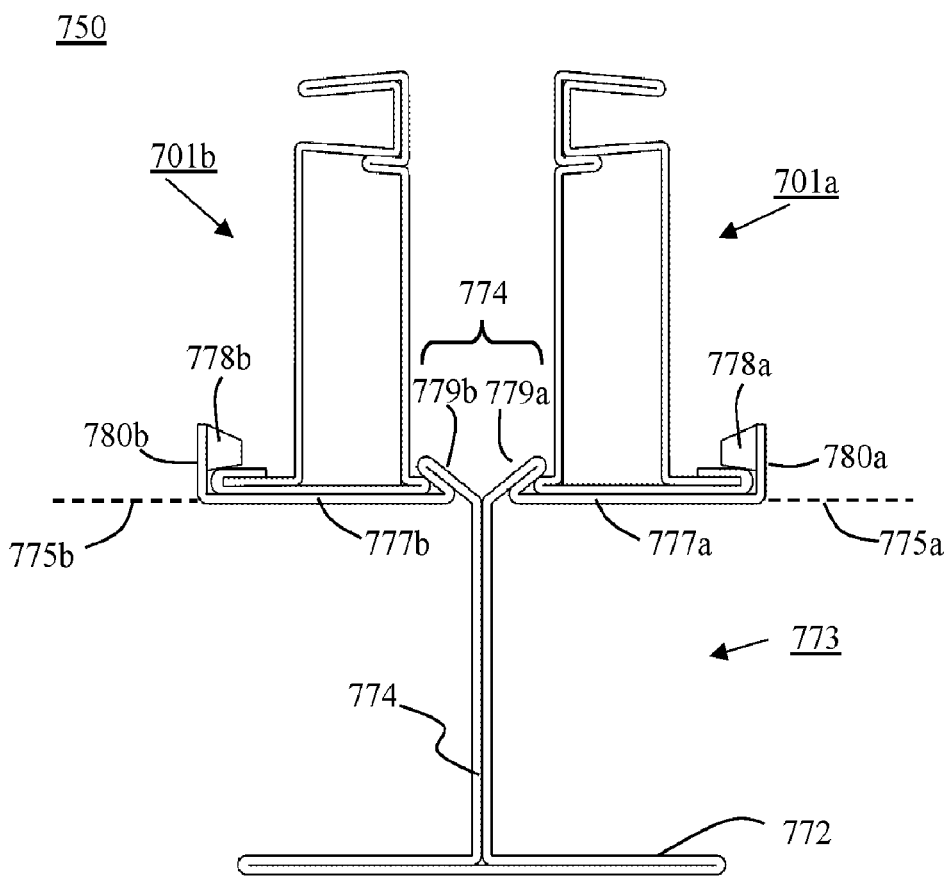
FIG. 7A is a cross-sectional view of a non-limiting example of a solar panel mounting system according to some embodiments.

FIG. 7A is a cross sectional view of a portion of a solar panel mounting system according to some embodiments. Mounting system 750 includes a support structure 773 having a first shelf 777a defining a first plane 775a for supporting a first frame section 701a of a first solar panel module (the solar panel and other frame sections not shown for clarity, but may optionally be as described in FIG. 1B or FIG. 6D or have some other structure). The support structure 773 also includes a second shelf 777b defining a second plane 775b for supporting a second frame section 701b of a second solar panel module (the solar panel and other frame sections not shown for clarity, but may optionally be as described in FIG. 1B or FIG. 6D or have some other structure). Support structure 773 may include a dividing structure 774 provided between the first and second shelves and extending above the first and second planes. In this embodiment, the dividing structure includes first and second retaining folds, 779a and 779b, respectively. Support structure 773 may include a first shelf upturn 780a provided at an end of the first shelf 777a away from the dividing structure 774 and extending above the first plane 775a. Similarly, support structure 773 may include a second shelf upturn 780b provided at an end of the second shelf 777b away from the dividing structure 774 and extending above the second plane 775b. The support structure may further include one or more movable lock tabs for engaging the first and second frame sections. There are numerous ways to provide the lock tabs. In some embodiments, one or more lock tabs may be provided in i) the dividing structure, ii) the first shelf upturn, or both (i) and (ii), for engaging a first bottom flange portion of the first frame section. Similarly, one or more second movable lock tabs may be provided in i) the dividing structure, ii) the second shelf upturn, or both (i) and (ii), for engaging a second bottom flange portion of the second frame section.

In some embodiments, the support structure may be formed at least in part from a sheet of a support structure material that has been cut and folded into a desired shape. The support structure material should have sufficient strength to support the solar panel module. In some embodiments, the support structure material may include a metal such as uncoated steel, coated steel, stainless steel, aluminum, or another metal or metal alloy (perhaps coated or uncoated), or the like. In general, materials for the support structure may be selected from any of those described elsewhere for the framework material.

Figure 7B:
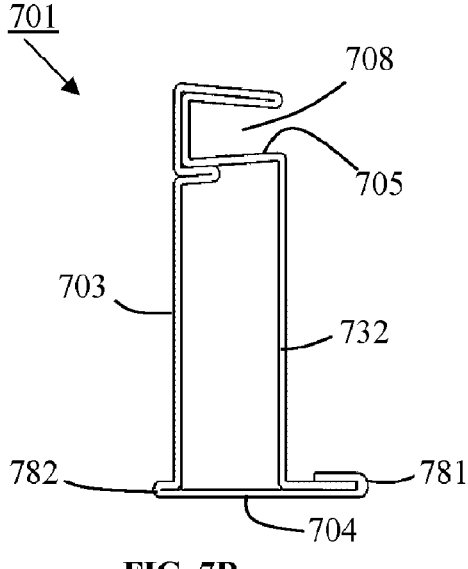
FIG. 7B is a cross-sectional view of a frame section according to some embodiments.

FIG. 7B is a cross sectional view of a non-limiting example of a frame section according to some embodiments. The structure of frame section 701 may apply to either the first frame section or the second frame section. Frame section 701 may include frame sidewall 703, a support wall 732, shelf 705, pocket region 708, and a bottom flange 704. Bottom flange 704 may include a portion 782 that extends outwardly from the frame sidewall 732 and which may be referred to herein as outer flange extension 782. Bottom flange may include a portion 781 that extends inwardly beyond the support wall 732 and which may be referred to herein as inner flange extension 781.

The bottom flange 704 on the frame section 701b as shown in FIG. 7B, may rest upon the top of the support shelf 777b and the bottom flange 704 on the frame section 701a may rest upon the top of the support shelf 777a.

Referring again to FIG. 7A, retaining fold 779a and 779b of the dividing structure may be angled to allow the retention of or engagement with the outer flange extension 782. Lock tab 778a may be provided in the first shelf upturn 780a and lock tab 778b may be provided in the second shelf upturn 780b. In operation, the lock tabs 778a, 778b may be moved (e.g., folded, rotated, bent, or the like) over and against respective inner flange extension 781 of the respective first and second frame sections, which may force each respective bottom flange 704 against the support shelf 777a and 777b. This may help retain and attach frame sections 701a and 701b securely to the support structure 773.

The retaining fold is shown as a folded structure, but it may be any structure shape that may be able to retain the outer flange extension. The outer flange extension 782 is shown as a frame section continuous fold. The inner flange extension 781 is shown as a frame section end fold attachment. The frame section continuous fold may be on either side of the frame section. The frame section continuous fold may be on both sides of the frame section.

The lock tabs 778a and 778b may be tapered on the bottom as shown. This may allow clearance to fit over the top of the inner flange extension 781. As these lock tabs are rotated, this taper may push the outer flange extension 782 under and against the retaining folds 779a and 779b. The slant of the retaining fold 779a and 779b may help push the outer flange extension 782 against the support shelf 777a and 777b. The bottom taper on the lock tabs 778a and 778b may create a high downforce on the top or top edge of the inner flange extension 781.

Support structure 773 may include a central support wall 774 extending below the first and second planes 775a and 775b. The central support wall 774 may in some cases extend down to a support base 772. Although not shown, rather than a single central support wall, there may be multiple support walls, e.g., one positioned under the first frame section and another positioned under the second frame section. The multiple support walls may also optionally extend to a support base. The shape of the support structure 773 is shown in FIG. 7A as an I-beam. This is a very strong shape, but the support structure is not limited to an I-beam shape and may be any shape.

Figure 7C:
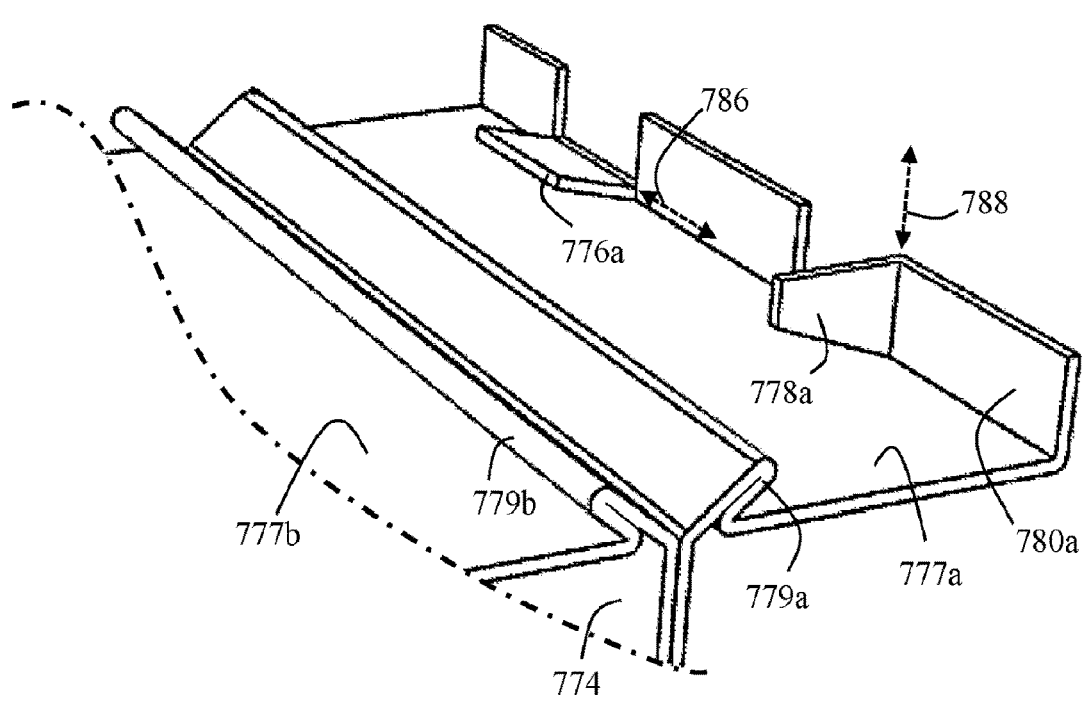
FIGS. 7C and 7D are perspective views of support structures according to some embodiments.
Figure 7D:
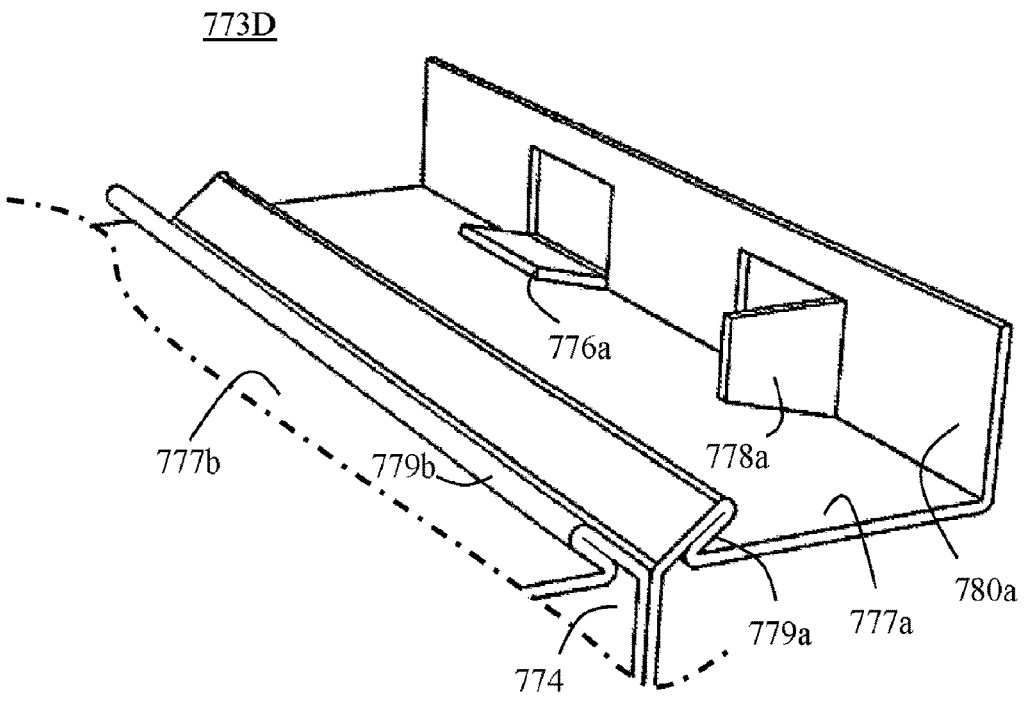

FIGS. 7C and 7D are perspective cutaway views of some non-limiting examples of support structures according to some embodiments. The features of support structures 773C and 773D may be similar to those shown with respect to FIG. 7A, but only the first shelf 777a area is generally shown for clarity in order to illustrate some lock tab options. In some cases, the lock tab may be a door tab 778a characterized by a pivot axis 788 which may be substantially orthogonal to the first plane (e.g., within 10 degrees of orthogonal). In some embodiments, the lock tab may be a fold down tab 776a characterized by a pivot axis 786 which may be substantially parallel to the first plane (e.g., within 10 degrees of parallel). Although not shown, the shelf upturn 780a may include a spring tab provided in a manner as described elsewhere herein. In FIG. 7C, there is an open space over each of the fold down tab 776a and the door tab 778a, That is, there is no support structure material over the tabs which extend all the way to the top of shelf upturn 780a. In FIG. 7D, the shelf upturn 780a is higher which shows no open space above the tabs. This higher shelf upturn may allow for stiffer and stronger tabs since the shelf upturn may not deflect as much when moving (pivoting) the respective tabs. For convenience such tab structures of FIG. 7D generally surrounded by support structure material may be referred to as framed tabs. In some embodiments, putting an additional fold at the top (end) of the shelf upturn (not shown) may allow for more lock tab force since the shelf upturn may deflect even less. Such an additional fold may be angled either toward or away from the dividing structure. The shelf upturn 780a, is shown as forming about a right angle with the support shelf 777a, but it may form a different angle. Further, although not shown, two frames may abut each other rather than engaging with a dividing structure. That is, in some cases, a dividing structure may not be present and/or extend above the first and second planes.

Figure 8A:
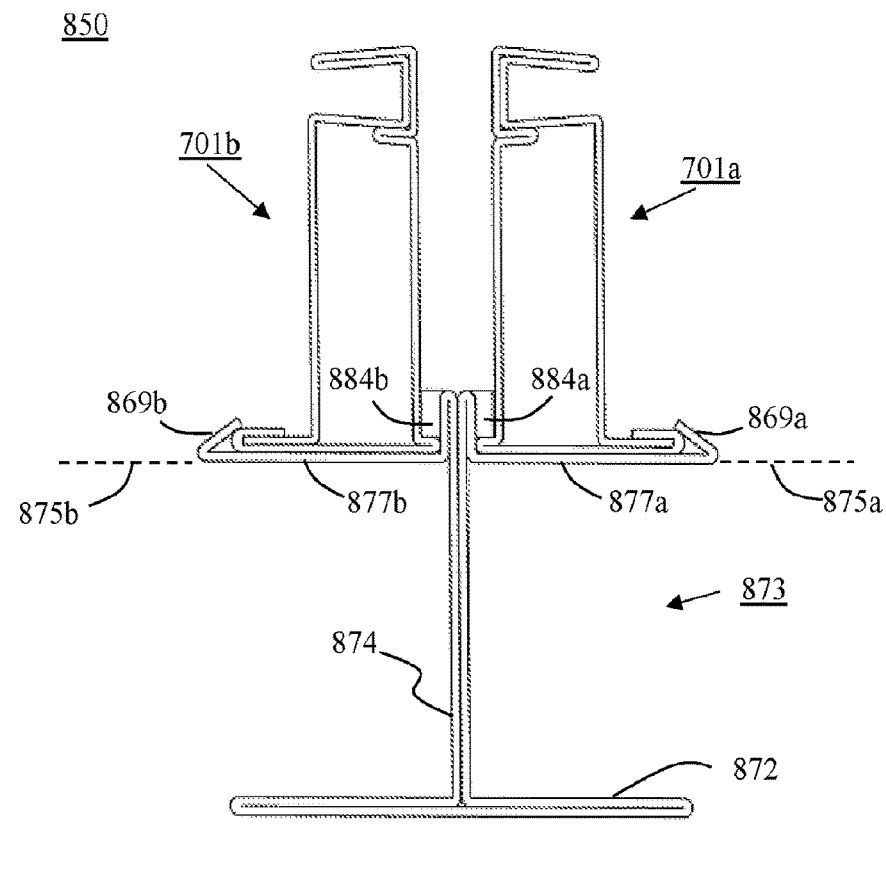
FIG. 8A is a cross-sectional view of a non-limiting example of a solar panel mounting system according to some embodiments.
Figure 8B:
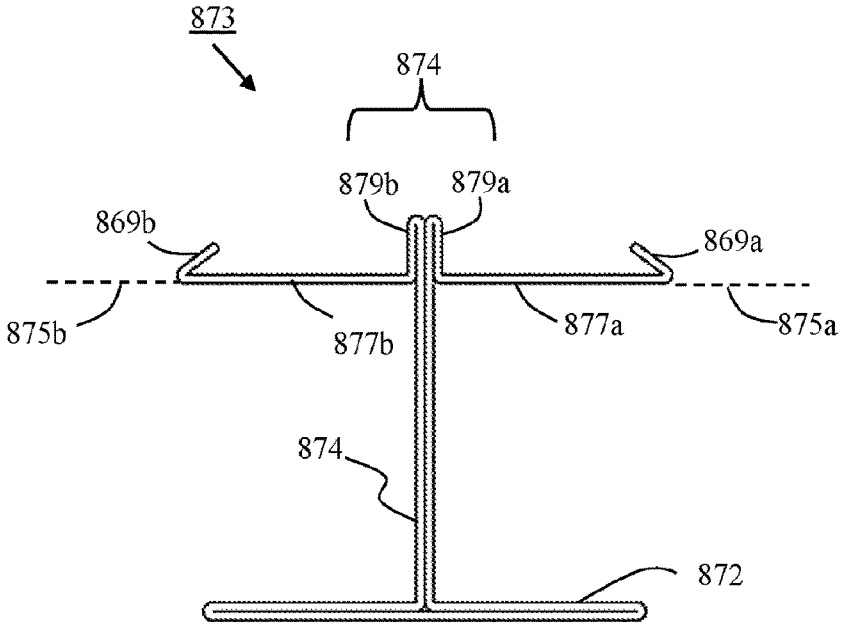
FIG. 8B is a cross-sectional view of a non-limiting example of a support structure according to some embodiments.

FIG. 8A shows a cross sectional view of a portion of another solar panel mounting system according to some embodiments. Some aspects of the mounting system of FIG. 8A may be similar to those of the mounting system of FIG. 7A. Mounting system 850 may include a support structure 873 having a first shelf 877a defining a first plane 875a for supporting a first frame section 701a of a first solar panel module. The support structure 873 also includes a second shelf 877b defining a second plane 875b for supporting a second frame section 701b of a second solar panel. Additional features of support structure 873 can be found in FIG. 8B (cross-sectional view) and FIG. 8C (perspective view). Support structure 873 may include a dividing structure 874 provided between the first and second shelves and extending above the first and second planes. In this embodiment, the dividing structure includes first and second vertical walls, 879a and 879b, respectively. Support structure 873 may include a first shelf upturn 869a provided at an end of the first shelf 877a away from the dividing structure 874 and extending above the first plane 875a. In some cases, as illustrated, the first shelf upturn may be folded at an angle relative to the first plane such that a portion of it is provided over an inner extension of the bottom flange of the first frame section (see FIG. 7B and related discussion therein for more details on the frame section). The folded first shelf upturn as shown in FIGS. 8A and 8B may also be referred to herein as a shelf turnback 869a. Similarly, support structure 873 may include a second shelf upturn 869b (which may also be referred to herein as a second shelf turnback 869b) provided at an end of the second shelf 877b away from the dividing structure 874 and extending above the second plane 875b.

Figure 8C:
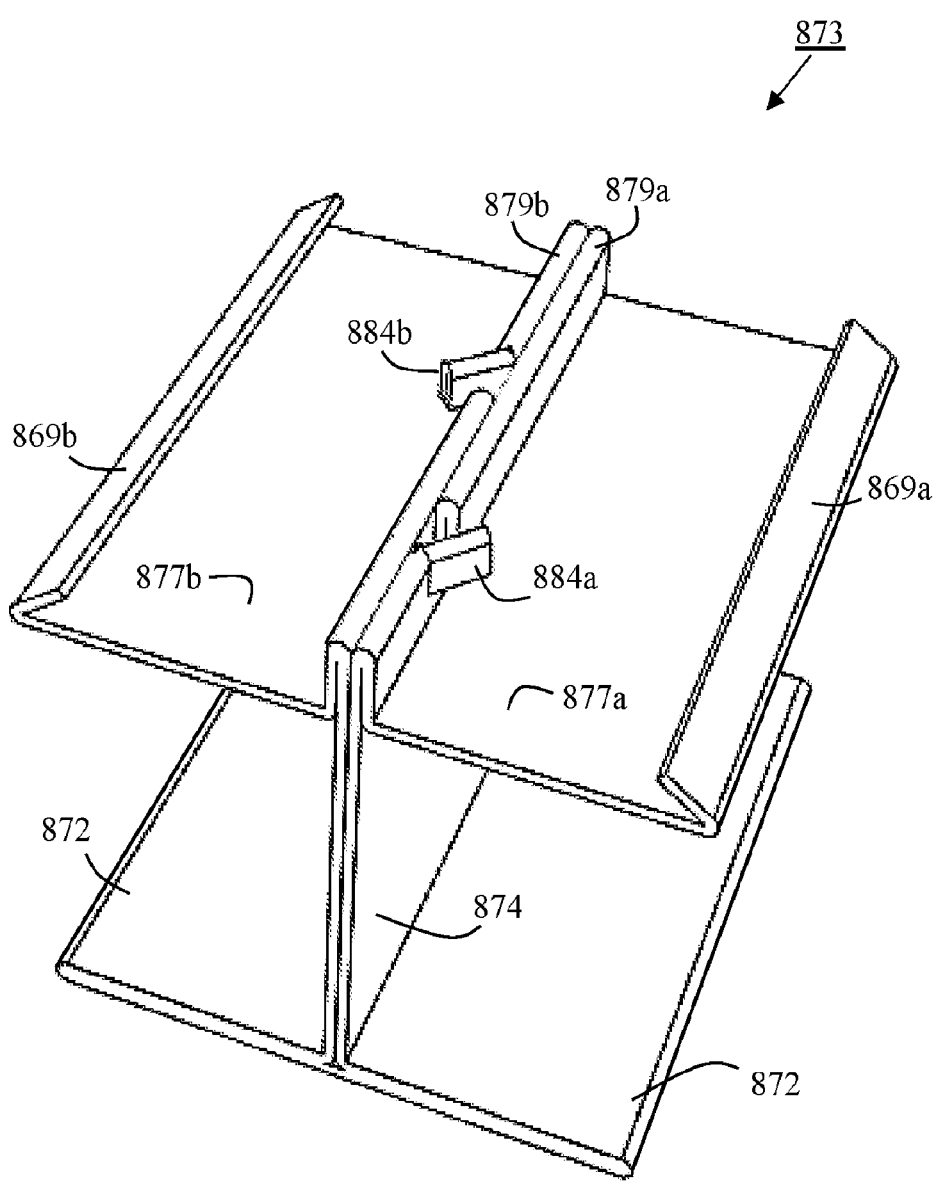
FIG. 8C is a perspective view of a non-limiting example of a support structure according to some embodiments.

The support structure may further include one or more movable lock tabs for engaging the first and second frame sections. For example, and turning again to FIG. 8A, lock tab 884a may be provided in the dividing structure, e.g., in the first vertical wall 879a, and turned to engage an outer flange extension of the bottom flange of the first frame section 701a to hold or lock the bottom flange against the shelf. Similarly, lock tab 884*b* may be provided in the dividing structure, e.g., in the second vertical wall 879*a*, and turned to engage an outer flange extension of the bottom flange of the second frame section 701*b* to hold or lock the bottom flange against the shelf. In order to more clearly illustrate the vertical walls, FIG. 8B does not show the lock tabs in the turned/bent position. Lock tabs 884*a*, 884*b* may, for example, be door tabs similar to lock tabs 778 as described in FIGS. 7A, 7C and 7D. FIG. 8C is a perspective view of support structure 873 illustrating lock tabs (door tabs) 884*a* and 884*b*. in their moved (rotated, bent, or the like) position. A tool (not shown) may be used to bend the tabs. Note that lock tabs 884*a*, 884*b* may instead be a fold-down tab or a spring tab, or a combination may be used. Although these figures illustrate first and second vertical walls, the dividing structure may include a single vertical wall and the lock tabs may instead be provided in a single, common vertical wall.

Support structure 873 may include a central support wall 874 extending below the first and second planes 875*a* and 875*b*. The central support wall 874 may optionally extend down to a support base 872. Although not shown, rather than a single central support wall, there may be multiple support walls, e.g., one positioned under the first frame section and another positioned under the second frame section. The multiple support walls may also optionally extend to a support base. The shape of the support structure 873 is shown in FIG. 8B as an I-beam. This is a very strong shape, but the support structure is not limited to an I-beam shape and may be any shape.

Figures 9A, 9B:
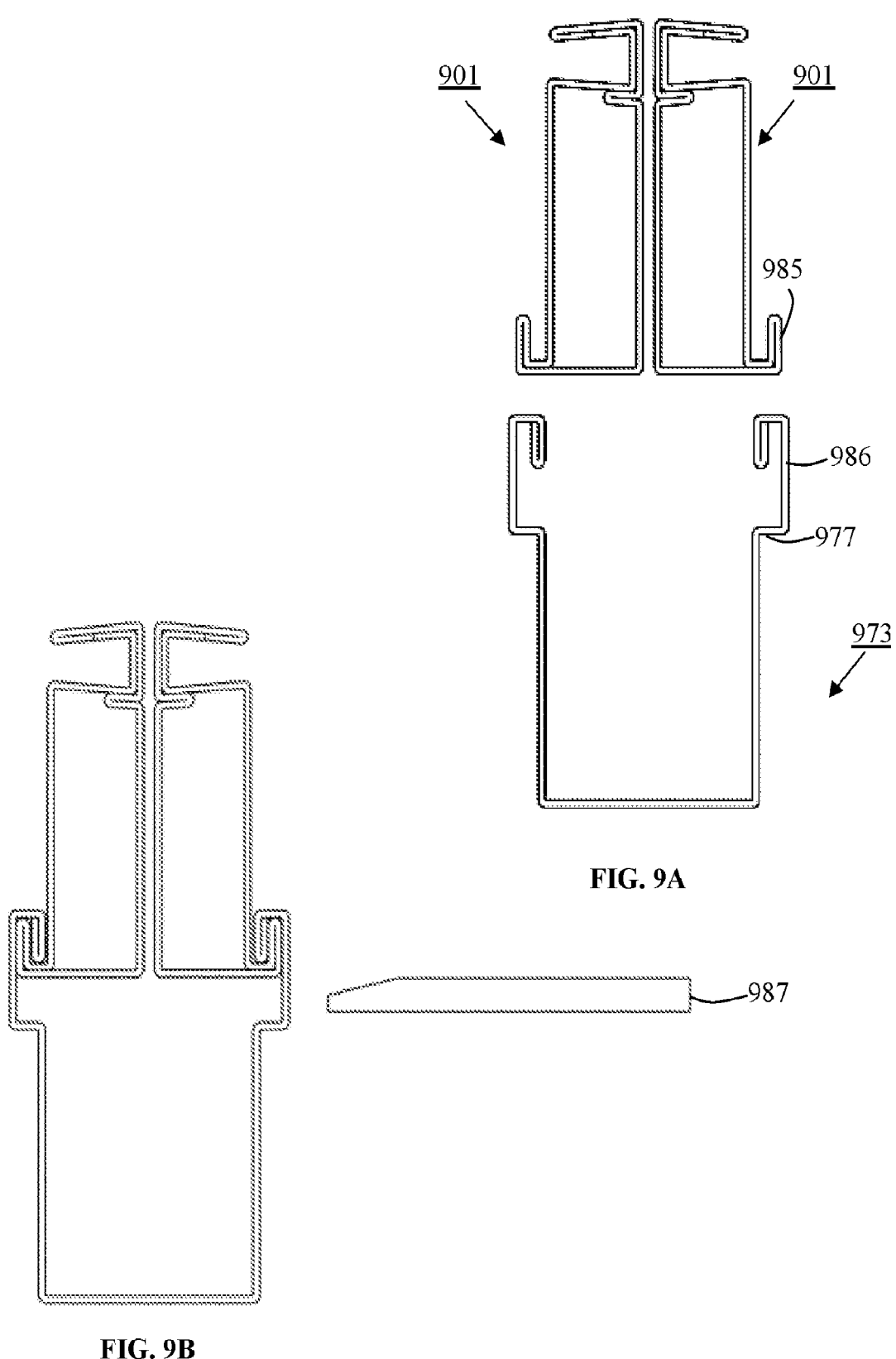
FIGS. 9A-9D are cross-sectional views of various elements for a non-limiting example of a solar panel mounting system using a wedge according to some embodiments.
Figure 9C:
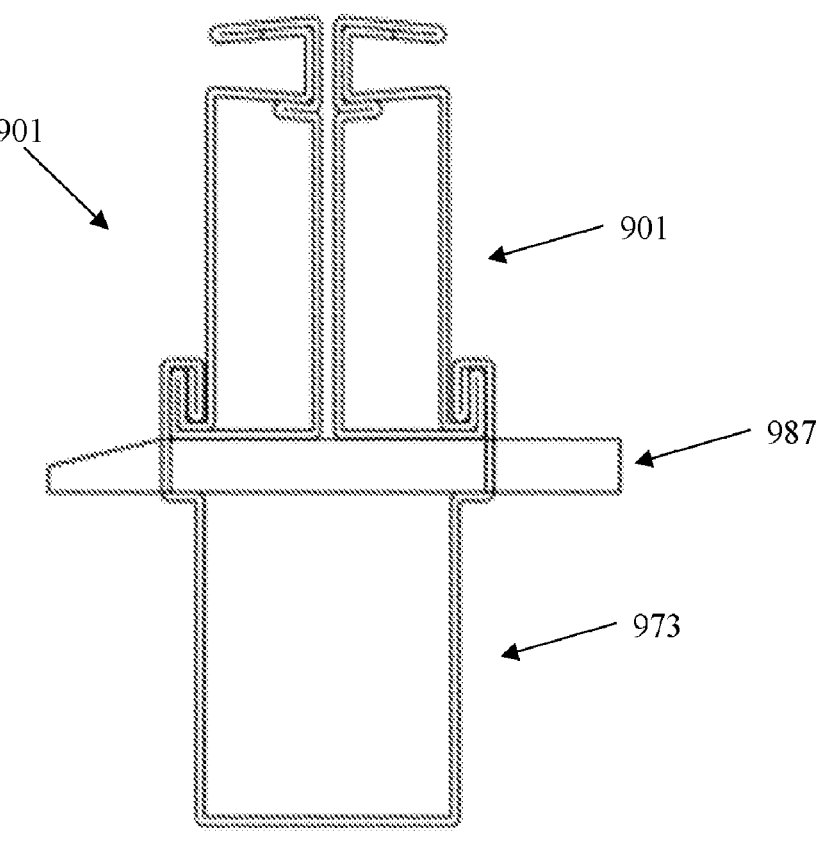

FIG. 9C shows the use of a wedge 987 to lock the frame sections 901, to the support structure, 973. FIG. 9A shows the frame sections 901 above and ready to be inserted in the support structure, 973. The inner flange upturn 985 shows a vertical wall. This wall may be angled. The shelf hook 986 shows the walls vertical. They also may be angled.

In FIG. 9B, the frame sections have been inserted and positioned ready for the wedge 987 to be inserted. FIG. 9C shows the wedge 987 inserted. In FIG. 9B the frame sections may be sitting on the support structure shelf 977. The wedge 987 may be tapered which may allow the frame sections, 901 to be lifted when the wedge 987 is inserted. The inner flange upturn 985 may be interlocked to the shelf hook 986. The inner flange upturn 985 and the shelf hook 986 may prevent the frame sections from pulling out of the support structure.

Figure 9D:
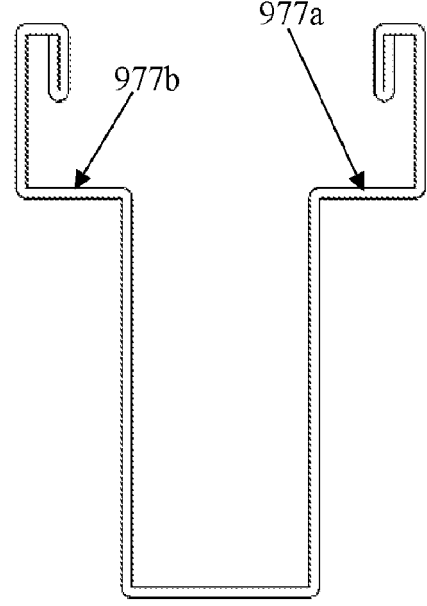

The wedge 987 may also be a cam (not shown), or rotating wedge (not shown). FIG. 9D shows a support structure 973 with wider support shelf 977 including first shelf 977*a* and second shelf 977*b* This may prevent the first inserted frame section to go past (below) the support shelf 977. In some embodiments, the frame section 901 may be initially positioned (prior to engaging the wedge) by positioning it at one end of the support structure 973, and sliding it along shelf 977.

The cross bar and end frame sections (not shown but shown earlier in the specification) may be shorter than the frame sections 901 so placed inside the support structure. An alternative may be to notch the shelf hook 986 where the cross bar and end frame sections are located.

In FIGS. 7A, 8B, and 9C, the support structures may be moved while attaching the frame sections to the support structures. Embodiments according to FIGS. 10A, 11C, and 12A may not need the support structures to be moved during the attachment of the frame sections to the support structures.

Figure 10A:
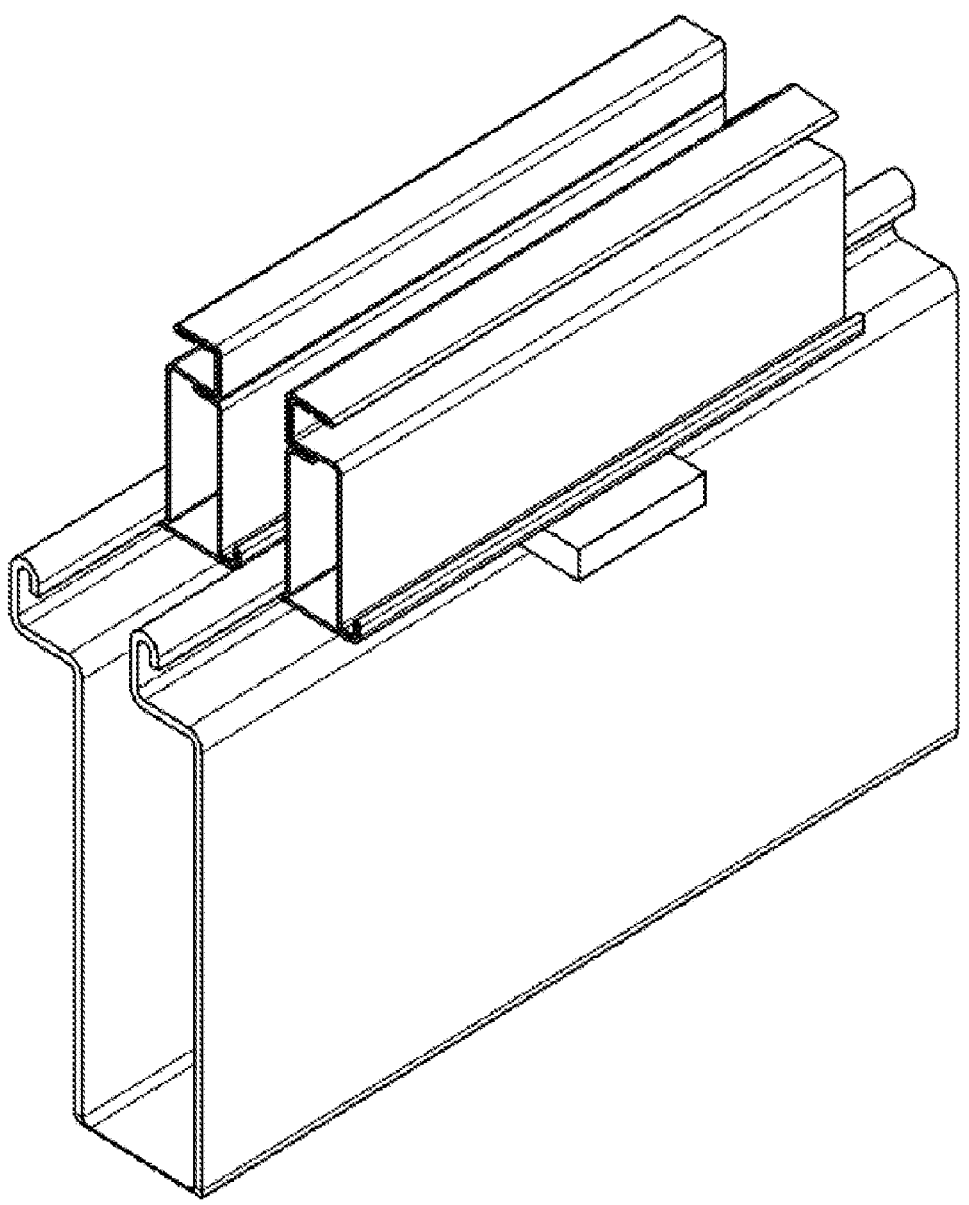
FIGS. 10A-10J are various views of various elements for another non-limiting example of a solar panel mounting system using a wedge according to some embodiments.
Figures 10B, 10C, 10D, 10E:
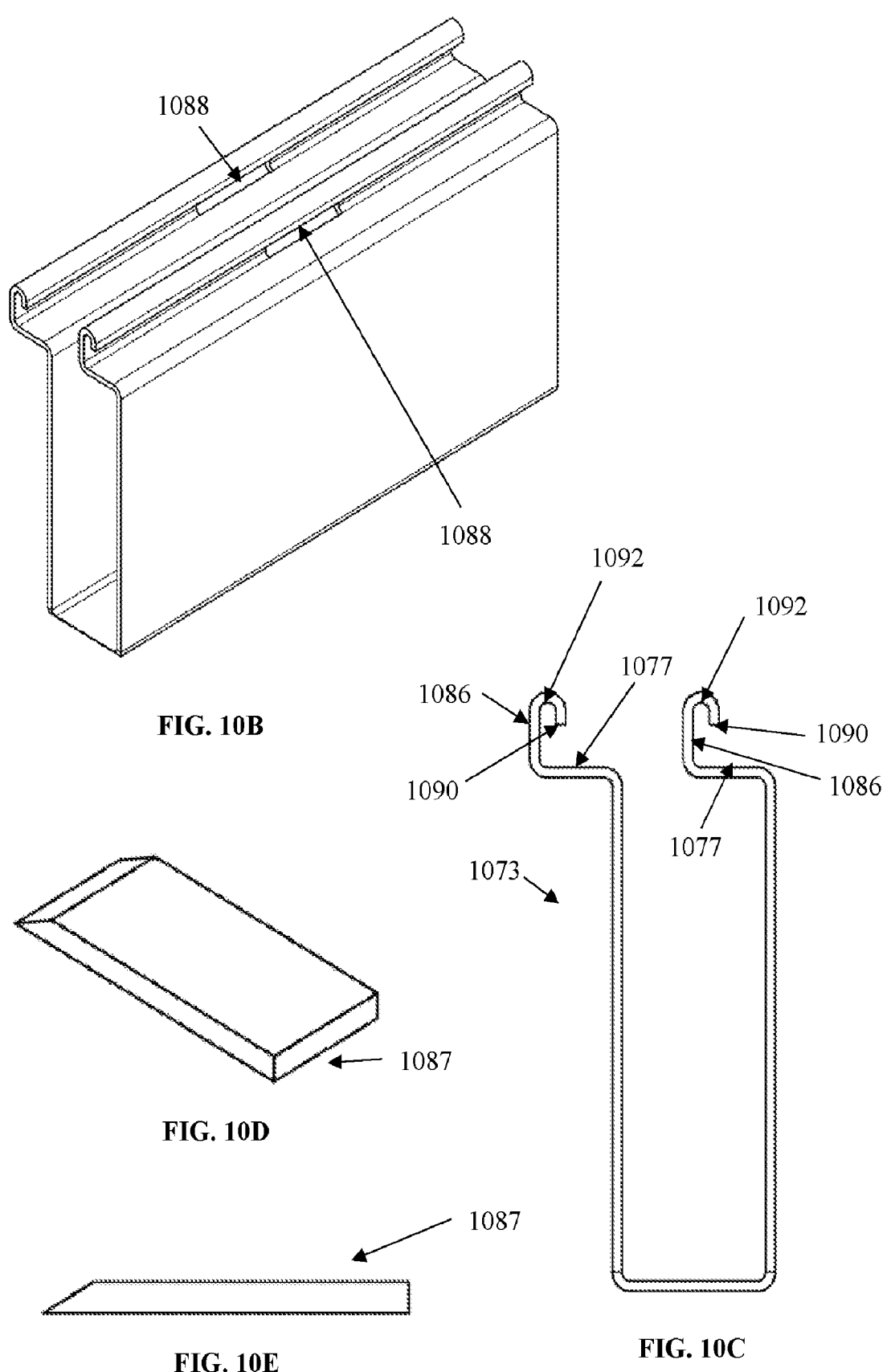
Figures 10F, 10G:
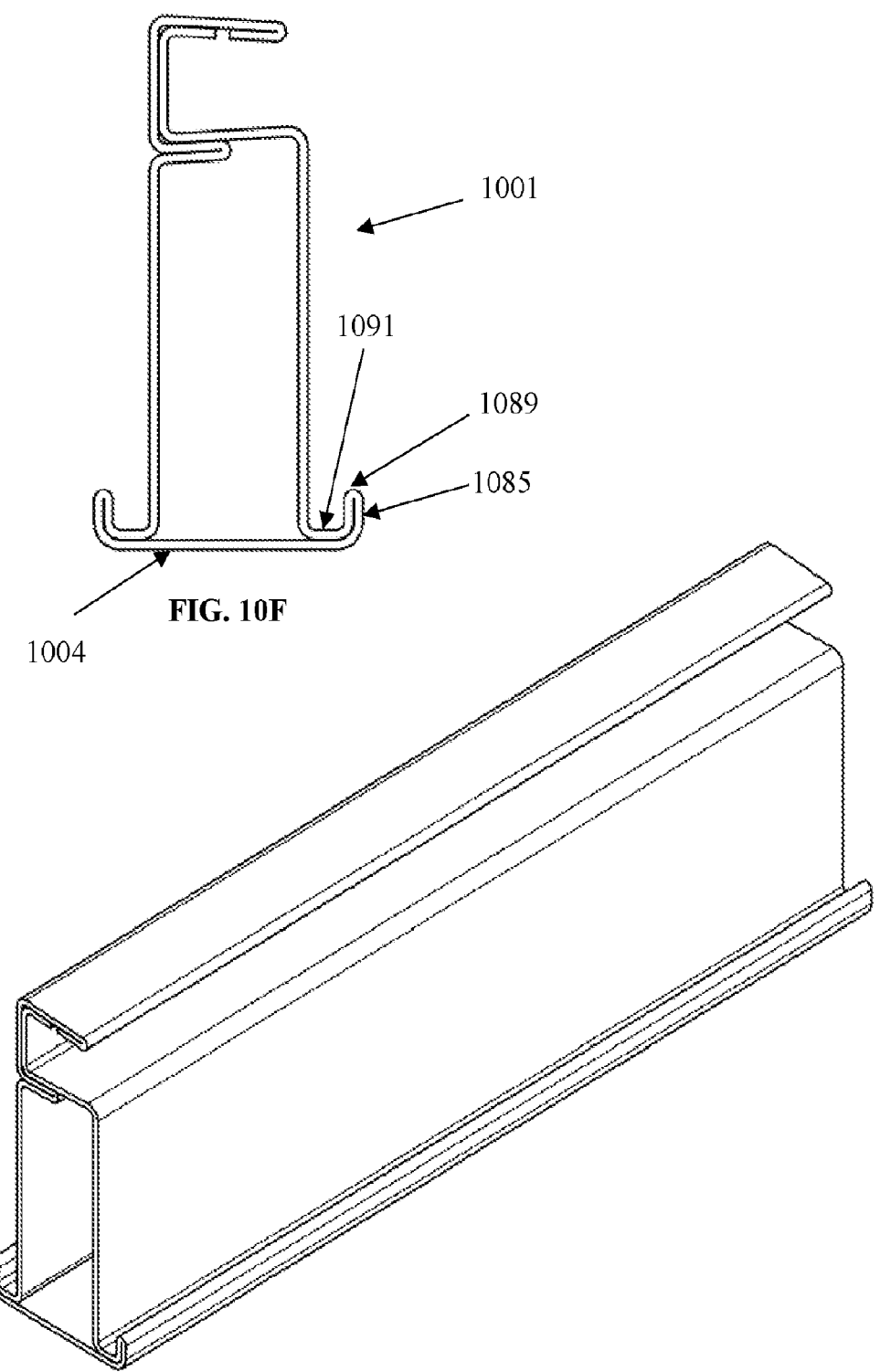
Figures 10H, 10I:
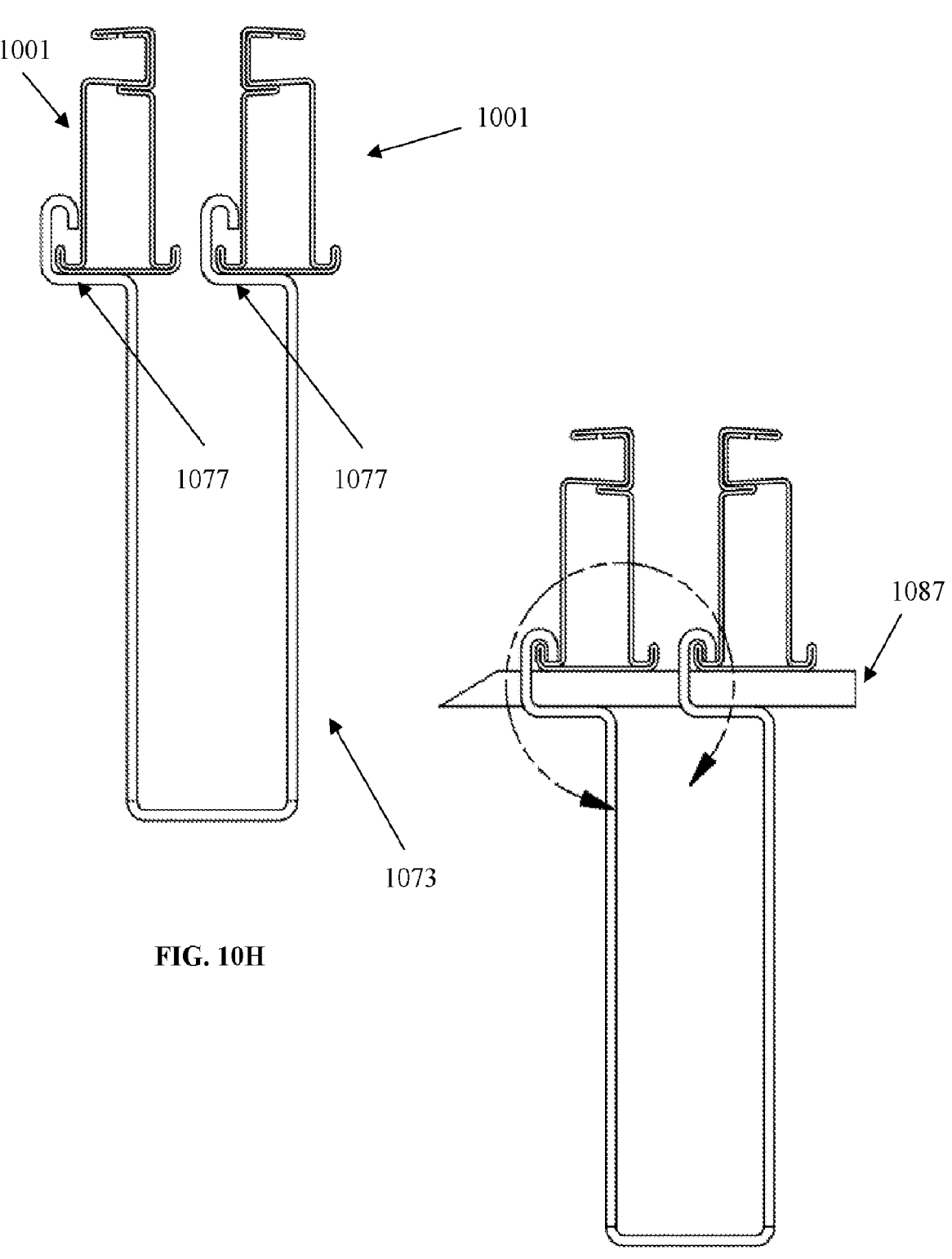
Figure 10J:
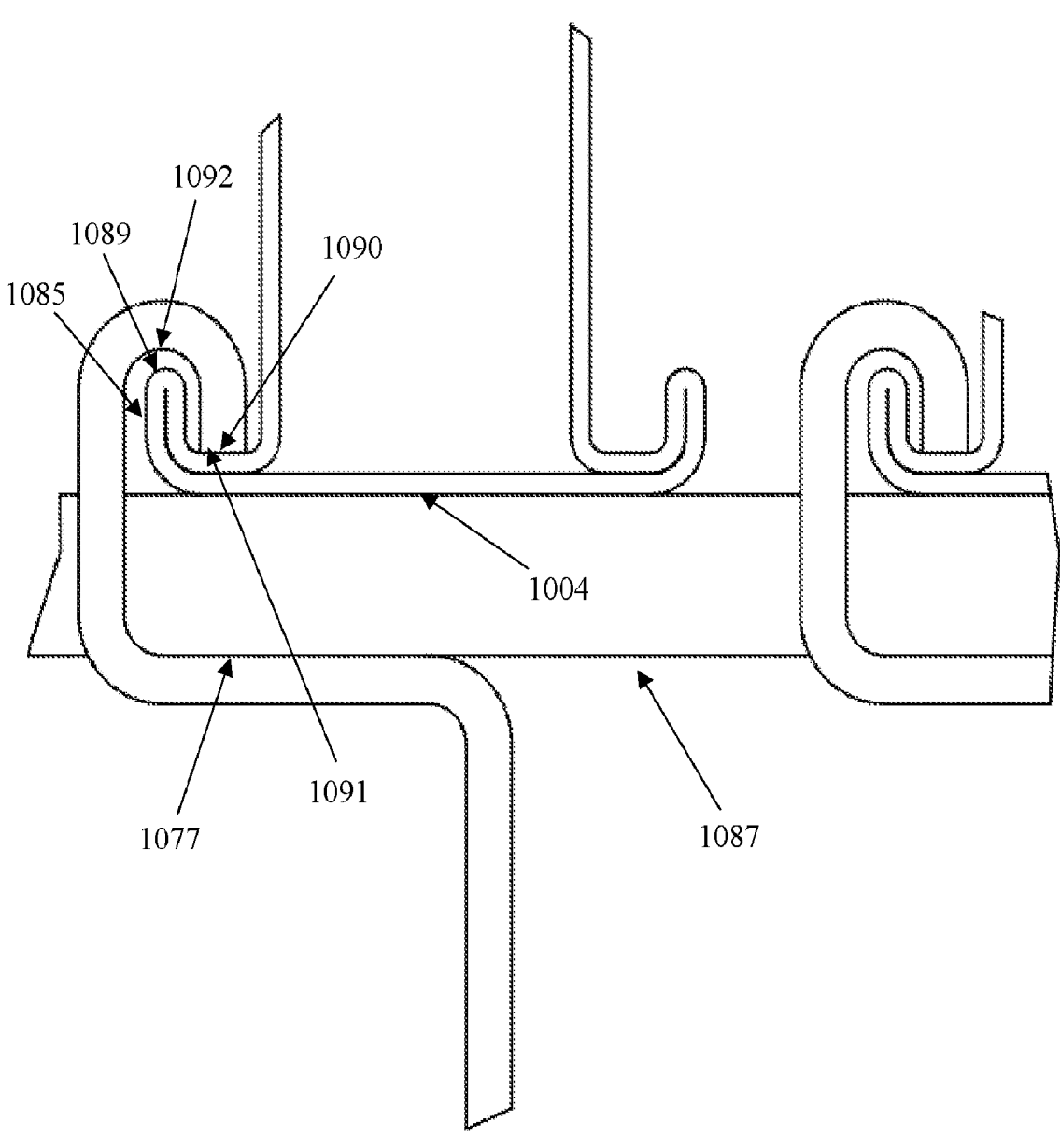

FIG. 10A shows the use of a wedge to lock the section frames, to the support structure, 973. FIGS. 10B-10G shows the details of the frame sections 1001, the wedge 1087, and the support structure 1073. FIG. 10H shows the frame sections 1001 on the support shelf 1077 and in position prior to insertion of the wedge, 1087 through the wedge hole 1088.

The wedge 1087 may be tapered on the end to allow lifting of the frame sections when inserting the wedge 1087 through the wedge holes 1088. FIG. 10I shows wedge 1087 in place with the frame sections 1001 securely attached to the support structure 1073. Looking at the exploded view in FIG. 11J, the wedge may be wedged between the support shelf 1077 and the bottom flange 1004 which may force the upturn pocket 1091 against the hook end 1090. If the inner flange upturn 1085 is longer, the upturn crest 1089 may be forced against the hook underside 1092. Either contact or both may work well.

Figure 11A:
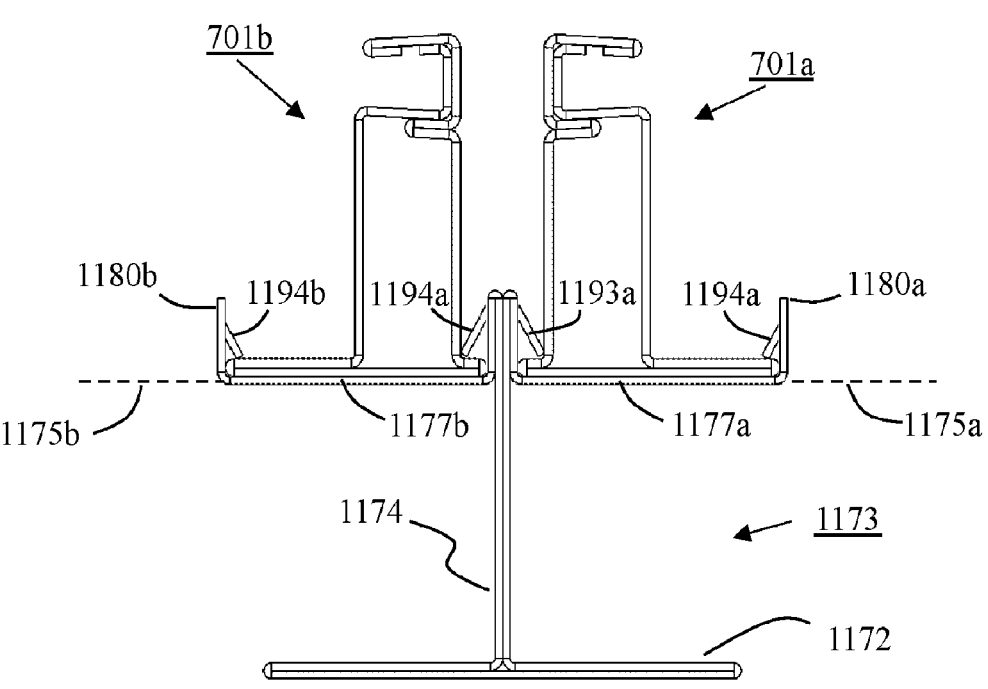
FIG. 11A is a cross-sectional view of a non-limiting example of a solar panel mounting system according to some embodiments.

FIG. 11A shows a cross sectional view of a portion of another solar panel mounting system according to some embodiments. Some aspects of the mounting system of FIG. 11A may be similar to those of the mounting system of FIG. 7A and/or FIG. 8A. Mounting system 1150 includes a support structure 1173 having a first shelf 1177*a* defining a first plane 1175*a* for supporting a first frame section 701*a* of a first solar panel module. The support structure 1173 also includes a second shelf 1177*b* defining a second plane 1175*b* for supporting a second frame section 701*b* of a second solar panel. Additional features of support structure 1173 can be found in FIG. 11B (cross-sectional view) and FIG. 11C (perspective view). Support structure 1173 may include a dividing structure 1174 provided between the first and second shelves and extending above the first and second planes. In this embodiment, the dividing structure includes first and second vertical walls, 1179*a* and 1179*b*, respectively. Support structure 1173 may include a first shelf upturn 1180*a* provided at an end of the first shelf away from the dividing structure 1174 and extending above the first plane 1175*a*. Similarly, support structure 1173 may include a second shelf upturn 1180*b* provided at an end of the second shelf 1177*b* away from the dividing structure 1174 and extending above the second plane 1175*b*.

The support structure may further include one or more movable lock tabs, in this case spring tabs, for engaging the first and second frame sections. For example, spring tabs 1194*a*, 1194*b* may be provided in the shelf upturn 1180*a*, 1180*b* for engaging an inner flange extension of the bottom flange of the frame section 701*a*, 701*b*. Further, spring tabs 1193*a*, 1193*b* may be provided in the dividing structure 1174, in particular the vertical wall 1179*a*, 1179*b*, for engaging an outer flange extension of the frame section 701*a*, 701*b*. Additional information regarding the frame section can be found, for example, in FIG. 7B and the associated discussion herein. With respect to mounting, a frame section of a solar panel module may be positioned over the appropriate support structure shelf and pushed downward. As can be seen, the spring tabs are not parallel with their respective vertical wall or shelf upturn, but extend outward into the space to be occupied by the frame section. In general, the spring tabs may have a spring axis that is substantially parallel to the respective plane. For example, spring tab 1194*b* may have a spring axis 1196 that is substantially parallel to the second plane 1175*b*, and spring tab 1193*a* may have a spring axis 1195 that is substantially parallel to the first plane 1175*a*. The spring tabs may provide some initial resistance with the bottom flanges, but are movable with sufficient downward force. For example, spring tabs 1193*a*, 1193*b* may bend downward (the spring tab end bends toward the vertical wall 1179*a*, 1179*b*) to allow the outer extension of the bottom flange to pass below the bottom edge of the spring tab, after which, the tab springs back into position thereby engaging the outer flange extension of the bottom flange. Similarly, spring tabs 1194*a*, 1194*b* may bend downward (the spring tab end bends toward the shelf upturn 1180*a*, 1180*b*) to allow the inner flange extension of the bottom flange to pass below the bottom edge of the spring tab, after which, the tab springs back into position thereby engaging the inner extension of the bottom flange. Thus, in some cases, the module can be mounted to the support structure in an easy step without necessarily requiring any tools. It should be noted that the engagement by the spring tabs may in some cases fully lock the frame section in place. In some cases, the engagement may be loose and serve to generally position the frame section in an easy step and another locking mechanism is provided to more firmly lock the frame section in place. Alternatively, even when the spring tabs provide a firm lock, another locking mechanism may optionally be added as extra insurance for holding the solar panel module in place. In some cases, another locking mechanism may include door tabs or fold-down tabs as described elsewhere herein. In some cases, another locking mechanism may include bolts, screws, or the like.

Although these figures illustrate first and second vertical walls, the dividing structure may include a single vertical wall and the lock tabs may instead be provided in a single, common vertical wall.

Figure 11B:
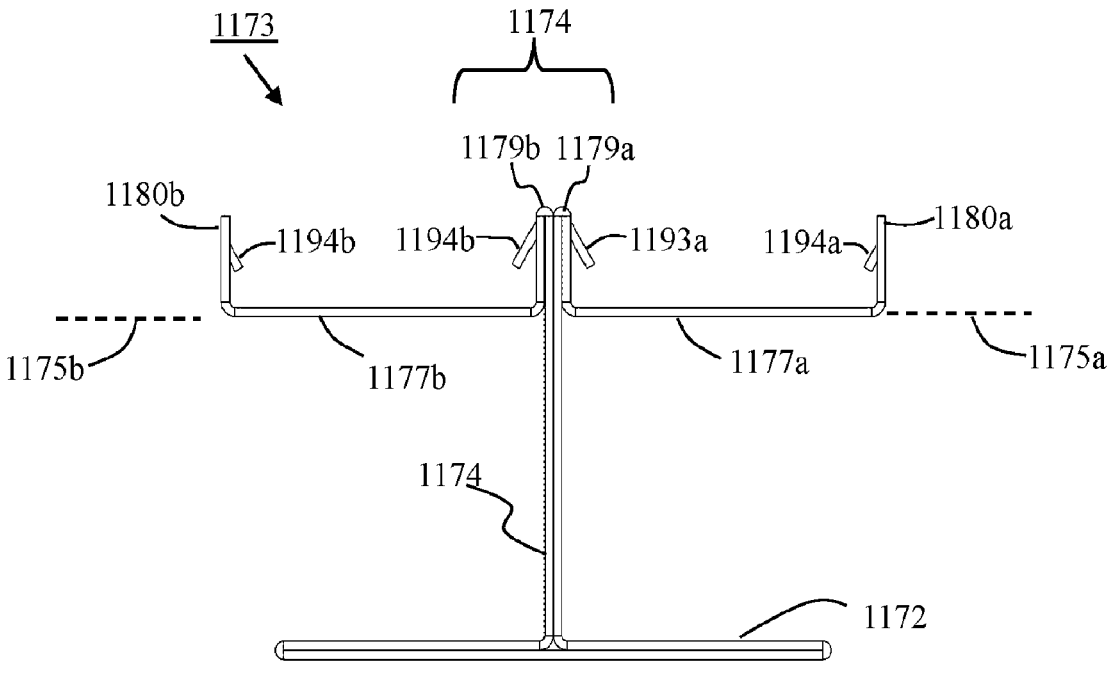
FIG. 11B is a cross-sectional view of a non-limiting example of a support structure according to some embodiments.
Figure 11C:
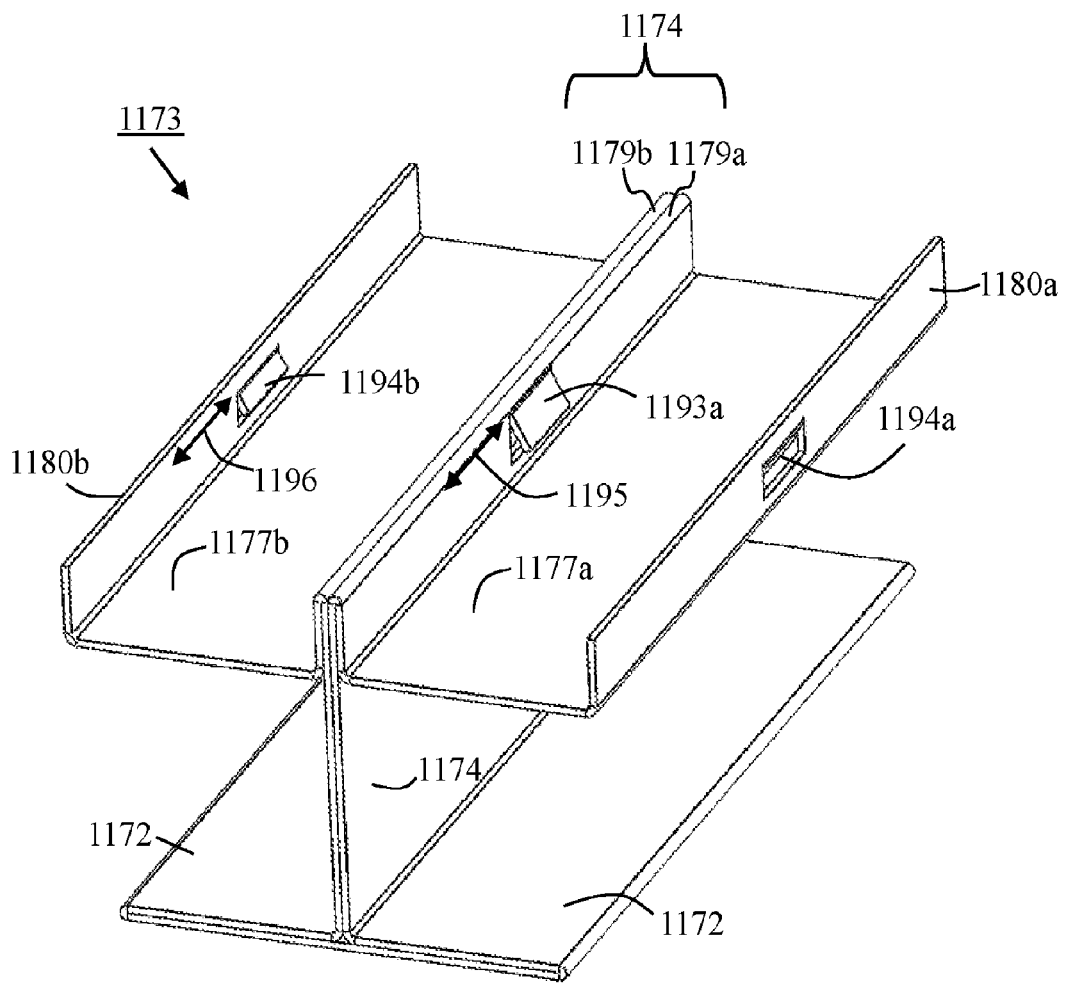
FIG. 11C is a perspective view of a non-limiting example of a support structure according to some embodiments.

Support structure 1173 may include a central support wall 1174 extending below the first and second planes 1175*a* and 1175*b*. The central support wall 1174 may optionally extend down to a support base 1172. Although not shown, rather than a single central support wall, there may be multiple support walls, e.g., one positioned under the first frame section and another positioned under the second frame section. The multiple support walls may also optionally extend to a support base. The shape of the support structure 1173 is shown in FIG. 11B as an I-beam. This is a very strong shape, but the support structure is not limited to an I-beam shape and may be any shape.

Figure 11D:
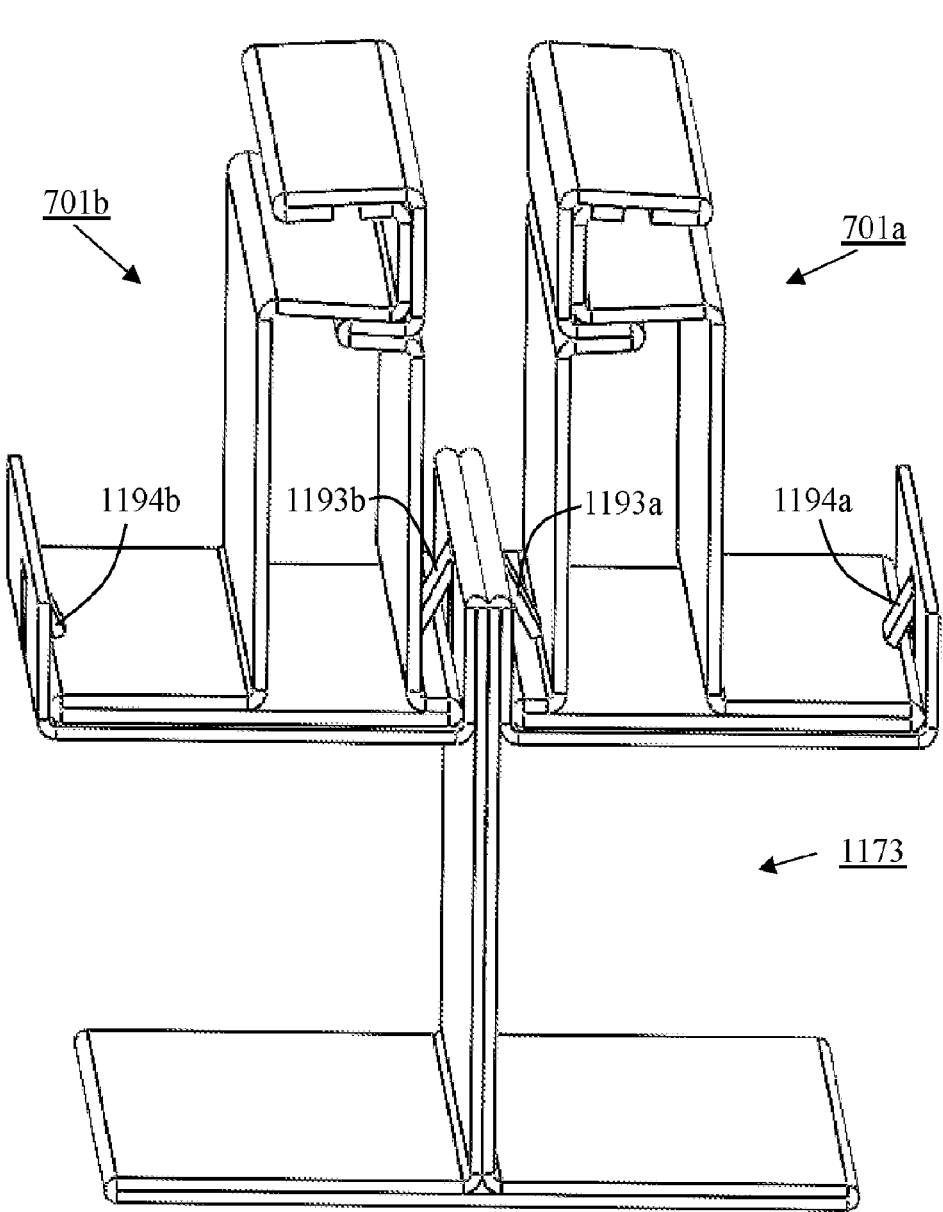
FIG. 11D is a perspective view of a non-limiting example of a solar panel mounting system according to some embodiments.

FIG. 11D is a perspective view of the mounting system of FIG. 11A, but with fewer parts labeled for clarity. It should be noted that the elements of mounting systems described in FIG. 7A, 8A, or 11A may be combined in various ways. Although not shown, two frames may abut each other rather than engaging with a dividing structure. That is, in some cases, a dividing structure may not be present and/or extend above the first and second planes, and the only spring tabs are provided in the shelf upturn.

Figure 12A:
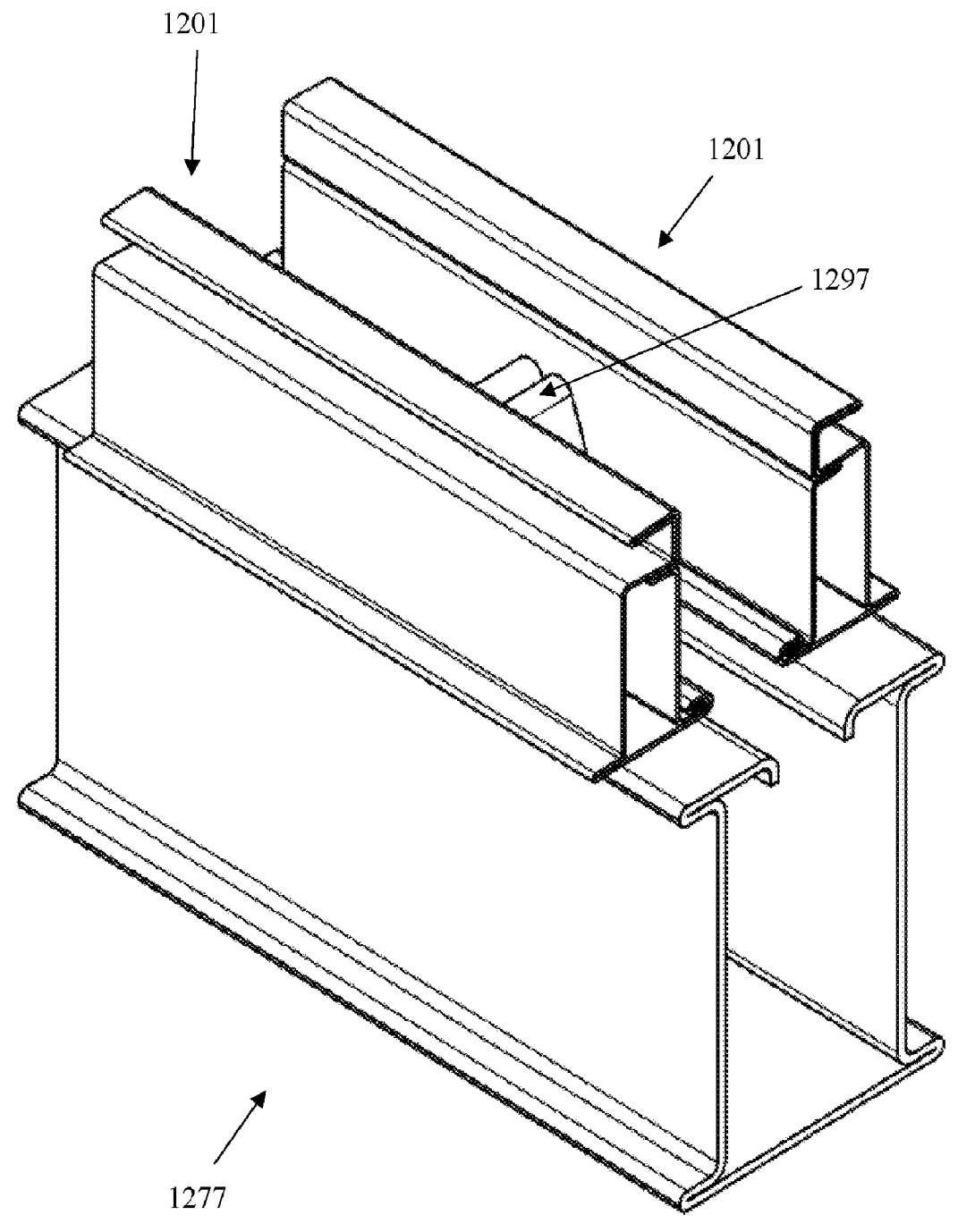
FIG. 12A is a perspective view of a non-limiting example of a solar panel mounting system using an attach clip according to some embodiments.
Figures 12B, 12C, 12D:
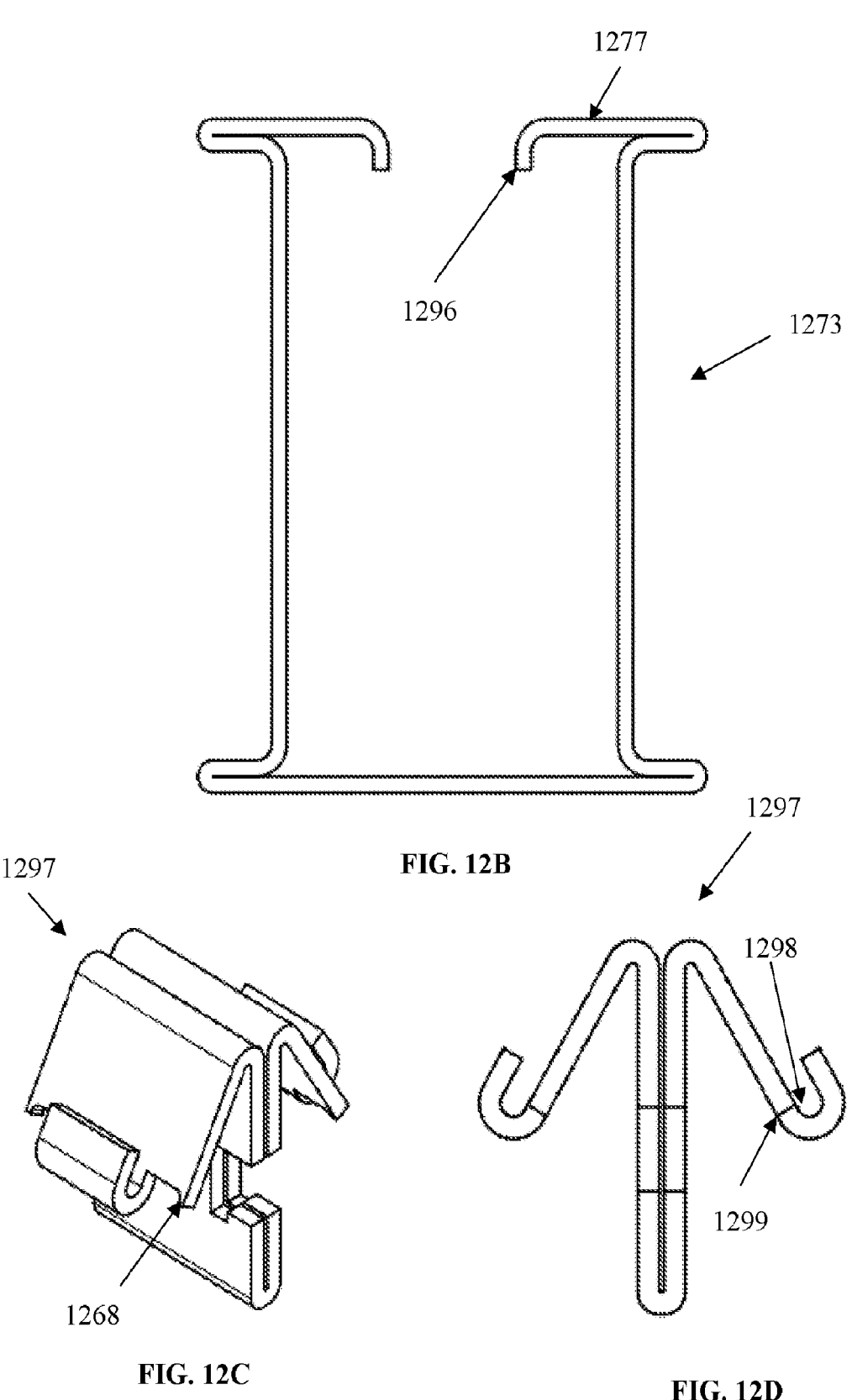
FIG. 12B is a cross-sectional view of a non-limiting example of a support structure according to some embodiments.
FIGS. 12C and 12D are perspective and cross-sectional views, respectively, of a non-limiting example of an attach clip according to some embodiments.
Figure 12E:
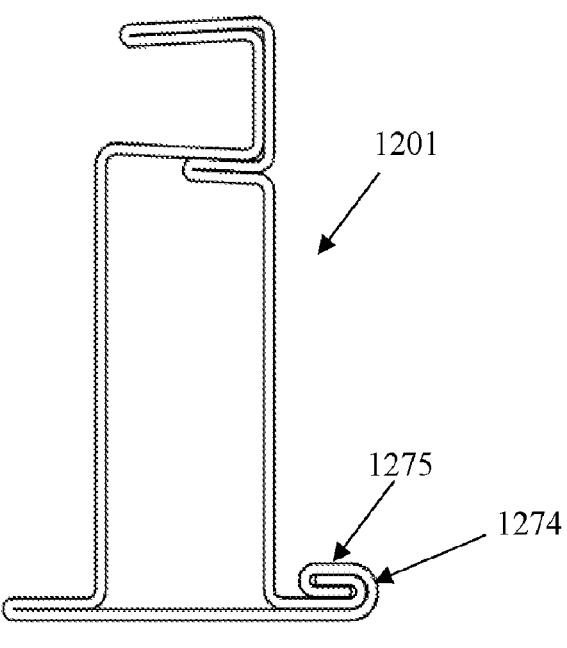
FIGS. 12E and 12F are cross-sectional and perspective views of a non-limiting example of a frame section according to some embodiments.
Figure 12F:
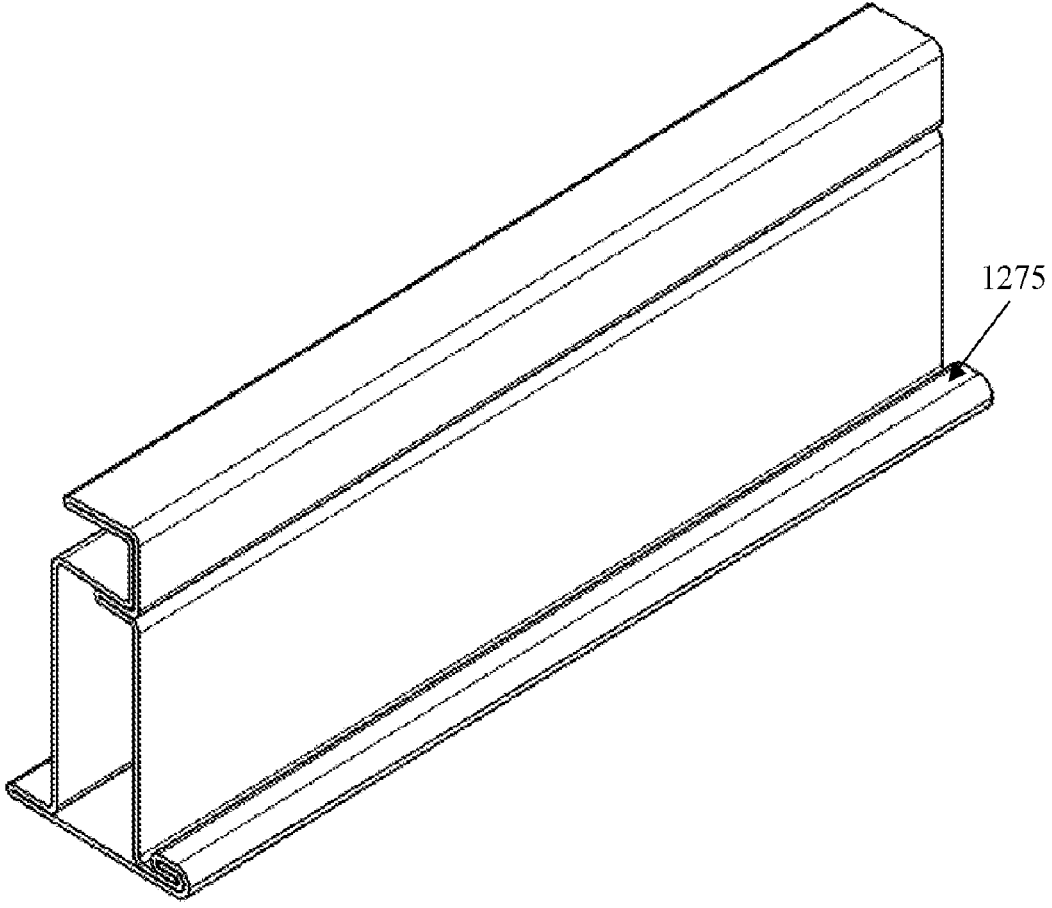
Figure 12G:
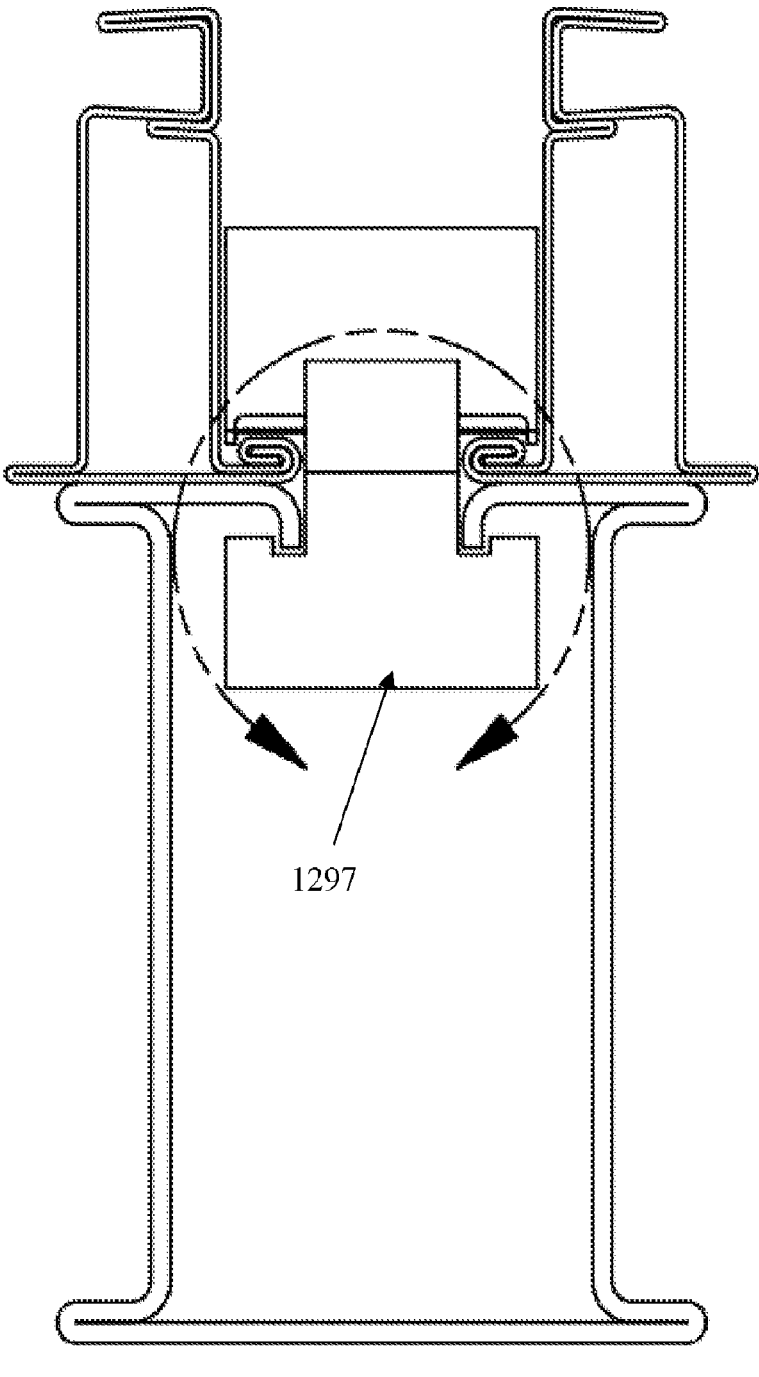
FIG. 12G is a cross-sectional view of a non-limiting example of a solar panel mounting system using an attach clip according to some embodiments.
Figures 12H, 12I:
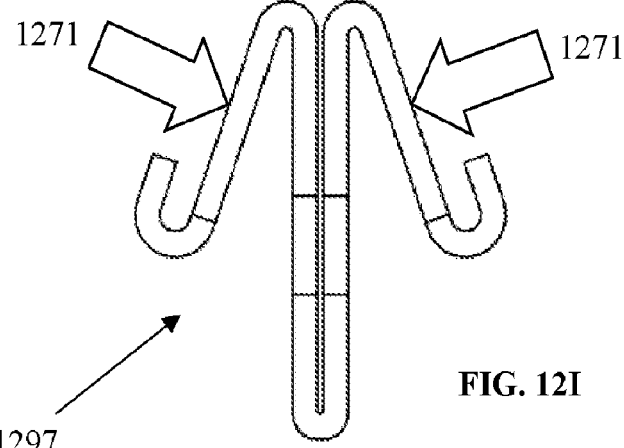
FIG. 12H is a zoomed-in cross-sectional view of the non-limiting example of a solar panel mounting system of FIG. 12G.
FIG. 12I is cross-sectional view of a non-limiting example of an attach clip according to some embodiments.

FIG. 12A shows an attach clip 1297 that may attach the frame sections 1201 to the support structure 1273. FIGS. 12B-12F show the details of the attach clip 1297, frame section 1201, and support structure 1273. Once the frame sections are in position, the attach clip 1297 may be slid into position as shown in FIGS. 12G-12H. FIG. 12H shows that the clip edge 1299 may not be pressing against the roll top 1275 and the downturn end 1296 may not be pushing against the lower clip contact 1272 which may allow the attach clip 1297 to slide easily. Clip guides 1268 may be used to help position the assembly parts and also may further prevent the frame section from slipping out of the attach clip.

Figure 12J:
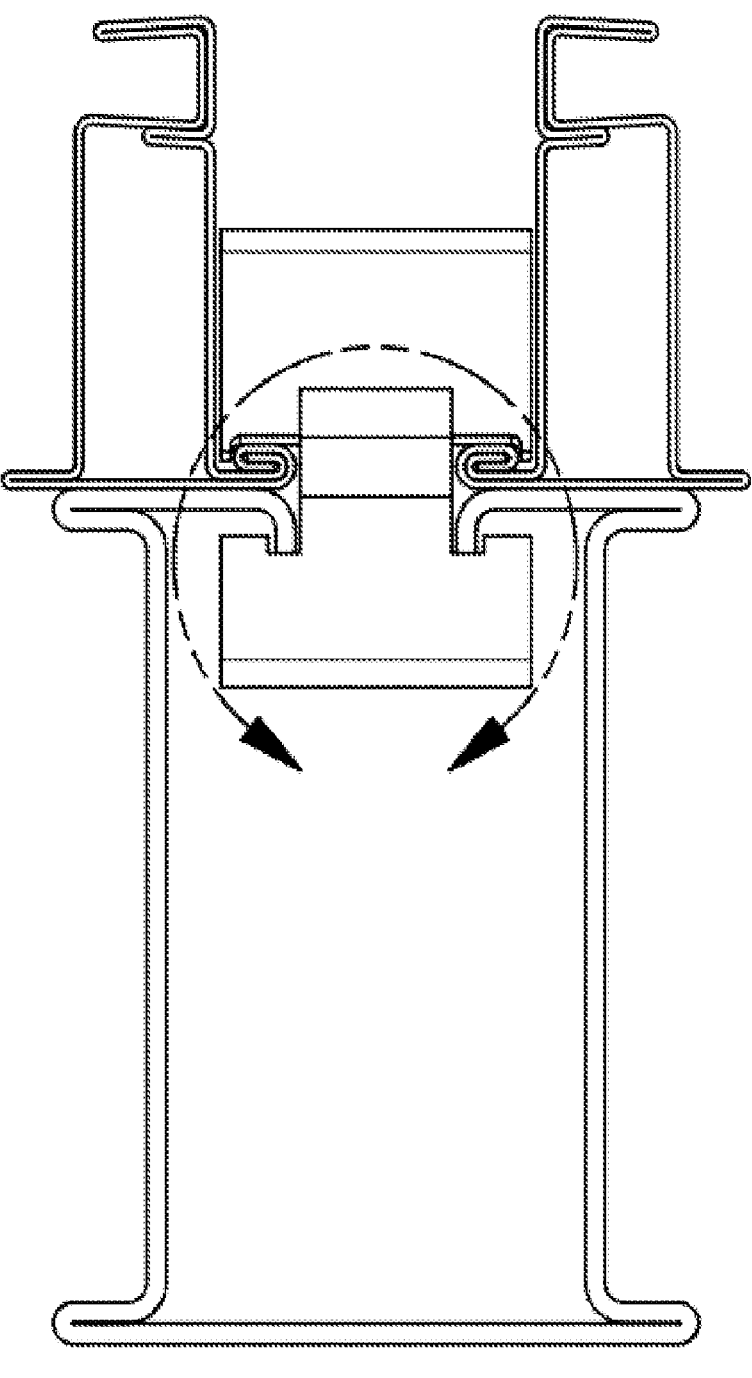
FIG. 12J is a cross-sectional view of a non-limiting example of a solar panel mounting system using an attach clip according to some embodiments.
Figure 12K:
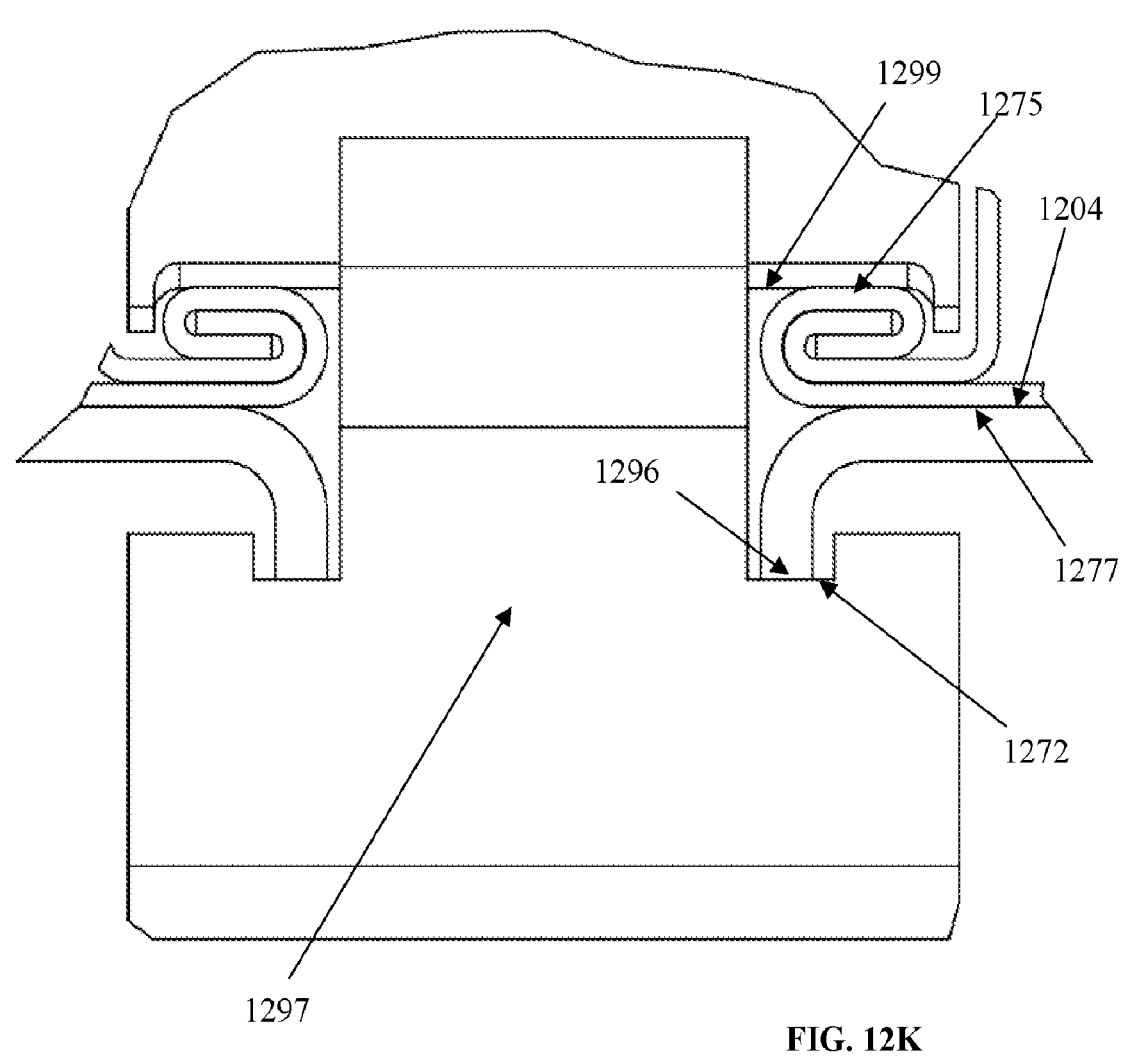
FIG. 12K is a zoomed-in cross-sectional view of the non-limiting example of a solar panel mounting system of FIG. 12J.

With a tool (not shown), a deform force 1271 may be applied to permanently deform the attach clip as shown in FIG. 12I-K.

In FIG. 12K, the force between the lower clip contact 1272 and the clip edge 1299 may forcefully push the clip edge 1299 into the roll top 1275, the bottom flange 1204 against the support shelf 1277, the downturn end 1296 against the lower clip contact 1272. This securely attaches the frame sections 1201 to the support structure 1273.

Figure 12L:
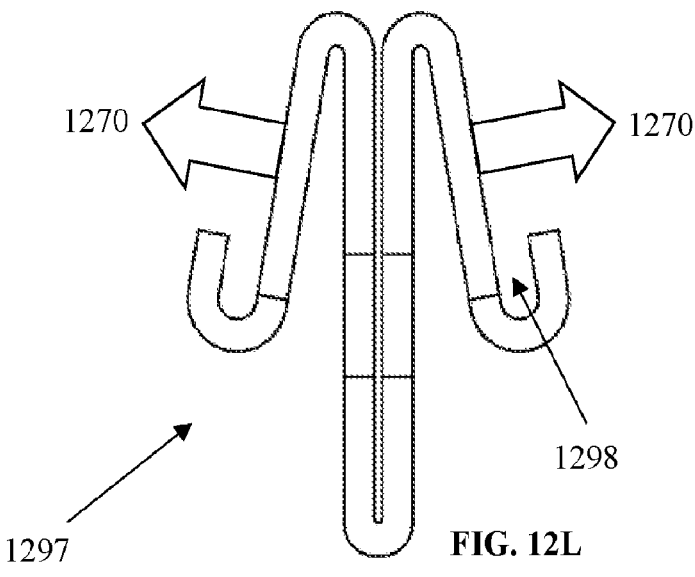
FIG. 12L is cross-sectional view of a non-limiting example of an attach clip according to some embodiments.

Another method to achieve the same results, may be to start with a over bent attach clip as shown in FIG. 12L. Now a tool not shown) may apply a spread force 1270 to allow the attach clip 1297 to be slid into place. The tool may then be removed which may allow the clip to try to return to its original shape but would be stopped by the clip edge 1299 and the lower clip contact. The resulting force may the attach clip as described in the previous paragraph.

The attach clips are shown as sliding into place, but they may also be made so that they can twist into place at the desired location. Short slots may be located in the desired location for the clips.

If it is desired that the attach clip be removed, a screwdriver or other tool can be inserted in the clip bend hook 1298 which may pry and open the attach clip so than it may be removed. For higher loads, more attachments may be used. For FIGS. 9B and 10A, this attachment may be continuous so even higher loads may be supported.

Although described herein with respect to their utility in making frames for solar panels, the methods, equipment, and devices of the present application may be used to manufacture many other products in many other fields. In some cases, such other products may be those formed at least in part from a generally flat starting material including, but not limited to, sheet metal (coated or uncoated).

It should be noted that various parts and frame features, including but not limited to, frame sidewalls and bottom flanges, have generally be represented in their respective figures as being straight or flat, but in some embodiments, one or more of these features (or other features shown as being straight or flat) may instead be non-straight or non-flat. For example, one or more of these features may include one or more curves or additional bends and still effectively perform their intended function.

Note also that in any of the figures herein, folds that may be represented as having sharp corners may be replaced with rounded corners. In some embodiments, a corner formed by a fold may be characterized by a bending radius.

In some embodiments, in areas where a portion of framework material may come into contact with another material including, but not limited to, another portion of framework material, a bolt, a washer, a support structure, or the like, such areas may optionally include an anti-corrosion coating or an additional anti-corrosion coating treatment including, but not limited to, those already discussed.

In some embodiments, in areas where multiple layers of framework material are formed, such areas may optionally include a bonding or attachment feature to hold the layers together. Some non-limiting examples of attachment features may include a crimp, a clinch, an interlocking feature between the layers, double-sided adhesive tape, an adhesive, a weld, a braze, a solder, or the like. In some embodiments, an anticorrosion coating may also have adhesive properties and act as an attachment feature.

Enumerated Embodiments

Still further embodiments herein include the following enumerated embodiments. The term "including" (and its variations, "includes", "include") in these enumerated embodiments encompasses its normal meaning in addition to "comprising" ("comprises", "comprise") and/or "consisting of" ("consists of", "consist of") and/or "consisting essentially of" ("consists essentially of", consist essentially of").

1. A solar panel support structure including
a first shelf for supporting a first frame section of a first solar panel module, the first shelf defining a first plane;
a second shelf for supporting a second frame section of a second solar panel module, the second shelf defining a second plane;
a dividing structure provided between the first and second shelves and optionally extending above the first and second planes;
a first shelf upturn provided at an end of the first shelf away from the dividing structure and extending above the first plane;
a second shelf upturn provided at an end of the second shelf away from the dividing structure and extending above the second plane;
one or more first movable lock tabs provided in i) the dividing structure, ii) the first shelf upturn, or both (i) and (ii), for engaging a first bottom flange portion of the first frame section; and
one or more second movable lock tabs provided in i) the dividing structure, ii) the second shelf upturn, or both (i) and (ii), for engaging a second bottom flange portion of the second frame section.

2. The support structure of embodiment 1, wherein the support structure is formed from a sheet of support structure material, and wherein the one or more first and second lock tabs are formed from cuts in the support structure material.

3. The support structure of embodiment 1 or 2, wherein at least one of the lock tabs is a spring tab having a spring axis that is substantially parallel to i) the first plane when the spring tab engages the first bottom flange portion, or ii) the second plane when the spring tab engages the second bottom flange portion.

4. The support structure according to any of embodiments 1-3, wherein at least one of the lock tabs is a door tab having a pivot axis that is substantially orthogonal to i) the first plane when the door tab engages the first bottom flange portion, or ii) the second plane when the door tab engages the second bottom flange portion.

5. The support structure of embodiment 4, wherein the door tab has a tapered structure.

6. The support structure according to any of embodiments 1-5, wherein at least one of the lock tabs is a fold-down tab having a pivot axis that is substantially parallel to i) the first plane when the fold-down tab engages the first bottom flange portion, or ii) the second plane when the fold-down tab engages the second bottom flange portion.

7. The support structure according to any of embodiments 1-6, wherein the first plane is approximately equal to the second plane.

8. The support structure according to any of embodiments 1-7, further including a central support wall extending below the dividing structure and below the first and second planes.

9. The support structure of embodiment 8, wherein the central support wall extends to a support base.

10. The support structure of embodiment 8 or 9, wherein the support structure has an I-beam shape.

11. The support structure according to any of embodiments 1-10, wherein the dividing structure includes a first retaining fold provided at an angle relative to the first plane such that a portion of the first retaining fold is positioned over an outer flange extension of the first bottom flange portion.

12. The support structure of embodiment 11, wherein the first shelf upturn includes one or more lock tabs for engaging an inner flange extension of the first bottom flange portion.

13. The support structure of embodiment 12, wherein the one or more lock tabs of the first shelf upturn include a door tab, a fold-down tab, a spring tab, or any combination thereof.

14. The support structure according to any of embodiments 11-13, wherein the dividing structure further includes a second retaining fold provided at an angle relative to the second plane such that a portion of the second retaining fold is positioned over an outer flange extension of the second bottom flange portion.

15. The support structure of embodiment 14 wherein the second shelf upturn includes one or more lock tabs for engaging an inner flange extension of the second bottom flange portion.

16. The support structure of embodiment 15, wherein the one or more lock tabs of the second shelf upturn include a door tab, a fold-down tab, a spring tab, or any combination thereof.

17. The support structure according to any of embodiments 1-10, wherein the dividing structure includes a first vertical wall having one or more lock tabs for engaging an outer flange extension of the first bottom flange portion.

18. The support structure of embodiment 17, wherein one or more lock tabs of the first vertical wall include a door tab, a fold-down tab, a spring tab, or any combination thereof.

19. The support structure of embodiment 17 or 18, wherein the first upturn is folded at an angle relative to the first plane such that a portion of the first upturn is positioned over an inner flange extension of the first bottom flange portion.

20. The support structure according to any of embodiments 17-19, wherein the dividing structure includes a second vertical wall having one or more lock tabs for engaging an outer flange extension of the second bottom flange portion.

21. The support structure of embodiment 20, wherein one or more lock tabs of the second vertical wall include a door tab, a fold-down tab, a spring tab, or any combination thereof.

22. The support structure of embodiment 20 or 21, wherein the first vertical wall is the same wall as the second vertical wall.

23. The support structure according to any of embodiments 20-22, wherein the second upturn is folded at an angle relative to the second plane such that a portion of the second upturn is positioned over an inner flange extension of the second bottom flange portion.

24. The support structure according to any of embodiments 11-13, wherein the dividing structure includes a vertical wall having one or more lock tabs for engaging an outer flange extension of the second bottom flange portion.

25. The support structure of embodiment 24, wherein one or more lock tabs of the vertical wall include a door tab, a fold-down tab, a spring tab, or any combination thereof.

26. The support structure of embodiment 24 or 25, wherein the second upturn is folded at an angle relative to the second plane such that a portion of the second upturn is positioned over an inner flange extension of the second bottom flange portion.

27. The support structure according to any of embodiments 1-10, wherein the dividing structure includes a first vertical wall having one or more spring tabs for engaging an outer flange extension of the first bottom flange portion, and wherein the first shelf upturn includes one or more spring tabs for engaging an inner flange extension of the first bottom flange portion.

28. The support structure of embodiment 27, further including one or more lock tabs other than spring tabs provided i) in the first vertical wall, ii) in the first shelf upturn, or iii) both (i) and (ii).

29. The support structure of embodiment 27 or 28, wherein the dividing structure includes a second vertical wall having one or more spring tabs for engaging an outer flange extension of the second bottom flange portion, and wherein the second shelf upturn includes one or more spring tabs for engaging an inner flange extension of the second bottom flange portion.

30. The support structure of embodiment 29, further including one or more lock tabs other than spring tabs provided i) in the second vertical wall, ii) in the second shelf upturn, or iii) both (i) and (ii).

31. The support structure of embodiment 29 or 30, wherein the first vertical wall is the same wall as the second vertical wall.

32. The support structure according to any of embodiments 1-30, wherein the first and second frame sections each include:

an elongated piece of framework material having a first end and a second end, wherein the first and second ends define a lengthwise dimension;

a lengthwise fold defining an intersection of a frame sidewall with a bottom flange, wherein at least a portion the frame sidewall extends above the bottom flange, and wherein the bottom flange further includes i) an inner flange extension, ii) an outer flange extension, or iii) both (i) and (ii); and a panel containment structure at an upper portion of the frame sidewall, the panel containment structure including a lower shelf extending from the sidewall, wherein the panel containment structure engages a bottom surface of the respective solar panel.

33. A solar panel mounting system including a first frame section of a first solar panel module and a second frame section of a second solar panel module, each frame section including:

an elongated piece of framework material having a first end and a second end, wherein the first and second ends define a lengthwise dimension, a lengthwise fold defining an intersection of a frame sidewall with a bottom flange, wherein at least a portion the frame sidewall extends above the bottom flange, and wherein the bottom flange further includes a flange upturn provided at the end of i) an inner flange extension, ii) an outer flange extension, or iii) both (i) and (ii); and a panel containment structure at an upper portion of the frame sidewall, the panel containment structure including a lower shelf extending from the sidewall, wherein the panel containment structure engages a bottom surface of the respective solar panel;

a support structure including:

a first shelf for temporarily supporting the first frame section, the first shelf defining a first plane;

a second shelf for temporarily supporting the second frame section, the second shelf defining a second plane;

a first shelf hook provided at an end of the first shelf and extending above the first plane for engaging the flange upturn of the first frame section, wherein the first shelf hook includes a first wedge hole; and a second shelf hook provided at an end of the second shelf and extending above the second plane for engaging the flange upturn of the second frame section, wherein the second shelf hook includes a second wedge hole; and a wedge positionable between the first shelf and the bottom flange of the first frame section and between the second shelf and the bottom flange of the second frame section, wherein the wedge has a thickness sufficient to cause a first locking engagement of the first frame flange upturn with the first shelf hook and a second locking engagement of the second frame flange upturn with the second shelf hook.

34. A method of mounting a solar panel using the mounting system of embodiment 33, the method including:

positioning the first frame section on the first shelf;

positioning the second frame section on the second shelf, inserting the wedge through the first and second wedge holes thereby forcing the first and second frame sections upward thereby causing the first and second locking engagements.

35. The method of embodiment 34, wherein positioning the first frame section includes sliding the bottom flange of the first frame section along the first shelf, and wherein positioning the second frame section includes sliding the bottom flange of the second frame section along the second shelf.

36. A solar panel mounting system including a first frame section of a first solar panel module and a second frame section of a second solar panel module, each frame section including:

an elongated piece of framework material having a first end and a second end, wherein the first and second ends define a lengthwise dimension;

a lengthwise fold defining an intersection of a frame sidewall with a bottom flange, wherein at least a portion the frame sidewall extends above the bottom flange, and wherein the bottom flange further includes an outer flange extension;

a panel containment structure at an upper portion of the frame sidewall, the panel containment structure including a lower shelf extending from the sidewall, wherein the panel containment structure engages a bottom surface of the respective solar panel, a support structure including:

a first for supporting the first frame section, the first shelf defining a first plane;

a second shelf for supporting the second frame section, the second shelf defining a second plane;

a first shelf downturn provided at an end of the first shelf and extending below the first plane; and a second shelf downturn provided at an end of the second shelf and extending below the second plane, wherein the second shelf is proximate the first shelf downturn, a space between the first shelf downturn and the second shelf downturn; and an attach clip positionable in the space and including a i) first lower clip contact for engaging the first shelf downturn, ii) a second lower clip contact for engaging the second shelf downturn, iii) a first clip edge for engaging the first frame section outer flange extension, and iv) a second clip edge for engaging the second frame section outer flange extension.

37. A method of mounting a solar panel using the mounting system of embodiment 36, the method including:

positioning the first frame section on the first shelf;

positioning the second frame section on the second shelf;

sliding the attach clip into a space such that the first and second lower clip contacts are adjacent the first and second shelf downturns and the first and second clip edges are adjacent the first and second frame section outer flange extensions; and deforming the clip to engage the lower clip contacts with the shelf downturns and engage the clip edges with the outer flange extensions.

The specific details of particular embodiments may be combined in any suitable manner without departing from the spirit and scope of the embodiments. However, other embodiments may be directed to specific embodiments relating to each individual aspect, or specific combinations of these individual aspects.

The above description of example embodiments has been presented for the purposes of illustration and description. It is not intended to be exhaustive or to limit the embodiments to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present embodiments. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the embodiments, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the battery cell" includes reference to one or more battery cells and equivalents thereof known to those skilled in the art, and so forth. The present application has now been described in detail for the purposes of clarity and understanding. However, it will be appreciated that certain changes and modifications may be practice within the scope of the appended claims.

All publications, patents, and patent applications cited herein are hereby incorporated by reference in their entirety for all purposes. None is admitted to be prior art

We claim:

1. A solar panel support structure comprising:

a first shelf for supporting a first frame section of a first solar panel module, the first shelf defining a first plane;

a second shelf for supporting a second frame section of a second solar panel module, the second shelf defining a second plane;

a dividing structure provided between the first and second shelves and extending above the first and second planes; and one or more spring tabs provided in the dividing structure for engaging i) a first bottom flange portion of the first frame section, ii) a second bottom flange portion of the second frame section, or both (i) and (ii).

2. The structure of claim 1 and further comprising one or more second spring tabs provided in the dividing structure for engaging iii) the first bottom flange portion of the first frame section, iv) the second bottom flange portion of the second frame section, or both (iii) and (iv).

3. The structure of claim 1 wherein the one or more spring tabs comprises a lock tab, tapered tab, door tab, folded tab, fold-down tab, or any combination thereof.

4. The structure of claim 1 wherein at least one of the spring tabs comprises a spring axis that is substantially parallel to the first plane when the spring tab engages the first bottom flange portion, or the second plane when the spring tab engages the second bottom flange portion.

5. The structure of claim 1 wherein the one or more spring tabs bend when engaged by iii) the first bottom flange portion of the first frame section, iv) the second bottom flange portion of the second frame section, or both (iii) and (iv), and the one or more spring tabs springs back into position after the first or second bottom flange portion passes an edge of the of the one or more spring tabs to securely attach the first or second frame section of the solar panel module to the solar panel support structure.

6. The structure of claim 1 wherein the one or more spring tabs bend downward when engaged by iii) the first bottom flange portion of the first frame section, iv) the second bottom flange portion of the second frame section, or both (iii) and (iv), and the one or more spring tabs springs back into position after the first or second bottom flange portion passes a bottom edge of the one or more spring tabs and engages an outer flange extension of the first or second bottom flange portion to securely attach the first or second frame section of the solar panel module to the solar panel support structure.

7. The structure of claim 1 wherein the dividing structure comprises a first retaining fold.

8. The structure of claim 1 wherein a first retaining fold is provided at an angle relative to the first plane such that a portion of the first retaining fold is positioned over an outer flange extension of a first bottom flange portion of the first frame section.

9. The structure of claim 7 wherein the dividing structure further comprises a second retaining fold.

10. The structure of claim 9 wherein the second retaining fold is provided at an angle relative to the second plane such that a portion of the second retaining fold is positioned over an outer flange extension of a second bottom flange portion of the second frame section.

11. The structure of claim 7 wherein said first retaining fold comprises a fixed first position retainer fold.

12. The structure of claim 9 wherein said second retaining fold comprises a fixed second position retainer fold.

13. The structure of claim 1 and further comprising:

a first shelf upturn provided at an end of the first shelf away from the dividing structure and extending above the first plane; and a second shelf upturn provided at an end of the second shelf away from the dividing structure and extending above the second plane.

14. The structure of claim 13 wherein the first shelf upturn is folded at an angle relative to the first plane such that a portion of the first shelf upturn is positioned over an inner flange extension of the first bottom flange portion.

15. The support structure of claim 13 wherein the second shelf upturn is folded at an angle relative to the second plane such that a portion of the second shelf upturn is positioned over an inner flange extension of the second bottom flange portion.

16. The structure of claim 13 and further comprising one or more second spring tabs in iii) the first shelf upturn, iv) the second shelf upturn, or both (iii) and (iv).

17. The structure of claim 16 wherein the one or more second spring tabs comprise a lock tab, tapered tab, door tab, folded tab, fold-down tab, or any combination thereof.

18. The structure of claim 16 wherein the one or more second spring tabs comprise one or more lock tabs.

19. The structure of claim 18 wherein the one or more second spring tabs engage with a first inner flange extension of the first bottom flange portion or a second inner flange extension of the second bottom flange portion.

20. The structure of claim 18 wherein the one or more second spring tabs bend when engaged by iii) the first bottom flange portion of the first frame section, iv) the second bottom flange portion of the second frame section, or both and (iv), and the one or more second spring tabs springs back into position after the first or second bottom flange portion passes an edge of the one or more second spring tabs to securely attach the first or second frame section of the solar panel module to the solar panel support structure.

21. The structure of claim 18 wherein the one or more second spring tabs bend downward when engaged by iii) a first inner flange extension of the first bottom flange portion of the first frame section, iv) a second inner flange of the second bottom flange portion of the second frame section, or both (iii) and (iv), and springs back into position after the first or second inner flange passes below a bottom edge of the one or more second spring tabs and engages the inner extension of the bottom flange to securely attach the frame section of the solar panel module to the solar panel support structure.

22. The structure of claim 1 wherein the dividing structure comprises a first vertical wall having the one or more spring tabs.

23. The structure of claim 22 wherein the dividing structure comprises a second vertical wall having the one or more spring tabs.

* * * * *